(12) United States Patent
Wang et al.

(10) Patent No.: US 12,493,264 B2
(45) Date of Patent: Dec. 9, 2025

(54) METHOD FOR BIREFRINGENCE PATTERNING

(71) Applicant: Meta Platforms Technologies, LLC, Menlo Park, CA (US)

(72) Inventors: Junren Wang, Kirkland, WA (US); Xiayu Feng, Kirkland, WA (US); Mengfei Wang, Woodinville, WA (US); Lu Lu, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 622 days.

(21) Appl. No.: 17/948,233

(22) Filed: Sep. 20, 2022

(65) Prior Publication Data

US 2023/0152750 A1 May 18, 2023

Related U.S. Application Data

(60) Provisional application No. 63/279,173, filed on Nov. 14, 2021.

(51) Int. Cl.
*G03H 1/04* (2006.01)
*G02B 5/30* (2006.01)
(Continued)

(52) U.S. Cl.
CPC ......... *G03H 1/0402* (2013.01); *G02B 5/3016* (2013.01); *G02B 5/32* (2013.01);
(Continued)

(58) Field of Classification Search
CPC ...... G02B 5/3083; G02B 5/3016; G02B 5/32; G02F 1/1393; G02F 1/133788
See application file for complete search history.

(56) References Cited

U.S. PATENT DOCUMENTS

| 8,861,083 B2* | 10/2014 | Sawanobori | G02B 5/3016 |
| | | | 359/489.11 |
| 2008/0266502 A1* | 10/2008 | Chiu | C30B 25/18 |
| | | | 427/523 |

(Continued)

OTHER PUBLICATIONS

International Search Report and Written Opinion for International Application No. PCT/US2022/049815, mailed, Mar. 9, 2023, 12 pages.

(Continued)

*Primary Examiner* — Stewart A Fraser
(74) *Attorney, Agent, or Firm* — Greenberg Traurig, LLP

(57) ABSTRACT

A method includes providing a radiation with a predetermined intensity profile. The method also includes providing a photo-sensitive medium layer including a mixture of a photo-sensitive material and an absorbing additive. The absorbing additive has a predetermined non-uniform distribution in at least one of a direction within a film plane or a thickness direction of the photo-sensitive medium layer. The predetermined non-uniform distribution of the absorbing additive is configured to result in a predetermined non-uniform absorption of the radiation. The method also includes exposing the photo-sensitive medium layer to the radiation to form a polymer film. The optical film includes at least one predetermined birefringence variation in at least one of a direction within a film plane or a thickness direction of the polymer film.

20 Claims, 26 Drawing Sheets

(51) Int. Cl.
  *G02B 5/32* (2006.01)
  *G02B 27/01* (2006.01)
  *G06F 3/01* (2006.01)

(52) U.S. Cl.
  CPC ..... *G02B 27/0172* (2013.01); *G02B 27/0179* (2013.01); *G02B 2027/0109* (2013.01); *G02B 2027/0174* (2013.01); *G02B 2027/0178* (2013.01); *G02B 2027/0187* (2013.01); *G03H 2001/0413* (2013.01); *G03H 2001/0439* (2013.01); *G03H 2222/35* (2013.01); *G03H 2260/12* (2013.01); *G06F 3/013* (2013.01)

(56) References Cited

U.S. PATENT DOCUMENTS

| | | | | |
|---|---|---|---|---|
| 2010/0225876 | A1* | 9/2010 | Escuti | G02F 1/1337 359/485.05 |
| 2011/0242461 | A1* | 10/2011 | Escuti | H04N 9/3167 349/96 |
| 2011/0317271 | A1* | 12/2011 | Dunn | G07D 7/0032 156/60 |
| 2014/0185000 | A1* | 7/2014 | Takahashi | B42D 25/328 349/194 |
| 2017/0033320 | A1* | 2/2017 | Harkema | H10K 77/10 |
| 2019/0093015 | A1 | 3/2019 | Kamura et al. | |
| 2022/0137279 | A1* | 5/2022 | Mahajan | G03H 1/04 359/30 |

OTHER PUBLICATIONS

Penterman R., et al., "Single-Substrate Liquid-Crystal Displays by Photo-Enforced Stratification," Nature, vol. 417, No. 6884, May 2, 2002, pp. 55-58.

Zhao W., et al., "Photopolymerization-Enforced Stratification in Liquid Crystal Materials," Progress in Polymer Science, vol. 114, Jan. 21, 2021, 29 pages.

International Preliminary Report on Patentability for International Application No. PCT/US2022/049815, mailed May 23, 2024, 10 pages.

Lin D., et al., "Polarization-Independent Metasurface Lens Employing the Pancharatnam-Berry Phase," Optics Express, vol. 26, No. 19, Sep. 17, 2018, pp. 24835-24842.

* cited by examiner

240

METHOD FOR BIREFRINGENCE PATTERNING

CROSS REFERENCE TO RELATED APPLICATION

This application claims the benefit of priority to U.S. Provisional Application No. 63/279,173, filed on Nov. 14, 2021. The content of the above-mentioned application is incorporated herein by reference in its entirety.

TECHNICAL FIELD

The present disclosure generally relates to methods for fabricating optical devices and, more specifically, to a method for birefringence patterning.

BACKGROUND

Liquid crystal polarization holograms ("LCPHs") refer to the intersection of liquid crystal devices and polarization holograms. Liquid crystal displays ("LCDs"), having grown to a trillion dollar industry over the past decades, are the most successful example of liquid crystal devices. The LCD industry has made tremendous investments to scale manufacturing, from the low end G2.5 manufacturing line to the high end G10.5+ to meet the market demands for displays. However, the LCD industry has recently faced competition from organic light-emitting diodes ("OLED"), e-paper and other emerging display technologies, which has flattened the growth rate of LCD industry and has rendered significant early generation capacity redundant. This provides an opportunity to repurpose the LCD idle capacity and existing supply chain to manufacture novel LC optical devices characterized by their polarization holograms.

LCPHs have features such as small thickness (~1 um), light weight, compactness, large aperture, high efficiency, simple fabrication, etc. Thus, LCPHs have gained increasing interests in optical device and system applications, e.g., near-eye displays ("NEDs"), head-up displays ("HUDs"), head-mounted displays ("HMDs"), smart phones, laptops, televisions, or vehicles, etc. For example, LCPHs may be used for addressing accommodation-vergence conflict, enabling thin and highly efficient eye-tracking and depth sensing in space constrained optical systems, developing optical combiners for image formation, correcting chromatic aberrations for image resolution enhancement of refractive optical elements in compact optical systems, and improving the efficiency and reducing the size of optical systems.

SUMMARY OF THE DISCLOSURE

Consistent with an aspect of the present disclosure, a method is provided. The method includes providing a radiation with a predetermined intensity profile. The method also includes providing a photo-sensitive medium layer including a mixture of a photo-sensitive material and an absorbing additive. The absorbing additive has a predetermined non-uniform distribution in at least one of a direction within a film plane or a thickness direction of the photo-sensitive medium layer. The predetermined non-uniform distribution of the absorbing additive is configured to result in a predetermined non-uniform absorption of the radiation. The method also includes exposing the photo-sensitive medium layer to the radiation to form a polymer film. The optical film includes at least one predetermined birefringence variation in at least one of a direction within a film plane or a thickness direction of the polymer film.

Consistent with another aspect of the present disclosure, a method is provided. The method includes providing a radiation with a predetermined intensity variation. The method also includes providing a stack of a photo-sensitive medium layer and an absorbing film. The absorbing film includes an absorbing additive having a predetermined uniform distribution within a film plane of the absorbing film. The predetermined uniform distribution of the absorbing additive is configured to result in a predetermined uniform absorption of the radiation. The method also includes exposing the stack of the photo-sensitive medium layer and the absorbing film to the radiation. After being exposed to the radiation propagating through the absorbing film, the photo-sensitive medium layer forms a polymer film including at least one predetermined birefringence variation in at least one of a direction within a film plane or a thickness direction of the polymer film.

Consistent with another aspect of the present disclosure, a method is provided. The method includes providing a radiation with a uniform intensity. The method also includes providing a stack of a photo-sensitive medium layer and an absorbing film. The absorbing film includes an absorbing additive having a predetermined non-uniform distribution in one or more directions within a film plane of the absorbing film. The predetermined non-uniform distribution of the absorbing additive is configured to result in a predetermined non-uniform absorption of the radiation. The method also includes exposing the stack of the photo-sensitive medium layer and the absorbing film to the radiation. After being exposed to the radiation propagating through the absorbing film, the photo-sensitive medium layer forms a polymer film including one or more predetermined birefringence variations in one or more directions within a film plane of the polymer film.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
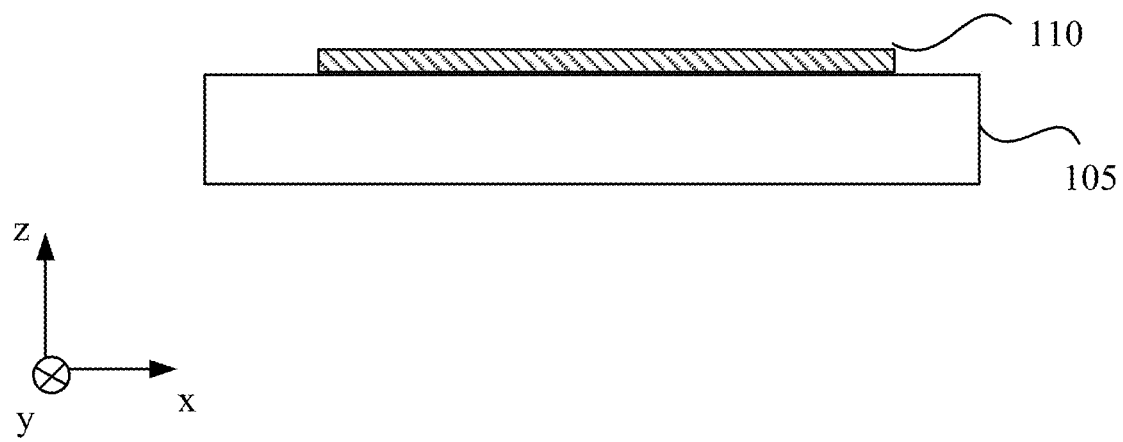
FIGS. 1A-1D schematically illustrate processes for birefringence patterning, according to various embodiments of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The term "film plane" refers to a plane in the film, layer, coating, or plate that is perpendicular to the thickness direction or a normal of a surface of the film, layer, coating, or plate. The film plane may be a plane in the volume of the film, layer, coating, or plate, or may be a surface plane of the film, layer, coating, or plate. The term "in-plane" as in, e.g., "in-plane orientation," "in-plane direction," "in-plane pitch," etc., means that the orientation, direction, or pitch is within the film plane. The term "out-of-plane" as in, e.g., "out-of-plane direction," "out-of-plane orientation," or "out-of-plane pitch" etc., means that the orientation, direction, or pitch is not within a film plane (i.e., non-parallel with a film plane). For example, the direction, orientation, or pitch may be along a line that is perpendicular to a film plane, or that forms an acute or obtuse angle with respect to the film plane. For example, an "in-plane" direction or orientation may refer to a direction or orientation within a surface plane, an "out-of-plane" direction or orientation may refer to a thickness direction or orientation non-parallel with (e.g., perpendicular to) the surface plane. In some embodiments, an "out-of-plane" direction or orientation may form an acute or right angle with respect to the film plane.

The term "orthogonal" as used in "orthogonal polarizations" or the term "orthogonally" as used in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

In the present disclosure, an angle of a beam (e.g., a diffraction angle of a diffracted beam or an incidence angle of an incident beam) with respect to a normal of a surface can be defined as a positive angle or a negative angle, depending on the angular relationship between a propagating direction of the beam and the normal of the surface. For example, when the propagating direction of the beam is clockwise (or counter-clockwise) from the normal, the angle of the propagating direction may be defined as a positive angle, and when the propagating direction of the beam is counter-clockwise (or clockwise) from the normal, the angle of the propagating direction may be defined as a negative angle.

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a light means that a majority portion, including all, of a light is transmitted, reflected, diffracted, or blocked, etc. The majority portion may be a predetermined percentage (greater than 50%) of the entire light, such as 100%, 95%, 90%, 85%, 80%, etc., which may be determined based on specific application needs.

The present disclosure provides a method for birefringence patterning. An optical film fabricated based on the disclosed method may have a predetermined birefringence pattern or profile. In some embodiments, the predetermined birefringence pattern or profile may include one or more predetermined birefringence variations in one or more directions within a film plane and/or a predetermined birefringence variation in a thickness direction of the optical film. The film plane refers to a plane in the optical film that is perpendicular to the thickness direction. A birefringence variation refers to a variation in the birefringence within a volume or body (including the surfaces) of the optical film. A birefringence variation means that local birefringences at different portions or points of the optical film are different. That is, the local birefringence may vary from one portion to another within the volume or body (including the surfaces) of the optical film. For example, a local birefringence may be 0.2 at one portion of the optical film, and 0.1 at another portion of the optical film. In the disclosed embodiments, a local birefringence of the optical film may be a local in-plane birefringence, rather than a local out-of-plane birefringence of the optical film. A local in-plane birefringence may be calculated as a difference between a local first principle refractive index in a first in-plane direction of the optical film (e.g., a local extraordinary refractive index) and a local second principle refractive index in a second in-plane direction (perpendicular to the first in-plane direction) of the optical film (e.g., a local ordinary refractive index).

When the optical film has a birefringence variation in one direction within the film plane or in the thickness direction, the optical film is referred to as having a one-dimensional ("1D") birefringence variation. When the optical film has two birefringence variations in two directions within the film plane, or in one direction within the film plane and in the thickness direction, the optical film is referred to as having a two-dimensional ("2D") birefringence variation. The birefringence variations in the two directions may be different. When the optical film has two birefringence variations in two directions (e.g., two perpendicular directions) within the film plane and a birefringence variation in the thickness direction, the optical film is referred to as having a three-dimensional ("3D") birefringence variation. The two birefringence variations in the two directions within the film plane may be the same, similar, or different. The birefringence in the thickness direction may be different from the two birefringence variations within the film plane.

In some embodiments, an optical device including the disclosed optical film (that is configured with one or more predetermined birefringence variations in one or more directions within the film plane and/or a predetermined birefringence variation in the thickness direction) may provide a unique optical response. For example, in some embodiments, the optical device including the optical film may provide a spatially varying optical response.

FIGS. 1A-1D schematically illustrate processes for birefringence patterning, according to various embodiments of the present disclosure. The processes shown in FIGS. 1A-1D may include surface alignment and photo-polymerization. For illustrative purposes, the substrate and different layers, films, or structures formed thereon are shown as having flat surfaces. In some embodiments, the substrate and different layers or films or structures may have curved surfaces. As shown in FIG. 1A, an alignment structure 110 may be formed on a surface (e.g., a top surface) of a substrate 105. The alignment structure 110 may provide any suitable alignment pattern corresponding to a predetermined in-plane orientation pattern, such as an in-plane orientation pattern with uniform orientations, periodic or non-periodic linear orientations, periodic or non-periodic radial orientations, periodic or non-periodic azimuthal orientations, or a combination thereof, etc. The alignment structure 110 may include any suitable alignment structure, such as a photo-alignment material ("PAM") layer, a mechanically rubbed alignment layer, an alignment layer with anisotropic nano-imprint, an anisotropic relief, or a ferroelectric or ferromagnetic material layer, etc.

In some embodiments, the alignment structure 110 may be a PAM layer, and the alignment pattern provided by the PAM layer may be formed via any suitable approach, such as holographic interference, laser direct writing, ink-jet printing, or various other forms of lithography. The PAM layer may include a polarization sensitive material (e.g., a photo-alignment material) that can have a photo-induced optical anisotropy when exposed to a polarized radiation. The polarized radiation may have a spatially uniform polarization (e.g., a linear polarization with a fixed polarization direction) or a spatially varying polarization (e.g., a linear polarization with a spatially varying polarization direction) in a predetermined space in which the polarization sensitive material (e.g., photo-alignment material) is disposed. As the PAM layer is substantially thin, the intensity of the polarized radiation within the PAM layer is presumed to be uniform.

Under the polarized radiation, molecules (or fragments) and/or photo-products of the polarization sensitive material may be configured to generate an orientational ordering under the polarized radiation. For example, the polarization sensitive material may be dissolved in a solvent to form a solution. The solution may be dispensed on the substrate 105 using any suitable solution dispensing process, e.g., spin coating, slot coating, blade coating, spray coating, or jet (ink-jet) coating or printing. The solvent may be removed from the coated solution using a suitable process, e.g., drying, or heating, thereby leaving the polarization sensitive material on the substrate 105. The polarization sensitive material may be optically patterned via the polarized radiation, to form the alignment pattern corresponding to a predetermined in-plane orientation pattern. In some embodiments, the polarization sensitive material may include elongated anisotropic photo-sensitive units (e.g., small molecules or fragments of polymeric molecules). After being subjected to a sufficient exposure of the polarized radiation, local alignment directions of the anisotropic photo-sensitive units may be induced in the polarization sensitive material, resulting in an alignment pattern (or in-plane modulation) of an optic axis of the polarization sensitive material.

In some embodiments, an entire layer of the polarization sensitive material may be formed on the substate via a single dispensing process, and the layer of the polarization sensitive material may be subjected to the polarized radiation that has a uniform linear polarization direction or spatially varying orientations (or polarization directions) of linear polarizations in a predetermined space in which the entire layer of the polarization sensitive material is disposed. In some embodiments, an entire layer of the polarization sensitive material may be formed on the substate via a plurality of dispensing processes. For example, during a first time period, a first predetermined amount of the polarization sensitive material may be dispensed at a first location of the substate 105, and exposed to a first polarized radiation. During a second time period, a second predetermined amount of the polarization sensitive material may be dispensed at a second location of the substate 105, and exposed to a second polarized radiation. The first polarized radiation may have a first uniform intensity, and a first linear polarization direction in a space in which the first predetermined amount of the polarization sensitive material is disposed. The second polarized radiation may have a second uniform intensity, and a second linear polarization direction in a space in which the second predetermined amount of the polarization sensitive material is disposed. The first uniform intensity and the second uniform intensity may be substantially the same. The first linear polarization direction and the second linear polarization direction may be substantially the same or different from one another. The process may be repeated until a PAM layer that provides a desirable alignment pattern is obtained.

The substrate 105 may provide support and protection to various layers, films, and/or structures formed thereon. In some embodiments, the substrate 105 may be optically transparent in the visible wavelength band (e.g., about 380 nm to about 700 nm). In some embodiments, the substrate 105 may also be optically transparent in at least a portion of the infrared ("IR") band (e.g., about 700 nm to about 1 mm). In some embodiments, the substrate 105 may also be optically transparent in at least a portion of the ultraviolet ("UV") band (e.g., about 100 nm to about 400 nm). The substrate 105 may include a suitable material that is at optically transparent to lights of the above-listed wavelength ranges, such as, a glass, a plastic, a sapphire, a polymer, or a combination thereof, etc. The substrate 105 may be rigid, semi-rigid, flexible, or semi-flexible. The substrate 105 may include a flat surface or a curved surface, on which the different layers or films may be formed. In some embodiments, the substrate 105 may be a part of another optical element or device (e.g., another opto-electrical element or device). For example, the substrate 105 may be a solid optical lens, a part of a solid optical lens, or a light guide (or waveguide), etc. In some embodiments, the substrate 105 may be a part of a functional device, such as a display screen.

Figure 1B:
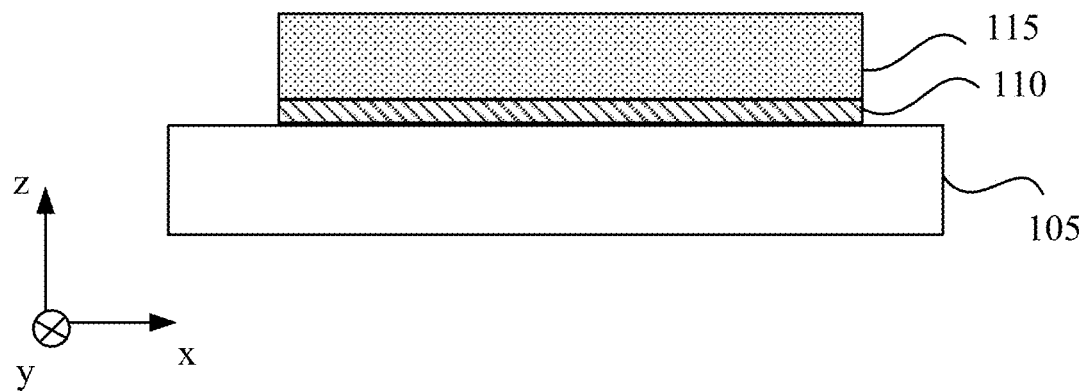

As shown in FIG. 1B, after the alignment structure 110 is formed on the substate 105, a photo-sensitive medium layer 115 may be formed on the alignment structure 110. In some embodiments, the photo-sensitive medium layer 115 may include a photo-sensitive material and an absorbing additive. The photo-sensitive material may include a mixture of a birefringent material and a photo-initiator for polymerization. In some embodiments, the photo-sensitive medium layer 115 may also include other ingredients, such as active LCs, a chiral dopant, dyes, and/or a surfactant, etc. In some embodiments, the photo-sensitive medium layer 115 may also be referred to as a birefringence medium layer. The birefringent material may have an intrinsic birefringence, and may include optically anisotropic molecules. In some embodiments, the birefringent material may include nematic LCs, twist-bend LCs, chiral nematic LCs, smectic LCs, or any combination thereof. In some embodiments, the birefringent material may be photo-polymerizable, such as including reactive mesogens ("RMs"), a polymer dispersed liquid crystal precursor mixture, a polymer stabilized liquid crystal precursor mixture, or a dye-doped liquid crystal mixture (e.g., a dye-doped polymer dispersed liquid crystal precursor mixture, or a dye-doped stabilized liquid crystal precursor mixture), etc. RMs may be also referred to as a polymerizable mesogenic or liquid-crystalline compound, or polymerizable LCs. For discussion purposes, the term "liquid crystal molecules" or "LC molecules" may encompass both polymerizable LC molecules (e.g., RM molecules) and non-polymerizable LC molecules. For discussion purposes, in the following descriptions, RMs are used as an example of polymerizable birefringent materials, and RM molecules are used as an example of optically anisotropic molecules included in a polymerizable birefringent material. In some embodiments, polymerizable birefringent materials other than RMs may also be used.

In some embodiments, the birefringent material may not have an intrinsic or induced chirality. In some embodiments, the birefringent medium may have an intrinsic or induced chirality. For example, in some embodiments, the birefringent material may include a host birefringent material and a chiral dopant doped into the host birefringent material at a predetermined concentration. The chirality may be introduced by the chiral dopant doped into the host birefringent material, e.g., chiral RMs doped into achiral RMs. In some embodiments, the birefringent material may have an intrinsic molecular chirality, and chiral dopants may not be doped into the birefringent material. The chirality of the birefringent material may result from the intrinsic molecular chirality thereof. For example, the birefringent material may include chiral LC molecules, or molecules having one or more chiral functional groups.

The photo-initiator may be a compound that generates polymerization initiating species upon absorbing a light energy (or a radiation). The polymerization initiating species may react with the monomer double bonds in the birefringent material (that is a polymerizable birefringent material), resulting in a polymerization of the birefringent material. In some embodiments, the photo-initiator may be sensitive to a UV radiation, e.g., an absorptive band of the photo-initiator may include the UV spectrum. The photo-initiator may absorb the UV radiation and generate the polymerization initiating species.

The absorbing additive may be configured to absorb a radiation that is used as a curing radiation for the birefringent material (or to which the photo-initiator is sensitive). The absorbing additive may be different from the photo-initiator used for photo-polymerization. The absorbing additive may not chemically react with the birefringent material. In some embodiments, absorption of the radiation provided by the absorbing additive may be significantly larger than the that provided by the photo-initiator. Thus, absorbing additive may be added to the birefringent material to significantly change the absorption capability for absorbing the radiation in a controlled manner. In some embodiments, the absorbing additive may be configured to be uniformly distributed within the photo-sensitive medium layer 115, at a predetermined concentration. In some embodiments, the absorbing additive may be non-uniformly distributed within the photo-sensitive medium layer 115. For example, the absorbing additive may be non-uniformly distributed in one or more directions within a film plane (e.g., the x-y plane in FIG. 1B) and/or along a thickness direction (e.g., the z-axis direction in FIG. 1B) of the photo-sensitive medium layer 115. The non-uniform distribution of the absorbing additive is also referred to as a concentration variation. That is, different amounts of absorbing additive may be concentrated (or distributed) at different portions of the photo-sensitive medium layer 115. In some embodiments, the absorbing additive may absorb a UV radiation. For example, an absorptive band of the absorbing additive may include the UV spectrum. In some embodiments, the absorbing additive may include absorbing dyes.

In some embodiments, the respective ingredients of the photo-sensitive medium layer 115 may be dissolved in a solvent to form a solution. A suitable amount of the solution may be dispensed (e.g., coated, or sprayed, etc.) on the alignment structure 110 to form the photo-sensitive medium layer 115. In some embodiments, the solution may be coated on the alignment structure 110 using a suitable process, e.g., spin coating, slot coating, blade coating, spray coating, or jet (ink-jet) coating or printing. In some embodiments, the formed photo-sensitive medium layer 115 may be heated to remove the residual solvent. The alignment structure 110 may provide a surface alignment to the optically anisotropic molecules that are in close proximity to (including in contact with) the alignment structure 110, thereby aligning the optically anisotropic molecules that are in close proximity to (including in contact with) in the predetermined in-plane orientation pattern.

Figure 1C:
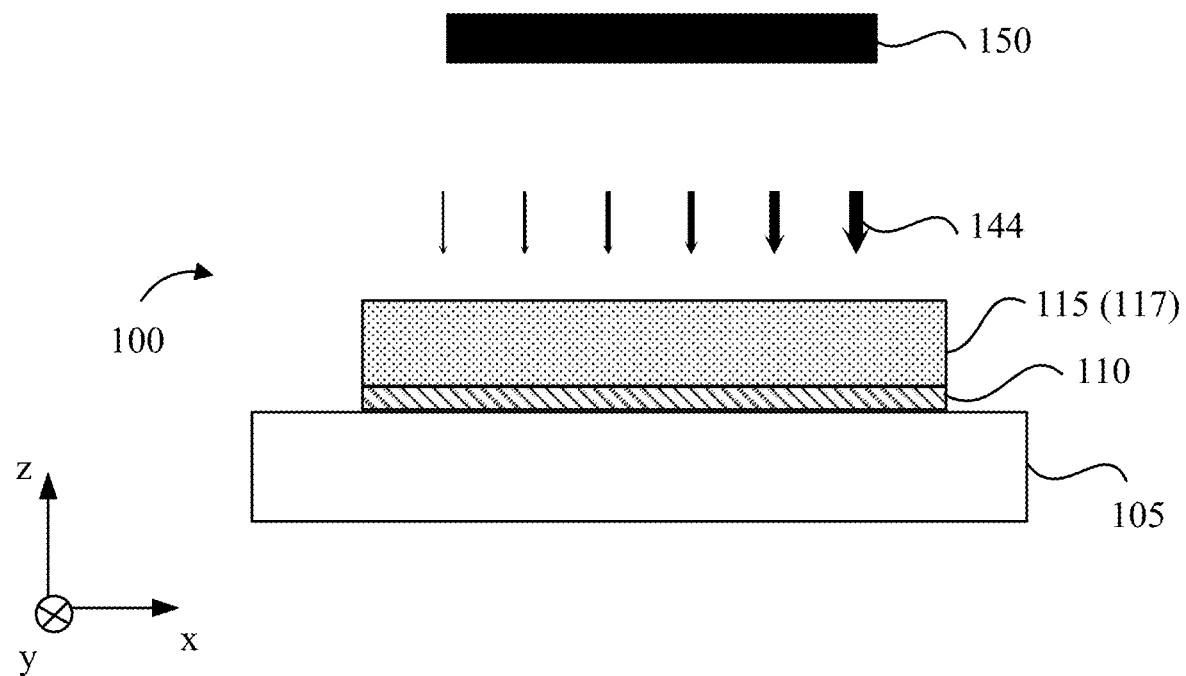

Referring to FIG. 1C, after the photo-sensitive medium layer 115 is formed on the alignment structure 110, the photo-sensitive medium layer 115 may be exposed to a radiation 144 to form a polymer layer 117. The radiation 144 may have a wavelength range within the absorption band of the photo-initiator. The radiation 144 may also be referred to as an activating radiation that activates the photo-initiator to generate the polymerization initiating species. In some embodiments, the radiation 144 may be a UV radiation. For example, as shown in FIG. 1C, the photo-sensitive medium layer 115 may be exposed to a UV light beam (also referred to as 144 for discussion purposes). Under a sufficient radiation, the birefringent material (e.g., RM monomers) in the photo-sensitive medium layer 115 may be polymerized or crosslinked to stabilize the orientations of the optically anisotropic molecules. In some embodiments, the exposure of the photo-sensitive medium layer 115 under the radiation 144 may be carried out in air, in an inert atmosphere formed by, e.g., nitrogen, argon, carbon-dioxide, or in vacuum. In some embodiments, the radiation 144 may be unpolarized. In some embodiments, the radiation 144 may be polarized, e.g., linearly polarized. The polarization of the radiation 144 may be spatially uniform in a predetermined space within which the photo-sensitive medium layer 115 is disposed. For example, the radiation 144 may be linearly polarized with a fixed polarization direction in the predetermined space.

Inventors have observed that the birefringence of the polymer layer 117 may depend on an exposure intensity applied to the photo-sensitive medium layer 115 and the type of birefringent material used in the photo-sensitive medium layer 115, when the exposure time is constant across the photo-sensitive medium layer 115. For different birefringent materials, the birefringence may change in different manners when the exposure intensity changes. For example, for some birefringent materials, a higher exposure intensity may result in a higher birefringence in the fabricated polymer layer 117. For some birefringent materials, a higher exposure intensity may result in a lower birefringence in the fabricated polymer layer 117. For some birefringent materials, both of a relatively high exposure intensity and a relatively low exposure intensity may result in a relatively low birefringence in the fabricated polymer layer 117, whereas a relatively medium exposure intensity may result in a relatively high birefringence in the fabricated polymer layer 117.

Thus, when the photo-sensitive medium layer 115 is exposed to the radiation to form the polymer layer 117, the birefringence in the polymer layer 117 may be configured with a predetermined variation within a film plane and/or in the thickness direction through controlling the exposure intensity variation of the radiation to which the photo-sensitive medium layer 115 is exposed. Controlling the exposure intensity may include configuring the exposure intensity in one or more direction within the film plane (e.g., the x-y plane) of the photo-sensitive medium layer 115 and/or the thickness direction (e.g., the z-axis direction). When the photo-sensitive medium layer 115 is exposed to the radiation with the varying exposure intensity, the birefringence of the fabricated polymer layer 117 may vary in the one or more directions within the film plane and/or in the thickness direction of the polymer layer 117. In some embodiments, the exposure intensity variation may only exist in the one or more directions within the film plane, or only exist in the thickness direction. When the exposure intensity varies only in one direction within the film plane, or only in the thickness direction, a 1D birefringence variation may be generated in the polymer layer 117. When the exposure intensity varies in two directions within the film plane, or in one direction within the film plane and in the thickness direction, 2D birefringence variations may be generated in the polymer layer 117. When the exposure intensity varies in two directions within the film plane, and in the thickness direction, 3D birefringence variations may be generated in the polymer layer 117. Thus, by controlling the exposure intensity variation in both the film plane (e.g., the x-y plane) and the thickness direction (e.g., the z-axis direction) of the photo-sensitive medium layer 115, 3D birefringence variations of the polymer layer 117 may be configured.

In some embodiments, the exposure intensity variation within the film plane of the photo-sensitive medium layer 115 may be configured through configuring the intensity variation of the radiation 144 within the wavefront. Referring to FIG. 1C, the radiation 144 may be configured with a predetermined 1D intensity variation or 2D intensity variations (in one or two dimensions within the wavefront). The predetermined 1D intensity variation or 2D intensity variations within the wavefront means that local intensities at different portions of the wavefront may be different. The intensity variation may follow a predetermined intensity variation pattern or intensity variation profile in a predetermined direction. For discussion purposes, FIG. 1C shows that the radiation 144 has a planar wavefront configured with a predetermined 1D intensity variation along the x-axis direction. It is noted that the intensity variation may be additionally or alternatively configured in the y-axis direction. FIG. 1C shows that the radiation 144 is represented by arrows, in which the thinner arrow indicates a lower intensity, and the thicker arrow indicates a higher intensity. For discussion purposes, FIG. 1C shows that the intensity of the radiation 144 increases in the +x-axis direction in a gradient manner. The gradient manner may be a linearly gradient manner, a non-linearly gradient manner, a stepped gradient manner, or a suitable combination thereof, etc. Thus, the exposure intensity within the film plane of the photo-sensitive medium layer 115 may increase in the +x-axis direction.

The radiation 144 with the predetermined 1D intensity variation or 2D intensity variations may be generated via any suitable methods. In some embodiments, as shown in FIG. 1C, the radiation 144 with the predetermined 1D intensity variation or 2D intensity variations may be generated via a projector 150, such as a digital micromirror device ("DMD") projector, or a spatial light modulator ("SLM") projector, etc. The projector 150 may be configured to project a computer-generated image onto the photo-sensitive medium layer 115. That is, the projector 150 may emit an image light representing the computer-generated image onto the photo-sensitive medium layer 115. The image light representing the computer-generated image may be configured with any suitable 1D light intensity variation or 2D light intensity variations in one or two dimensions. The light intensity variation of the image light means that local intensities at different portions of the image light representing the computer-generated image may be different. The image light representing the computer-generated image may be configured with at least two different levels of intensities at two different portions of the image light (or image). The image light representing the computer-generated image may have a wavelength range within the absorption band of the photo-initiator. For example, a UV light may be used to represent the image. Image light representing the computer-generated image may function as the radiation 144.

Figure 2A:
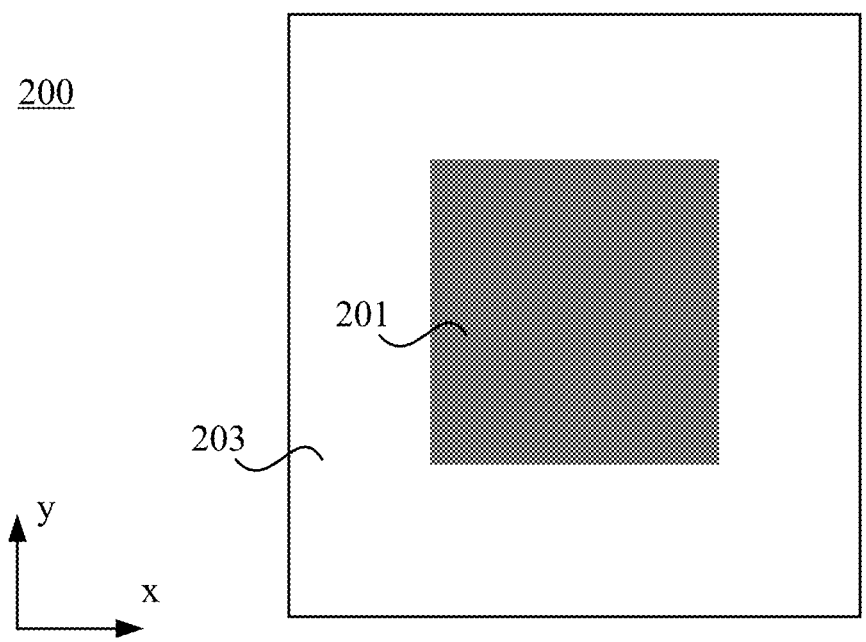
FIG. 2A-2C illustrate schematic diagrams of computer-generated ultraviolet ("UV") images having a one-dimensional ("1D") intensity variation or two-dimensional ("2D") intensity variations, according to various embodiments of the present disclosure.
Figure 2B:
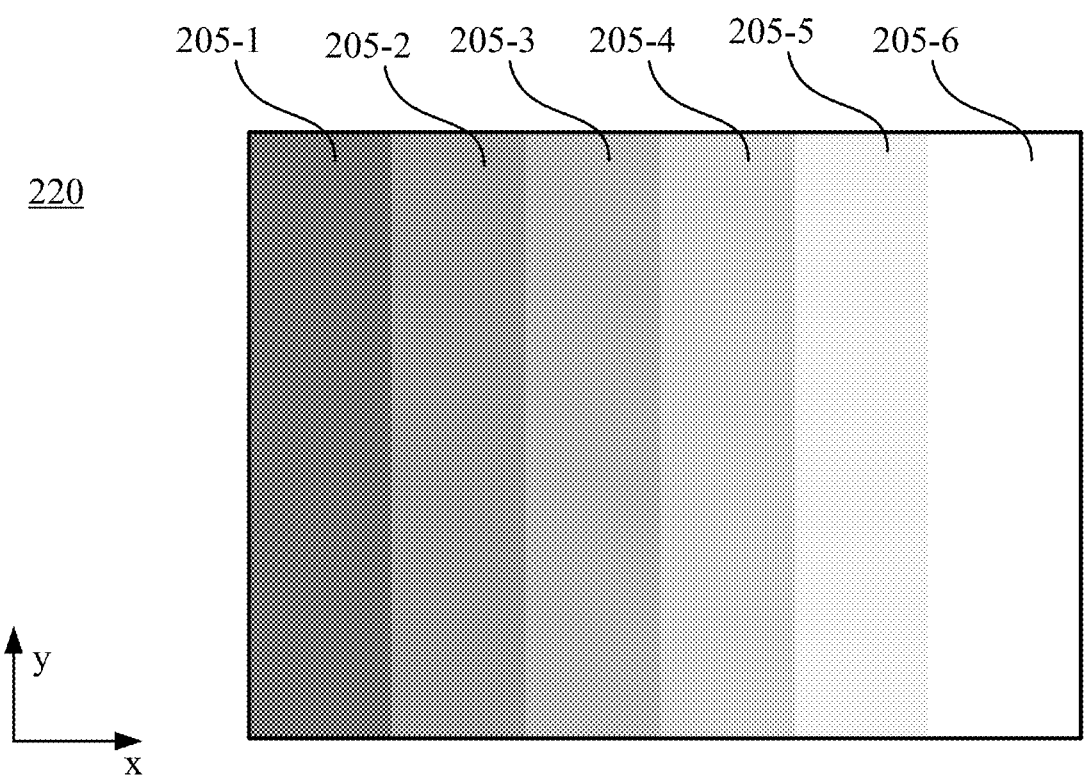
Figure 2C:
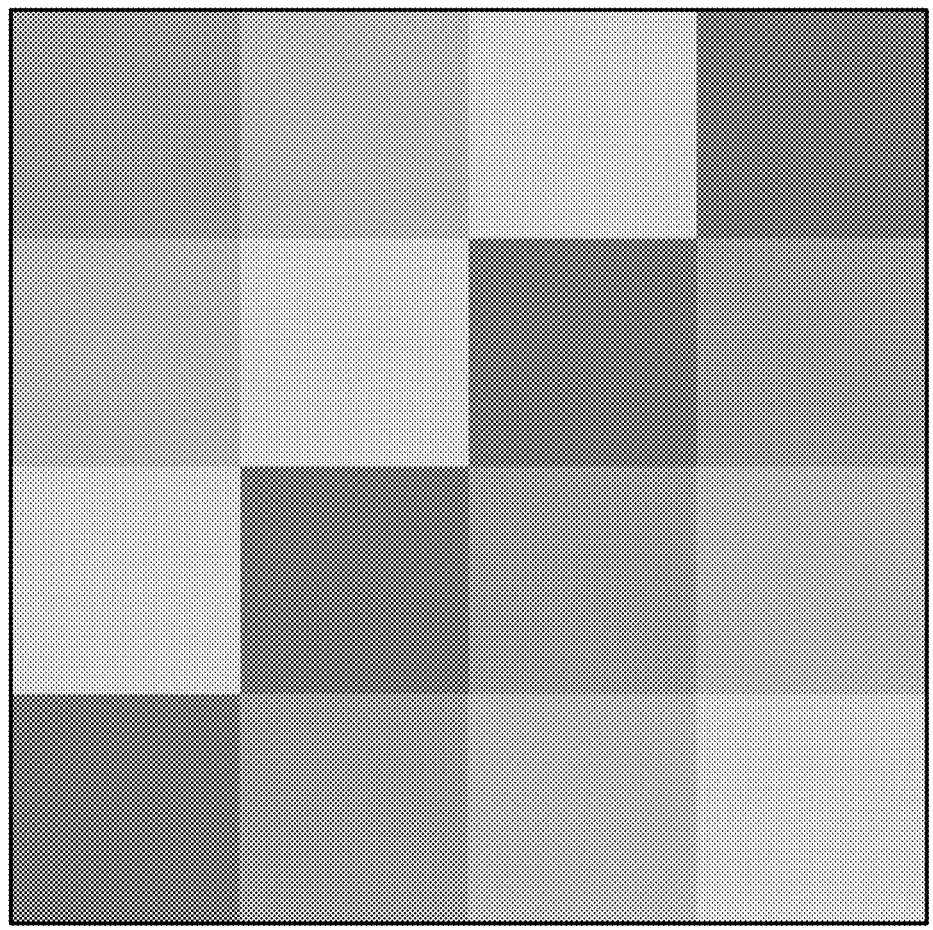
Figure 2C:
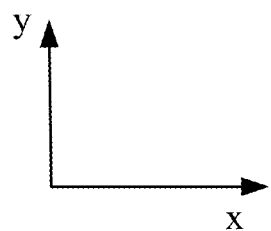

FIGS. 2A-2C illustrate x-y sectional views of computer-generated images configured with a 1D intensity variation or 2D intensity variations, according to various embodiments of the present disclosure. In FIGS. 2A-2C, the intensity of the computer-generated image is represented by grey scales, in which the darker grey indicates a lower intensity, and the lighter grey indicates a higher intensity. As shown in FIG. 2A, a computer-generated image 200 may be configured with two levels of intensities. For example, the computer-generated image 200 may have a central portion 201 with a relatively low level of intensity, and a periphery portion 203 with a relatively high level of intensity surrounding the central portion 201. As shown in FIG. 2B, a computer-generated image 220 may be configured with six levels of intensities. For example, the computer-generated image 220 may include six portions 205-1 to 205-6 arranged in the x-axis direction, with the levels of intensities gradually increasing in the +x-axis direction. As shown in FIG. 2C, a computer-generated image 240 may be configured with four levels of intensities. For example, the computer-generated image 240 may include sixteen portions arranged in a 4×4 array, with the levels of intensities gradually varying in both of the x-axis direction and y-axis direction.

Figure 1D:
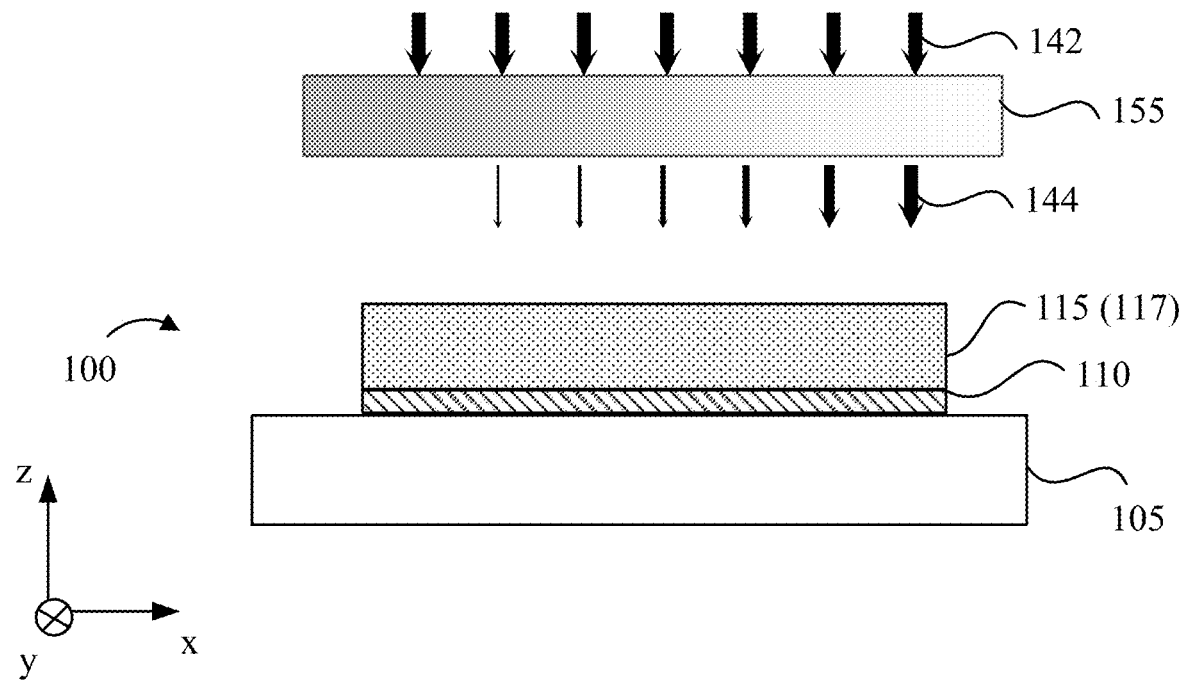

Referring to FIG. 1D, in some embodiments, the radiation 144 with the predetermined 1D intensity variation or 2D intensity variations within the wavefront may be generated via a photomask 155. The photomask 155 may be configured with a predetermined transmittance variation for the wavelength spectrum of the radiation 144. The transmittance variation results in a light intensity variation in the radiation 144 output from the photomask 155. For example, the photomask 155 may have a predetermined 1D transmittance variation or 2D transmittance variations in one or two dimensions (or directions) within a film plane (e.g., the x-y plane shown in FIG. 1D) of the photomask 155 that is perpendicular to a thickness direction (e.g., the z-axis direction shown in FIG. 1D) of the photomask 155. The transmittance variation of the photomask 155 means that local transmittances at different portions of the photomask 155 may be different, which causes the light intensities of the radiation 144 to be different at different portions of the wavefront of the radiation 144. Thus, different portions of the photo-sensitive medium layer 115 may be subject to the radiation 144 of different intensities. For example, the photomask 155 may be configured with a predetermined 1D transmittance variation or 2D transmittance variations of UV radiation within the film plane of the photomask 155. Thus, the photomask 155 may transform a radiation 142, e.g., a UV radiation 142, which may have a spatially uniform intensity, into the radiation 144 with the predetermined 1D intensity variation or 2D intensity variations. The radiation 144 output from the photomask 155 may propagate to the photo-sensitive medium layer 115, such that the photo-sensitive medium layer 115 is exposed to the radiation 144.

In some embodiments, the photomask 155 may be a binary half-tone photomask that uses two levels of grey tones, e.g., including optically opaque regions with a relatively low transmittance and optically transparent regions with a relatively high transmittance. In some embodiments, the photomask 155 may be a grey-tone photomask that uses at least three levels of grey tones, providing at least three different levels of transmission, such as 0%, 25%, 50%, 75%, and 100%, etc. In FIG. 1D, the transmittance of the photomask 155 is represented by grey scales, in which the darker grey indicates a lower transmittance, and the lighter grey indicates a higher transmittance. For discussion purposes, FIG. 1D shows that the transmittance of the photomask 155 gradually increases in the +x-axis direction. Thus, the exposure intensity within the film plane of the photo-sensitive medium layer 115 may increase in the +x-axis direction.

In some embodiments, although not shown, the radiation 144 may be configured with a uniform intensity within the wavefront, and the exposure intensity variation within the film plane of the photo-sensitive medium layer 115 may be generated through configuring an absorption variation within the film plane of the photo-sensitive medium layer 115. The absorption variation refers to variation in the amount of the radiation 144 that is absorbed by the absorbing additive in the film plane of the photo-sensitive medium layer 115. More radiation being absorbed means a lower exposure intensity, and less radiation being absorbed means a higher exposure intensity. The absorbing additive may be configured with a non-uniform distribution within the film plane of the photo-sensitive medium layer 115. The non-uniform distribution may also be referred to as a non-uniform concentration, or a predetermined concentration variation. As used herein, the term "concentration of absorbing additive" means the amount of the absorbing additive. In some embodiments, the concentration of the absorbing additive within the film plane of the photo-sensitive medium layer 115 may be configured to decrease in the +x-axis direction. As a result, the amount of the radiation 144 being absorbed may decrease in the +x-axis direction. Accordingly, the exposure intensity of the radiation 144 within the film plane of the photo-sensitive medium layer 115 may increase in the +x-axis direction. Likewise, the concentration variation of the absorbing additive may be in the y-axis direction within the film plane.

In some embodiments, the concentration variation may be in the z-axis direction, which is the thickness direction. Referring to FIGS. 1C and 1D, the exposure intensity along the thickness direction of the photo-sensitive medium layer 115 may be configurable through configuring an absorption variation of the radiation 144 along the thickness direction of the photo-sensitive medium layer 115. The absorption variation of the radiation 144 along the thickness direction of the photo-sensitive medium layer 115 may be configurable through configuring the composition, the concentration, and/or the concentration variation of the absorbing additive along the thickness of the photo-sensitive medium layer 115.

Thus, when the radiation 144 propagates inside the photo-sensitive medium layer 115 along the thickness direction thereof, the intensity of the radiation 144 may be configured to vary in a controlled manner according to a desirable intensity variation profile, pattern, or distribution, along the thickness direction from a light incidence surface (e.g., a first surface) 115-1 to a light exiting surface (e.g., a second surface) 115-2. Thus, after the photo-polymerization via the radiation 144, the birefringence along the thickness direction of the polymer layer 117 may vary in a controlled manner according to a predetermined birefringence variation (or predetermined birefringence variation pattern, or predetermined birefringence variation profile). For example, along the thickness direction of the photo-sensitive medium layer 115 from the first surface 115-1 to the second surface 115-2, the intensity of the radiation 144 may be configured to decrease in a predetermined gradient manner, such as a predetermined linearly gradient manner, a predetermined non-linearly gradient manner, a predetermined stepped gradient manner, or a suitable combination thereof. After the photo-polymerization via the radiation 144, along the thickness direction from the first surface 115-1 to the second surface 115-2, the birefringence may increase in a predetermined gradient manner. In some embodiments, the birefringence along the thickness direction of the polymer layer 117 may first increase in a predetermined gradient manner, then decrease in another predetermined gradient manner.

In conventional processes of polymerizing a birefringent medium layer to form a birefringent polymer layer, the birefringent medium layer formed on an alignment structure may be exposed to a radiation (e.g., a UV radiation) with a uniform intensity across the wavefront. In addition, in the conventional technology, the birefringent medium layer may not include an absorbing additive with a non-uniform distribution variation that results in an absorption variation of the UV radiation. In the conventional technology, as the UV radiation propagates inside the birefringent medium layer along the thickness direction, the intensity of the UV radiation may naturally decrease due to beam attenuation by the birefringent medium layer that does not include the absorbing additive through, e.g., absorption, reflection, and/or scattering, etc. When the ingredients of the birefringent medium layer are fixed, the attenuation coefficient of the birefringent medium layer may be constant. In addition, the attenuation coefficient of the birefringent medium layer may not change significantly as the concentrations of the birefringent material and the photo-initiator in the birefringent medium layer vary. Thus, in conventional technology, the intensity variation of the UV radiation along the thickness direction of the birefringent medium layer may not be controllable and adjustable.

In the conventional technology, in some situations, the intensity variation of the UV radiation in the thickness direction of the birefringent medium layer due to the attenuation naturally caused by the birefringent material as the UV radiation propagates therethrough may not be sufficiently large to cause a noticeable birefringence variation in the thickness direction. That is, the birefringence in the thickness direction of the birefringent medium layer may be deemed as constant or uniform.

In some situations, even if the intensity variation of the UV radiation in the thickness direction due to the natural attenuation caused by the birefringent material were sufficiently large to cause an non-negligible birefringence variation in the thickness direction, because the natural attenuation of the radiation by the birefringent material as the radiation propagates therethrough occurs in a non-controllable manner, the birefringence variation caused by the natural decay of the intensity of the UV radiation in the thickness direction of the birefringent medium layer is also non-controllable and non-adjustable. Once the birefringent material is selected, the natural decay of the intensity of the UV radiation in the thickness direction as the UV radiation propagates therethrough cannot be conveniently controlled or adjusted.

Compared to the conventional processes, the present disclosure provides a method for introducing a predetermined birefringence variation in the birefringent medium layer (including the surfaces) in one or more directions within a film plane and/or in the thickness direction, in a controllable manner. That is, with the disclosed method, the birefringence variation in the birefringent medium layer may be controlled or conveniently adjusted to be any suitable, desirable birefringence variation, in one dimension, two dimensions, or three dimensions. The present disclosure provides a non-uniform distribution of the intensity of radiation (also referred to as the exposure intensity) in the one or more directions within the film plane and/or in the thickness direction of a volume of a birefringent material. The non-uniform distribution of the exposure intensity may be introduced through various methods disclosed herein. For example, in some embodiments, the non-uniform distribution of the exposure density may be introduced by configuring one or more of a photomask, a light source that generates the radiation, and/or a distribution of an absorbing additive in a separate layer or within the volume of the birefringent material. In some embodiments, by configuring a non-uniform distribution of the absorbing additive, either in a separate layer or within the volume of the birefringent material when the absorbing additive is mixed with the birefringent material, the intensity of the radiation 144 (or exposure intensity) may be controlled to have a predetermined intensity variation (or intensity variation pattern or intensity variation profile). The intensity variation means that the intensity may change in one or more directions within the film plane and/or in the thickness direction of the volume of the birefringent material. The intensity variation of the radiation 144 in a specific direction may cause a birefringence variation in the specific direction.

The disclosed processes shown in FIGS. 1A-1D according to embodiments of the present disclosure may provide more flexibility to control the birefringence variation in one or more directions within the film plane and/or in the thickness direction of the polymer layer 117. In some embodiments, the disclosed processes shown in FIGS. 1A-1D may provide controllable 1D, 2D, or 3D birefringence patterning, and the polymer layer 117 fabricated based on the disclosed processes may have a predetermined 1D birefringence variation, 2D birefringence variations, or 3D birefringence variations in one or more directions within the film plane and/or in the thickness direction. An optical device 100 including the polymer layer 117 with the predetermined birefringence variation may provide a spatially varying optical response.

In some embodiments, the substrate 105 and/or the alignment structure 110 may be used to fabricate, store, or transport the fabricated optical device 100. In some embodiments, the substrate 105 and/or the alignment structure 110 may be detachable or removable from the fabricated optical device 100 after the optical device 100 is fabricated or transported to another place or device. That is, the substrate 105 and/or the alignment structure 110 may be used in fabrication, transportation, and/or storage to support the optical device 100 provided on the substrate 105 and/or the alignment structure 110, and may be separated or removed from the optical device 100 when the fabrication of the optical device 100 is completed, or when the optical device 100 is to be implemented in an optical device. In some embodiments, the substrate 105 and/or the alignment structure 110 may not be separated from the optical device 100.

In some embodiments, the absorbing additive may not be mixed with the birefringent material and the photo-initiator to form a photo-sensitive medium layer. Instead, the photo-sensitive material that includes the birefringent material mixed with the photo-initiator, and the absorbing additive may form two individual layers. For example, in some embodiments, the photo-sensitive material may form a first sub-layer of the photo-sensitive medium layer, and the absorbing additive may from a second sub-layer of the photo-sensitive medium layer. The first sub-layer and the second sub-layer may be stacked together. In some embodiments, the first sub-layer may be in direct contact with the second sub-layer. In some embodiments, the first sub-layer may be spaced apart from the second sub-layer, e.g., via an insulation film (e.g., a substate).

Figure 3A:
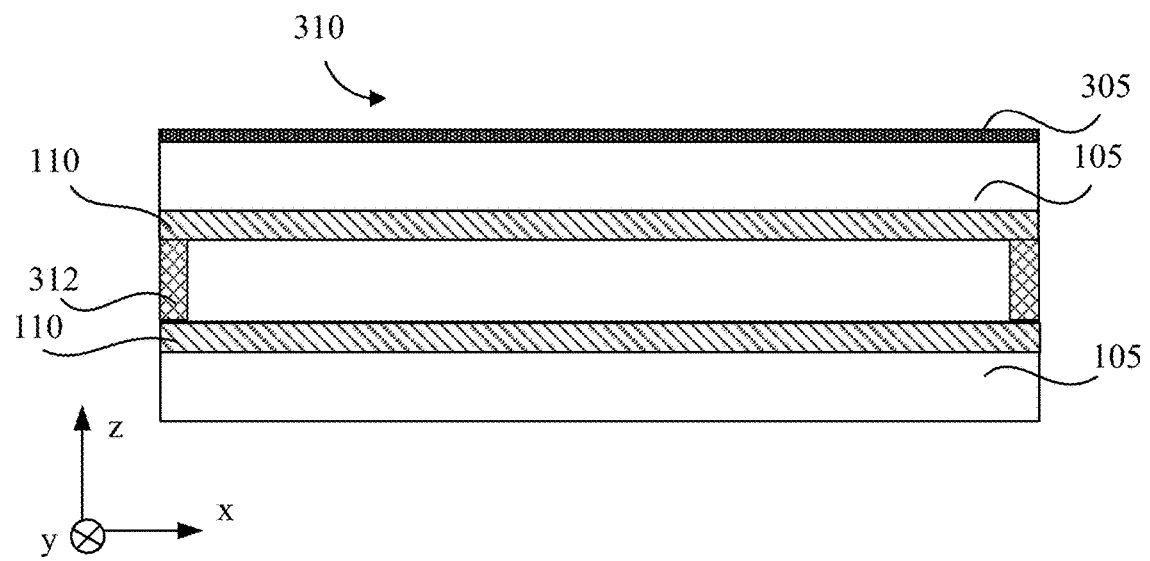
FIGS. 3A-3C schematically illustrate processes for birefringence patterning, according to various embodiments of the present disclosure.
Figure 3B:
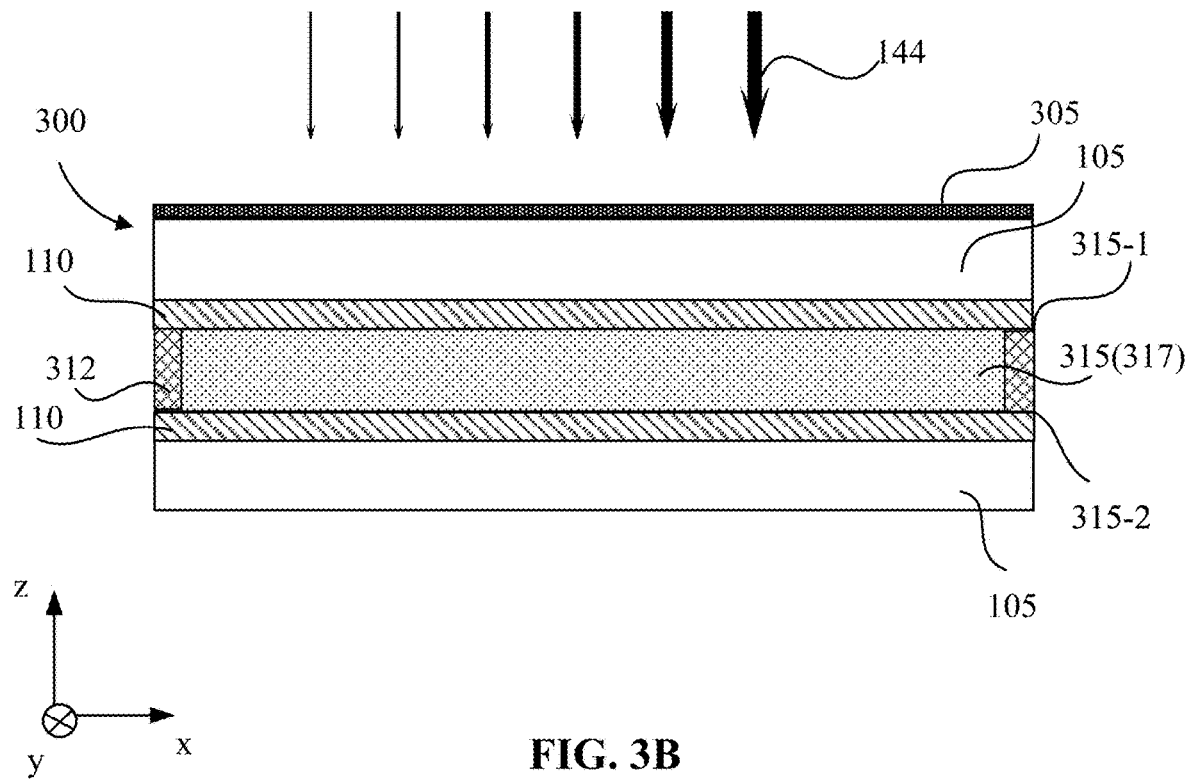
Figure 3C:
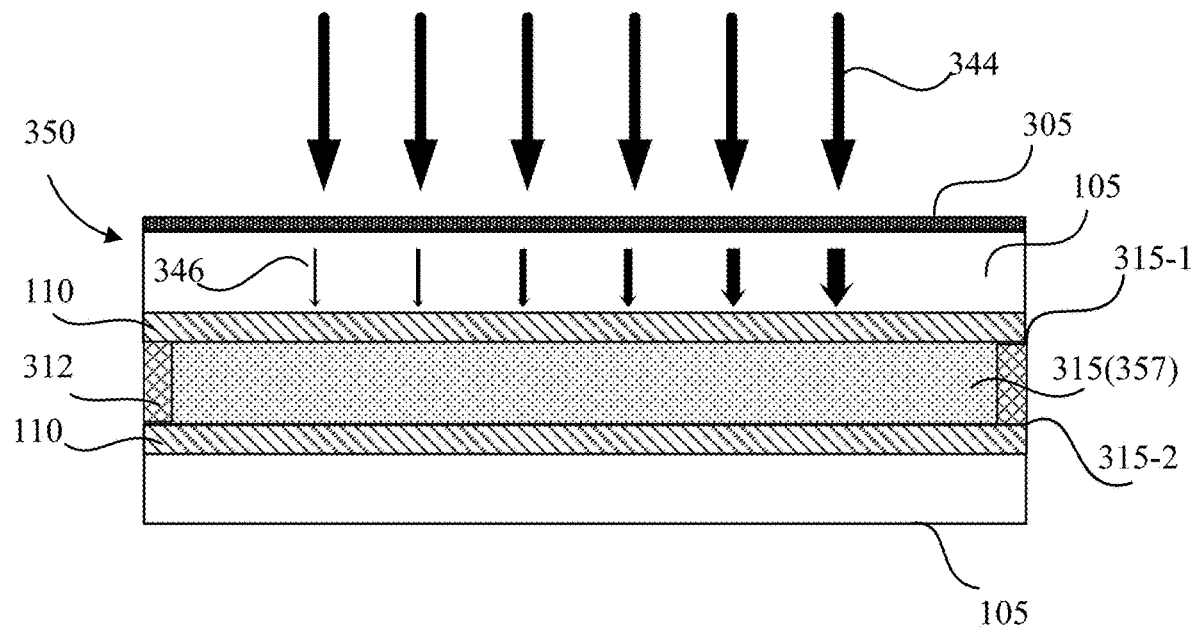
Figure 3C:
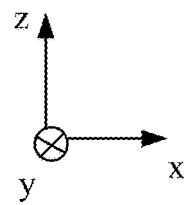

FIGS. 3A-3C schematically illustrate processes for birefringence patterning, according to various embodiments of the present disclosure. The processes shown in FIGS. 3A-3C may include steps similar to those shown in FIGS. 1A-1D. An optical device 300 fabricated based on the processes shown in FIGS. 3A and 3B, and an optical device 350 fabricated based on the processes shown in FIGS. 3A and 3C may include elements similar to those included in the optical device 100 fabricated based on the processes shown in FIGS. 1A-1D. Descriptions of the similar steps and similar elements can refer to the descriptions rendered above in connection with FIGS. 1A-1D. Although the substrate and films or layers are shown as having flat surfaces, in some embodiments, the substrate and films or layers formed thereon may include curved surfaces.

As shown in FIG. 3A, two substrates 105 may be assembled to form a cell 310 with a predetermined cell gap. For example, the two substrates 105 may be bonded to each other via an adhesive 312, e.g., optical adhesive, to form the cell 310. At least one (e.g., each) of the two substrates 105 may be provided with the alignment structure 110. The alignment structure 110 may provide any suitable alignment pattern corresponding to a predetermined in-plane orientation pattern, such as an in-plane orientation pattern with uniform orientations, periodic or non-periodic linear orientations, periodic or non-periodic radial orientations, periodic or non-periodic azimuthal orientations, or a combination thereof, etc. In some embodiments, the alignment structures 110 disposed at the respective substrates 105 may provide parallel alignments (e.g., planar or homogeneous alignments with parallel alignment directions), anti-parallel alignments (e.g., planar or homogeneous alignments with anti-parallel alignment directions), twisted nematic alignments (e.g., planar or homogeneous alignments with twisted alignment directions), orthogonal alignments (e.g., planar or homogeneous alignments with orthogonal alignment directions), vertical alignments, or hybrid alignments (e.g., a homogeneous alignment and a vertical alignment), etc.

At least one of the two substrates 105 may be provided with an absorbing film 305 that includes an absorbing additive. The absorbing additive may be similar to the absorbing additive used in the processes shown in FIGS. 1A-1D. In some embodiments, the absorbing additive may be uniformly distributed in the film plane to provide a uniform absorption of the radiation within the film plane of the absorbing film 305. In some embodiments, the absorbing additive may be non-uniformly distributed within the film plane to provide a non-uniform absorption (or an absorption variation) of the radiation within the film plane. The non-uniformly distribution of the absorbing additive means that different amounts or concentrations of the absorbing additive are distributed at different portions of the absorbing film 305 within the film plane. The non-uniform distribution may also be referred to as a concentration variation, meaning that local concentration of the absorbing additive may be different at different portions. The non-uniform distribution may follow a non-uniform distribution profile (or pattern), or the concentration may follow a non-uniform concentration profile (or pattern).

In some embodiments, the absorbing film 305 and the alignment structure 110 may be disposed at different surfaces of the substrate 105. For example, the absorbing film 305 and the alignment structure 110 may be disposed at an outer surface (the upper surface in FIG. 3A) and an inner surface (the lower surface in FIG. 3A) of the substrate 105, respectively. In some embodiments, the absorbing film 305 and the alignment structure 110 may be disposed at the same surface of the substrate 105 (e.g. at the inner surface of the substrate 105), and the absorbing film 305 may be disposed between the substrate 105 and the alignment structure 110. For discussion purposes, FIG. 3A shows that the absorbing film 305 is disposed at the outer surface of the upper substrate 105. In some embodiments, the two substrates 105 may not be provided with a conductive electrode layer. In some embodiments, at least one of the two substrates 105 may also be provided with a conductive electrode layer. For example, in some embodiments, two conductive electrode layers may be disposed at the inner surfaces of the respective substrates 110, respectively. In some embodiments, two conductive electrode layers may be disposed at the inner surface of the same substate 110.

After the cell 310 is assembled as shown in FIG. 3A, a photo-sensitive material 315 may be filled into the space between the two substrates 105 to form a photo-sensitive material layer (also referred to as 315 for discussion purposes), as shown in FIG. 3B. As shown in FIG. 3B, the photo-sensitive material layer 315 may include first surface 315-1, where the radiation 144 may be incident onto the photo-sensitive material layer 315. Thus, the first surface 315-1 may also be referred to as a light incidence surface 315-1. The photo-sensitive material layer 315 may include a second surface 315-2 disposed opposing the first surface 315-1. The photo-sensitive material 315 may include a mixture of a birefringent material and a photo-initiator for polymerization. The birefringent material and the photo-initiator for polymerization may be similar to the birefringent material and the photo-initiator for polymerization used in the processes shown in FIGS. 1A-1D, respectively. In some embodiments, the photo-sensitive material 315 may also include other ingredients, such as chiral dopants, active LCs, and/or surfactants, etc. The cell 310 filled with the photo-sensitive material 315 may be exposed to the radiation 144, and the photo-sensitive material layer 315 may be polymerized to form a polymer layer 317 with a predetermined birefringence variation.

In the embodiment shown in FIG. 3B, the radiation 144 may be generated via the projector 150 shown in FIG. 1C or the photomask 155 shown in FIG. 1D. In some embodiments, the radiation 144 may be configured with a predetermined 1D intensity variation or 2D intensity variations in one or two dimensions within the wavefront. In some embodiments, the absorbing film 305 may include the absorbing additive uniformly distributed to provide a uniform absorption of the radiation 144 within the film plane of the absorbing film 305. The absorbing film 305 may uniformly reduce the intensity of the radiation 144 when the radiation 144 propagates through the absorbing film 305.

Due to the 1D intensity variation or 2D intensity variations of the radiation 144 after passing through the absorbing film 305, the fabricated polymer layer 317 may have a predetermined 1D birefringence variation or 2D birefringence variations within the film plane of the polymer layer 317.

In addition, as the absorbing film 305 provides a uniform absorption of the radiation 144, the absorbing film 305 may uniformly attenuate the intensity of the radiation 144 by a predetermined attenuation percentage (e.g., 20%, 30%, or 40%, etc.) while transmitting the radiation 144 toward the photo-sensitive material layer 315. The attenuation percentage indicates a degree of attenuation provided by the absorbing film 305 to the radiation 144. That is, at any point of the absorbing film 305, if the local initial (or input) intensity of the radiation 144 incident onto the point is 1.0, the absorbing film 305 may reduce the local intensity by 20% while transmitting the of the radiation 144. Thus, the radiation 144 output from the corresponding point of the absorbing film 305 toward the photo-sensitive material layer 315 may have a reduced local intensity of 0.8. Note that the local intensity values used herein are for example only and are not actual intensity values.

The intensity of the radiation 144 at the light incidence surface 315-1 of the photo-sensitive material layer 315 may be configured in a controllable manner to be any suitable and desirable reduced intensity (for example, reduced by 80%, 70%, 60%, etc., from its initial intensity). This can be achieved, in part, by configuring the degree of attenuation provided by the absorbing film 305. The degree of attenuation provided by the absorbing film 305 may be set by configuring the amount of absorbing additive (such as a concentration of the absorbing additive) in the absorbing film 305. Here, for discussion purposes, the intensity of the radiation 144 output from the absorbing film 305 is presumed to be the same as the intensity of the radiation 144 at the light incidence surface 315-1 of the photo-sensitive material layer 315. For example, the absorbing film 305 may be configured with a uniform distribution of the absorbing additive, such that the local intensity (i.e., intensity at each local point) of the radiation 144 at the light incidence surface 315-1 of the photo-sensitive material layer 315 is reduced to about 80% of the initial local intensity of the radiation 144 when incident onto the absorbing film 305.

For different applications, different absorbing films 315 with different concentrations of the absorbing additive may be used to provide different attenuation percentages for the radiation 144, thereby providing different reduced intensities of the radiation 144 at the light incidence surface 315-1. For example, in one application, the absorbing film 305 may be configured with a first concentration of absorbing additive, such that the attenuation percentage of the absorbing film 305 may be 20%. For the radiation 144 having an initial local intensity 1.0, the reduced local intensity at the light incidence surface 315-1 may be 0.8. In another application, the absorbing film 305 may be configured with a second, different concentration of absorbing additive, such that the attenuation percentage of the absorbing film 305 may be 40%. For the radiation 144 having an initial local intensity 1.0, the reduced local intensity at the light incidence surface 315-1 may be 0.6.

In some embodiments, the photo-sensitive material layer 315 may be substantially thick, and there may be a non-negligible natural decay of the intensity of the radiation 144 when the radiation 144 propagates through the photo-sensitive material layer 315. For example, if the local intensity of the radiation 144 at the light incidence surface 315-1 is 0.8, the local intensity of the radiation 144 in the thickness direction as the radiation 144 propagates from the first surface 315-1 to the second surface 315-2 may decrease from 0.8 to 0.4 (decreased by 50% at the second surface 315-2). The natural decrease of the local intensity of the radiation 144 from 0.8 to 0.4 along the straight line in the thickness direction may follow a continuous, linear or non-linear relationship, which may be determined once the material and the dimension of the photo-sensitive material layer 315 are determined. With the absorbing film 305 including an amount (or a concertation) of the absorbing additive that can be configured or adjusted, the local intensity of the radiation 144 at the light incidence surface 315-1 may be controlled. Thus, the local intensity variation of the radiation 144 in the thickness direction of the photo-sensitive material layer 315 may be controlled.

For example, through changing the concentration of the absorbing additive in the absorbing film 305 from the first concentration to the second centration, the local intensity of the radiation 144 at the light incidence surface 315-1 may be controlled or reduced from, for example, 0.8 to 0.6. Thus, the local intensity variation of the radiation 144 within the photo-sensitive material layer 315 in the thickness direction may be adjusted from the range of from 0.8 to 0.4 to a range of from 0.6 to 0.3. When the intensity variation of the radiation 144 in the thickness direction of the photo-sensitive material layer 315 is configured to be within different ranges, the resulting birefringence variations in the thickness direction of the fabricated polymer layer 317 may be different. For example, when an intensity variation of the radiation 144 in the thickness direction of the photo-sensitive material layer 315 is in a range from 0.8 to 0.4, the birefringence variation in the thickness direction of the fabricated polymer layer 317 may be in a range from 0.1 to 0.2. When the intensity variation of the radiation 144 in the thickness direction of the photo-sensitive material layer 315 is configured to be in a range from 0.6 to 0.3, the birefringence variation in the thickness direction of the fabricated polymer layer 317 may be in a range from 0.15 to 0.25 (note that these values are not actual values, and are only example numbers for discussion purposes).

Thus, by configuring the amount (or concentration) of the absorbing additive in the absorbing film 305, the intensity variation of the radiation 144 in the thickness direction of the photo-sensitive material layer 315 may be suitably controlled according to a specific birefringence variation to be achieved. Thus, the birefringence variation of the radiation 144 in the thickness direction of the fabricated polymer layer 317 may be suitably controlled according to a specific optical performance to be achieved. That is, the birefringence variation in the thickness direction of the fabricated polymer layer 317 may be configured or adjusted in a controllable manner by configuring the amount (or concentration) of the absorbing additive in the absorbing film 305.

When the fabricated polymer layer 317 includes two predetermined birefringence variations in two directions within the film plane, or in one direction within the film plane and in the thickness direction, the fabricated polymer layer 317 includes 2D birefringence variations. When the fabricated polymer layer 317 includes predetermined birefringence variations in two directions within the film plane and in the thickness direction, the fabricated polymer layer 317 includes 3D birefringence variations.

In some embodiments, when the photo-sensitive material layer 315 is substantially thin, the attenuation of the radiation 144 caused by the photo-sensitive material layer 315 may be negligible. In such an embodiment, the fabricated polymer layer 317 may have a uniform birefringence in the thickness direction.

In the embodiment shown in FIG. 3C, the cell 310 filled with the photo-sensitive material 315 may be exposed to a radiation 344 having a uniform intensity within the wavefront, and the photo-sensitive material layer 315 may be polymerized to form a polymer layer 357 with at least one predetermined birefringence variation. The absorbing film 305 may provide a predetermined absorption variation of the radiation 344 in one or more directions within the film plane of the absorbing film 305. For example, the absorbing additive in the absorbing film 305 may be non-uniformly distributed in one or more directions within the film plane of the absorbing film 305. That is, the absorbing additive may have a predetermined concentration variation in one or more directions within the film plane of the absorbing film 305. As a result, the absorbing film 305 may transmit the uniform radiation 344 to a non-uniform radiation 346 with an intensity variation caused by the non-uniform distribution of the absorbing additive. The intensity variation of the non-uniform radiation 346 may be in one or more directions within the wavefront of the radiation 346. Thus, the fabricated polymer layer 357 may have one or more predetermined birefringence variation in one or more directions within the film plane of the polymer layer 357.

In addition, as the absorbing film 305 absorbs the uniform radiation 344 with the predetermined absorption variation and transmits the uniform radiation 344 as the non-uniform radiation 346, the local intensities of the non-uniform radiation 346 at the light incidence surface (or first surface) 315-1 of the photo-sensitive material layer 315 may be configured (i.e., reduced) to any desirable and suitable values. In some embodiments, the photo-sensitive material layer 315 may be substantially thick. As the non-uniform radiation 346 propagates inside the photo-sensitive material layer 315 along the thickness direction, the local intensities of the non-uniform radiation 346 may be naturally decreased due to the beam attenuation caused by the absorption, reflection, and/or scattering, etc., by the photo-sensitive material layer 315. By configuring the absorbing film 305 to have different predetermined absorption variations, local intensities of the non-uniform radiation 346 at the light incidence surface 315-1 of the photo-sensitive material layer 315 may be configured in a controlled manner in different applications.

For example, when a local concentration of the absorbing additive in the absorbing film 305 is a first local concentration, a local intensity of the non-uniform radiation 346 at the first surface 315-1 of the photo-sensitive material layer 315 may be 0.8, and may be reduced to 0.4 (reduced to 50%) at the second surface 315-2 due to the nature attenuation by the photo-sensitive material layer 315. When the local concentration of the absorbing additive at the same point of the absorbing film 305 is changed to a second, different local concentration, a local intensity of the non-uniform radiation 346 at the light incidence surface 315-1 of the photo-sensitive material layer 315 may be 0.6, and may be reduced to 0.3 (reduced to 50%) at the second surface 315-2 due to the nature attenuation by the photo-sensitive material layer 315. Thus, in different applications, different local concentrations of the absorbing additive at the same point of the absorbing film 305 may result in different local intensities for the radiation 346 at the light incidence surface 315-1 at the same point on the light incidence surface 315-1. As a result of the change to the local intensity of the radiation 346 at the light incidence surface 315-1 at the same point on the light incidence surface 315-1, the local intensity variations of the radiation 346 in the thickness direction of the photo-sensitive material layer 315 as the radiation 346 propagates therein may be changed. Thus, the local intensity variations of the radiation 346 in the thickness direction of the fabricated polymer layer 357 may be changed. When the fabricated polymer layer 357 includes predetermined birefringence variations in two directions within the film plane, or in one direction within the film plane and in the thickness direction, the fabricated polymer layer 357 includes predetermined 2D birefringence variations. When the fabricated polymer layer 357 includes predetermined birefringence variations in two directions within the film plane and in the thickness direction, the fabricated polymer layer 357 includes predetermined 3D birefringence variations.

In some embodiments, when the photo-sensitive material layer 315 is substantially thin, the attenuation of the non-uniform radiation 346 caused by the photo-sensitive material layer 315 may be negligible. In such an embodiment, the fabricated polymer layer 317 may have a uniform birefringence in the thickness direction.

In some embodiments, referring to FIGS. 3B and 3C, the substrate 105 and/or the alignment structure 110 may be used to fabricate, store, or transport the fabricated optical device 300 or 350. In some embodiments, the substrate 105 and/or the alignment structure 110 may be removed from the optical device 300 or 350. In some embodiments, the absorbing film 305 may be removed from the optical device 300 or 350 after the optical device 300 or 350 is fabricated or transferred to another optical device.

Figure 4A:
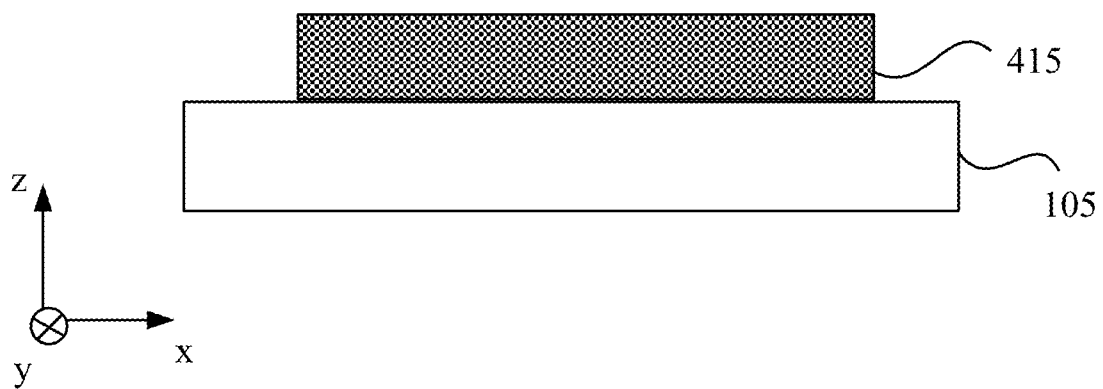
FIGS. 4A-4C schematically illustrate processes for birefringence patterning, according to various embodiments of the present disclosure.
Figure 4B:
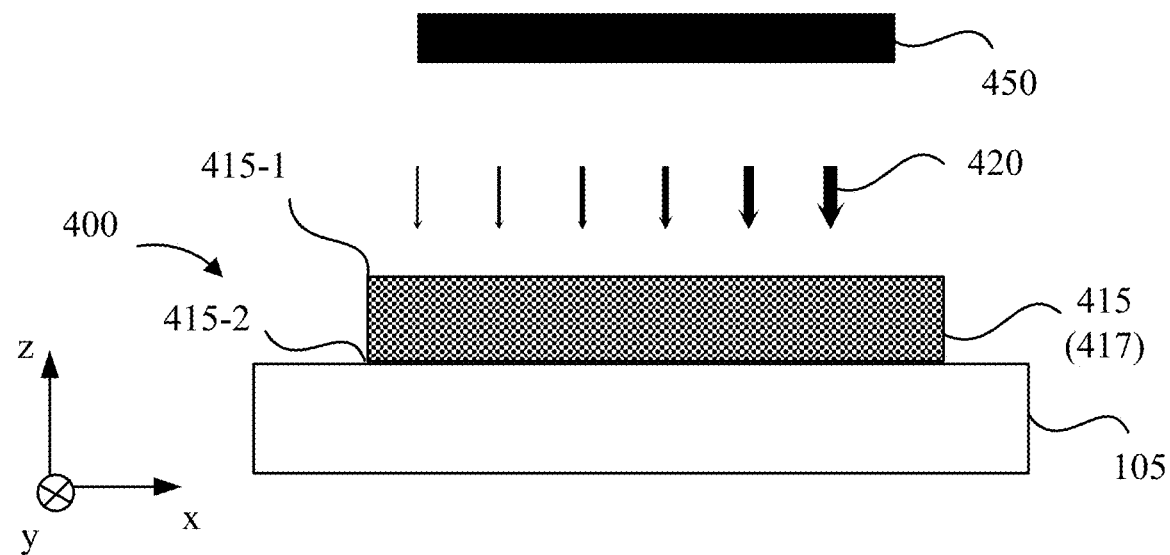
Figure 4C:
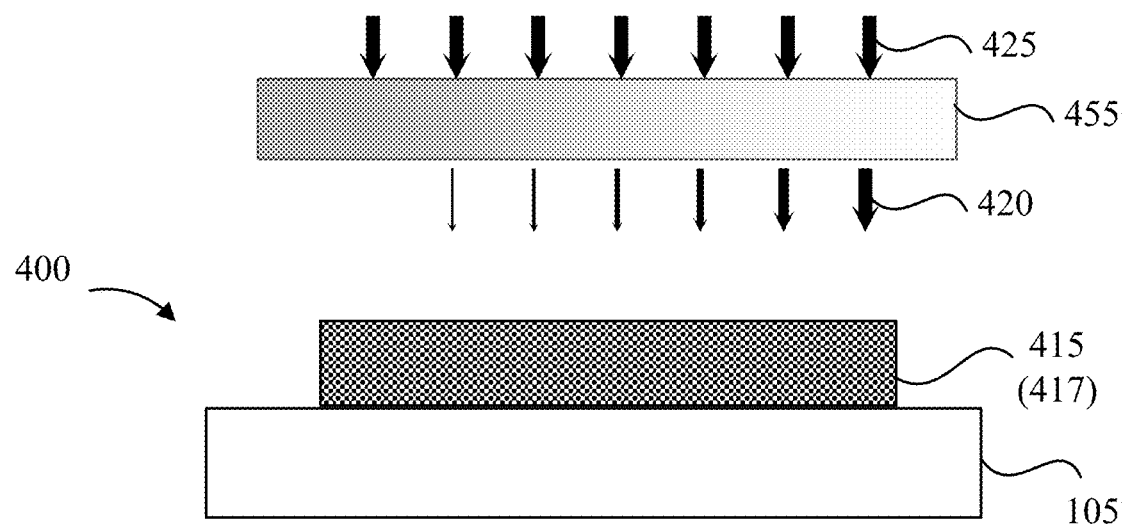
Figure 4C:
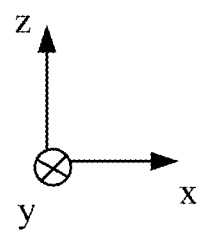

FIGS. 4A-4C schematically illustrate processes for birefringence patterning, according to various embodiments of the present disclosure. The processes shown in FIGS. 4A-4C may include steps or processes similar to those shown in FIGS. 1A-1D, or FIGS. 3A-3C. An optical device 400 fabricated based on the processes shown in FIGS. 4A-4C may include elements similar to those included in the optical device 100 fabricated based on the processes shown in FIGS. 1A-1D, the optical device 300 fabricated based on the processes shown in FIGS. 3A and 3B, or the optical device 350 fabricated based on the processes shown in FIGS. 3A and 3C. Descriptions of the similar steps and similar elements can refer to the descriptions rendered above in connection with FIGS. 1A-1D or FIGS. 3A-3C. Although the substrate and films or layers are shown as having flat surfaces, in some embodiments, the substrate and films or layers formed thereon may include curved surfaces.

As shown in FIG. 4A, a photo-sensitive medium layer 415 may be formed on a surface, such as a top surface, of the substrate 105. The photo-sensitive medium layer 415 may include multiple ingredients. In some embodiments, the ingredients of the photo-sensitive medium layer 415 may be dissolved in a solvent to form a solution. The solution may be dispensed on the substrate 105 using a suitable process, e.g., spin coating, slot coating, blade coating, spray coating, or jet (ink-jet) coating or printing. The solvent may be removed from the coated solution using a suitable process, e.g., drying, or heating. As shown in FIG. 4B, the photo-sensitive medium layer 415 may be exposed to a polarized radiation 420 (or polarized light radiation).

In some embodiments, the photo-sensitive medium layer 415 may include a photo-sensitive material and an absorbing additive. In some embodiments, the photo-sensitive material may include a photo-sensitive polymer and a photosensitizer. In some embodiments, the photo-sensitive medium layer 415 may also include other ingredients. The photosensitizer may include molecules that absorb the energy of the polarized radiation 420, and function as donors by transferring the energy to acceptor molecules (e.g., molecules of the photo-sensitive polymer). The photo-sensitive polymer may generate a photo-induced optical anisotropy and/or a photo-induced optic axis orientation when subjected to the polarized radiation 420. In some embodiments, the molecules of the photo-sensitive polymer may include one or more polarization sensitive photo-reactive groups embedded in a main polymer chain or a side polymer chain. In some embodiments, the polarization sensitive photo-reactive group may include an azobenzene group, a cinnamate group, or a coumarin group, etc. In some embodiments, the photo-sensitive polymer may include an amorphous polymer, or an LC polymer, etc. In some embodiments, the amorphous polymer may be initially optically isotropic prior to being exposed to the polarized radiation 420, and may exhibit a photo-induced optical anisotropy after being exposed to the polarized radiation 420. In some embodiments, the LC polymer may have a polarization sensitive cinnamate group embedded in a side polymer chain. In some embodiments, when the photo-sensitive polymer includes the LC polymer, the photo-sensitive medium layer 415 after undergoing the polarized radiation 420 may be heat treated (e.g., annealed) in a temperature range corresponding to a liquid crystalline state of the LC polymer to enhance the photo-induced optical anisotropy of the LC polymer (not shown in FIG. 4B).

The polarized radiation 420 may have a wavelength range within an absorption band of the photosensitizer. That is, the polarized radiation 420 may have a wavelength range corresponding to UV, violet, blue, or green lights. For discussion purposes, the wavelength or the wavelength range of the polarized radiation 420 may be referred to as a recording wavelength or recording wavelength range. The polarized radiation 420 may provide a 3D polarization field within a predetermined space, in which the photo-sensitive medium layer 415 is disposed.

In some embodiments, the polarized radiation 420 may have 3D spatially uniform orientations (or polarization directions) of linear polarizations within the predetermined space. For example, the polarized radiation 420 may be linearly polarized with a fixed polarization direction. In some embodiments, the polarized radiation 420 may have 3D spatially varying orientations (or polarization directions) of linear polarizations within the predetermined space. In some embodiments, the 3D spatially varying orientations (or polarization directions) of linear polarizations may be generated by two coherent, circularly polarized beams with opposite handednesses that are incident onto the photo-sensitive medium layer 415 from the same side. In some embodiments, the 3D spatially varying orientations (or polarization directions) of linear polarizations may be generated by two coherent, circularly polarized beams with the same handedness that are incident onto the photo-sensitive medium layer 415 from different sides.

Under the polarized radiation 420, a photo-alignment of the polarization sensitive photo-reactive groups may occur within (or inside) a volume of the photo-sensitive medium layer 415. Thus, a 3D polarization field of the polarized radiation 420 may be directly recorded within (or inside) the volume of the photo-sensitive medium layer 415. In other words, the photo-sensitive medium layer 415 may be optically patterned, via the polarized radiation 420, to form a patterned polymer layer (referred to as 417 in FIG. 4B for discussion purpose) with a photo-induced optical anisotropy. In some embodiments, 3D orientation patterns of an optic axis of the patterned polymer layer 417 may be defined after being subjected to the polarized radiation 420. Such an alignment procedure shown in FIG. 4B may be referred to as a bulk-mediated photo-alignment.

The absorbing additive may be configured to absorb the polarized radiation 420. The absorbing additive may be different from the photosensitizer. The absorbing additive may not chemically react with the photo-sensitive polymer. In some embodiments, the absorbing additive may be uniformly distributed within the photo-sensitive medium layer 415 at a predetermined concentration. Thus, the photo-sensitive medium layer 415 may have a uniform absorption of the polarized radiation 420 across the photo-sensitive medium layer 415. In some embodiments, the absorbing additive may be non-uniformly distributed within the photo-sensitive medium layer 415. Thus, the photo-sensitive medium layer 415 may have a non-uniform absorption of the polarized radiation 420 across the photo-sensitive medium layer 415. For example, the absorbing additive may have a predetermined concentration variation within a film plane (e.g., the x-y plane in FIG. 4A) of the photo-sensitive medium layer 415, and/or along a thickness direction (e.g., the z-axis direction in FIG. 4A) of the photo-sensitive medium layer 415. In some embodiments, the absorbing additive may absorb a UV, violet, blue, and/or green light. That is, an absorptive band of the absorbing additive may include the UV, violet, blue, and/or green spectrum. In some embodiments, the absorbing additive may include radiation absorbing dyes.

Inventors have observed that the photo-induced birefringence of the patterned polymer layer 417 may depend on an intensity of the polarized radiation 420 (referred to as a recording intensity), a polarization of the polarized radiation 420, and a time duration of the polarized radiation 420 (referred to as a recording time). When the recording time is constant across the photo-sensitive medium layer 415 and the polarization of the polarized radiation 420 remains the same during the recording process, the photo-induced birefringence of the patterned polymer layer 417 may depend on the recording intensity. Thus, different recording intensities at different portions of the photo-sensitive medium layer 415 may result in different photo-induced birefringences, thereby generating a 1D birefringence variation, 2D birefringence variations, or 3D birefringence variations.

For different photo-sensitive polymers in the photo-sensitive medium layer 415, the photo-induced birefringence of the patterned polymer layer 417 may vary with the recording intensity in different manners. For example, for some photo-sensitive polymers, a relatively higher exposure intensity may result in a relatively higher photo-induced birefringence in the fabricated polymer layer 417. For some birefringent materials, a relatively higher exposure intensity may result in a relatively lower photo-induced birefringence in the fabricated polymer layer 417. For some birefringent materials, both of a relatively high exposure intensity and a relatively low exposure intensity may result in a relatively low photo-induced birefringence in the fabricated polymer layer 417, whereas a relatively medium exposure intensity may result in a relatively high photo-induced birefringence of the fabricated polymer layer.

In some embodiments, a photo-induced birefringence variation within a film plane (e.g., the x-y plane) of the patterned polymer layer 417 perpendicular to a thickness direction (e.g., the z-axis direction) of the patterned polymer layer 417 may be generated through configuring the recording intensity variation within a film plane (e.g., the x-y plane) of the photo-sensitive medium layer 415 perpendicular to a thickness direction (e.g., the z-axis direction) of the photo-sensitive medium layer 415. The birefringence variation within the film plane of the patterned polymer layer 417 means that local birefringences at respective portions within the film plane of the patterned polymer layer 417 may be different. In some embodiments, a photo-induced birefringence variation along the thickness direction of the patterned polymer layer 417 may be generated through configuring the recording intensity variation along the thickness direction of the photo-sensitive medium layer 415. The birefringence variation along the thickness direction of the patterned polymer layer 417 means that local birefringences at different portions along the thickness direction of the patterned polymer layer 417 may be different.

Thus, through controlling the exposure intensity variation in at least one of a film plane (e.g., the x-y plane) of the photo-sensitive medium layer 415 or a thickness direction (e.g., the z-axis direction) of the photo-sensitive medium layer 415, at least one of the birefringence variation in the film plane or the thickness direction of the polymer layer 417 may be generated. In some embodiments, through controlling the exposure intensity variation in both the film plane (e.g., the x-y plane) and the thickness direction (e.g., the z-axis direction) of the photo-sensitive medium layer 415, 2D or 3D birefringence variations of the polymer layer 417 may be generated. For example, when the exposure intensity varies in two perpendicular directions within the film plane and in the thickness direction, 3D birefringence variations may be generated in the polymer layer 417. When the exposure intensity varies in one direction within the film plane and in the thickness direction, 2D birefringence variations may be generated in the polymer layer 417. In some embodiments, the exposure intensity may only vary in one direction within the film plane, or only vary in the thickness direction. This may result in a 1D birefringence variation in the polymer layer 417.

In some embodiments, as shown in FIGS. 4B and 4C, the recording intensity variation within the film plane of the photo-sensitive medium layer 415 may be generated through configuring the intensity variation of the polarized radiation 420 within the wavefront. Referring to FIG. 4B, the polarized radiation 420 may be configured with a predetermined 1D intensity variation or 2D intensity variations in one or two dimensions within the wavefront. The predetermined 1D intensity variation or 2D intensity variations within the wavefront means that local intensities at different portions of the wavefront may be different. For discussion purposes, FIG. 4B shows that the polarized radiation 420 has a planar wavefront configured with a predetermined 1D intensity variation along the x-axis direction. FIG. 4B shows that the polarized radiation 420 is represented by arrows, in which the thinner arrow indicates a lower intensity, and the thicker arrow indicates a higher intensity. For discussion purposes, FIG. 4B shows that the intensity of the polarized radiation 420 increases in the +x-axis direction in a gradient manner. The gradient manner may be a linearly gradient manner, a non-linearly gradient manner, a stepped gradient manner, or a suitable combination thereof, etc. Thus, the recording intensity within the film plane of the photo-sensitive medium layer 415 may increase in the +x-axis direction.

The polarized radiation 420 with the predetermined 1D intensity variation or 2D intensity variations may be generated via any suitable methods. In some embodiments, as shown in FIG. 4B, the polarized radiation 420 with the predetermined 1D intensity variation or 2D intensity variations may be generated via a projector 450, such as a DMD projector, or an SLM projector, etc. The projector 450 may be configured to project an image light representing a computer-generated image onto the photo-sensitive medium layer 415. The computer-generated image may be a polarized image (i.e., the image light may be polarized), and configured with any suitable 1D intensity variation or 2D intensity variations in one or two dimensions within the image (i.e., the image light may have 1D intensity variation or 2D intensity variations). The intensity variation of the image light representing the computer-generated image means that local intensities at different portions of the image may be different. The computer-generated image may be configured with at least two different levels of intensities at two different portions of the image. The computer-generated image may have a wavelength range within the absorption band of the photosensitizer. For example, the image light representing the computer-generated image may be a UV, violet, blue, or green light. The image light representing the computer-generated image may function as the polarized radiation 420.

In some embodiments, referring to FIG. 4C, the polarized radiation 420 with the predetermined 1D intensity variation or 2D intensity variations within the wavefront may be generated via a photomask 455. The photomask 455 may be configured with a predetermined transmittance variation for the wavelength spectrum of the polarized radiation 420. For example, the photomask 455 may have a predetermined 1D transmittance variation or 2D transmittance variations in one or two dimensions within a film plane (e.g., the x-y plane shown in FIG. 4C) of the photomask 455 perpendicular to a thickness direction (e.g., the z-axis direction shown in FIG. 4C) of the photomask 455. The transmittance variation of the photomask 455 means that local transmittances at different portions of the photomask 455 may be different. For example, the photomask 455 may be configured with a predetermined 1D transmittance variation or 2D transmittance variations for a UV, violet, blue, or green light within the plane of the photomask 455. Thus, the photomask 455 may transform a light 425, such as a polarized radiation 425 (or polarized light radiation) having a spatially uniform intensity, into the polarized radiation 420 with the predetermined 1D intensity variation or 2D intensity variations. The polarized radiation 420 output from the photomask 455 may propagate towards the photo-sensitive medium layer 415, such that the photo-sensitive medium layer 415 is exposed to the polarized radiation 420.

In some embodiments, the photomask 455 may be a binary half-tone photomask that uses two levels of grey tones. For example, the photomask 455 may include optically opaque regions with a relatively low transmittance and optically transparent regions with a relatively high transmittance. In some embodiments, the photomask 455 may be a grey-tone photomask that uses at least three levels of grey tones, providing at least three different levels of transmission, such as 0%, 25%, 50%, 75%, and 100%, etc. In FIG. 4C, the transmittance of the photomask 455 is represented by grey scales, in which the darker grey indicates a lower transmittance, and the lighter grey indicates a higher transmittance. For discussion purposes, FIG. 4C shows that the transmittance of the photomask 455 gradually increases in the +x-axis direction. Thus, the recording intensity within the film plane of the photo-sensitive medium layer 415 may increase in the +x-axis direction.

In some embodiments, although not shown, the polarized radiation 420 may be configured with a uniform intensity within the wavefront. The recording intensity variation within the film plane of the photo-sensitive medium layer 415 may be generated through configuring a corresponding absorption variation within the film plane of the photo-sensitive medium layer 415. In some embodiments, the distribution of the absorbing additive within the film plane of the photo-sensitive medium layer 415 may follow a predetermined concentration variation. That is, the amount of the absorbing additive concentrated (or local concentrations of the absorbing additive) at different portions in one or more directions within the film plane may be different. For example, the concentration or amount of the absorbing additive within the film plane of the photo-sensitive medium layer 415 may be configured to decrease in the +x-axis direction and. Thus, the exposing intensity within the film plane of the photo-sensitive medium layer 115 may increase in the +x-axis direction.

In some embodiments, referring to FIGS. 4B and 4C, the recording intensity along the thickness direction of the photo-sensitive medium layer 415 may be generated through configuring an absorption variation of the polarized radiation 420 along the thickness direction of the photo-sensitive medium layer 415. The absorption variation of the polarized radiation 420 along the thickness direction may be generated through configuring the composition, the concentration, and/or the concentration variation of the absorbing additive along the thickness direction.

Thus, when the polarized radiation 420 propagates inside the photo-sensitive medium layer 415 along the thickness direction thereof, the intensity of the polarized radiation 420 may vary in a controlled manner along the thickness direction. The thickness direction refers to a direction from a light incidence surface (e.g., a first surface) 415-1 to a light exiting surface (e.g., a second surface) 415-2 of the photo-sensitive medium layer 415. Thus, after the recording process via the polarized radiation 420, the resulting birefringence along the thickness direction of the patterned polymer layer 417 may vary in a controlled manner. For example, along the thickness direction of the photo-sensitive medium layer 415, the intensity of the polarized radiation 420 may decrease in a predetermined gradient manner, such as a predetermined linearly gradient manner, a predetermined non-linearly gradient manner, a predetermined stepped gradient manner, or a suitable combination thereof. After the recording process via the polarized radiation 420, along the thickness direction, the birefringence of the patterned polymer layer 417 may increase in a predetermined gradient manner. In some embodiments, the birefringence along the thickness direction of the patterned polymer layer 417 may first increase in a predetermined gradient manner, then decrease in another predetermined gradient manner.

In conventional processes of recording a 3D polarization field into a photo-sensitive medium layer (or conventional processes of bulk-mediated photo-alignment) to form a patterned polymer layer, the photo-sensitive medium layer may be optically patterned via a polarized radiation (or polarized light radiation) with a uniform intensity across the wavefront. In addition, the photo-sensitive medium layer may not include an absorbing additive to adjust the absorption variation of the polarized radiation within the photo-sensitive medium layer. When the ingredients of the photo-sensitive medium layer are fixed, the attenuation coefficient of the photo-sensitive medium layer may be constant. Thus, the intensity variation of the polarized radiation along the thickness direction of the photo-sensitive medium layer may not be controllable or adjustable.

Compared to the conventional processes, through configuring the intensity variation of the polarized radiation 420, to which the photo-sensitive medium layer 415 is exposed, the disclosed processes shown in FIGS. 4A-4C may provide more flexibility to control the birefringence variation in at least one of the film plane or the thickness direction of the patterned polymer layer 417. In some embodiments, the disclosed processes shown in FIGS. 4A-4C may provide controllable 1D, 2D, or 3D birefringence patterning, such that the fabricated patterned polymer layer 417 has a predetermined 1D birefringence variation, 2D birefringence variations, or 3D birefringence variations. An optical device 400 including the patterned polymer layer 417 with the predetermined 1D birefringence variation, 2D birefringence variations, or 3D birefringence variations may provide a spatially varying optical response.

In some embodiments, the substrate 105 may be used to fabricate, store, or transport the fabricated optical device 400. In some embodiments, the substrate 105 may be detachable or removable from the fabricated optical device 400 after the optical device 400 is fabricated or transported to another place or device. That is, the substrate 105 may be used in fabrication, transportation, and/or storage to support the optical device 400 provided on the substrate 105, and may be separated or removed from the optical device 400 when the fabrication of the optical device 400 is completed, or when the optical device 400 is to be implemented in an optical device. In some embodiments, the substrate 105 may not be separated from the optical device 400.

In some embodiments, the absorbing additive may not be mixed with the photo-sensitive material, which includes the photo-sensitive polymer and the photosensitizer mixed together, to form a photo-sensitive medium layer. Instead, the photo-sensitive material and the absorbing additive may form two individual layers, which may be stacked together. For example, in some embodiments, the photo-sensitive material may form a first sub-layer of the photo-sensitive medium layer, and the absorbing additive may from a second sub-layer of the photo-sensitive medium layer. The first sub-layer and the second sub-layer may be stacked together. In some embodiments, the first sub-layer may be in direct contact with the second sub-layer. In some embodiments, the first sub-layer may be spaced apart from the second sub-layer, e.g., via an insulation film, e.g., a substate.

Figure 5A:
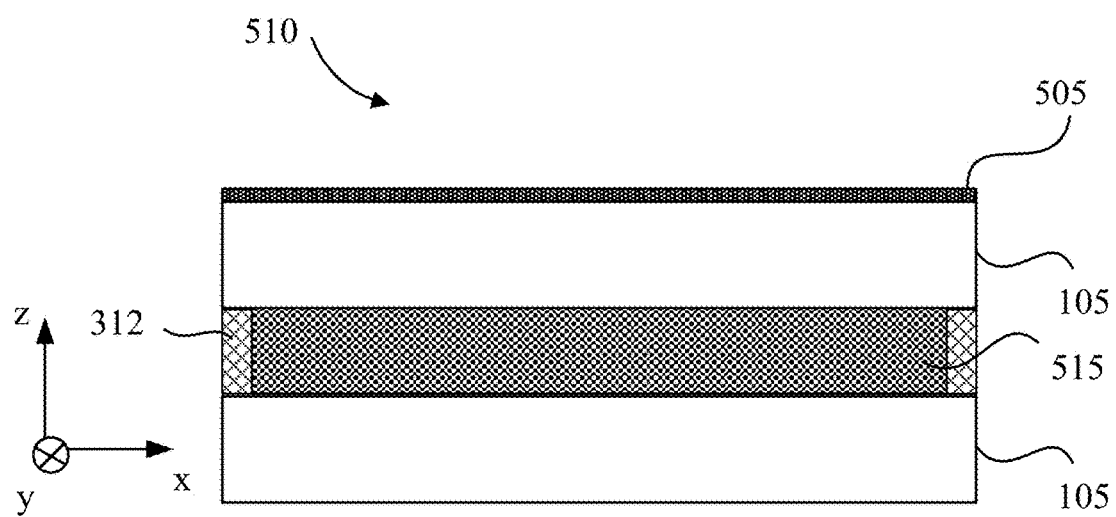
FIGS. 5A-5C schematically illustrate processes for birefringence patterning, according to various embodiments of the present disclosure.
Figure 5B:
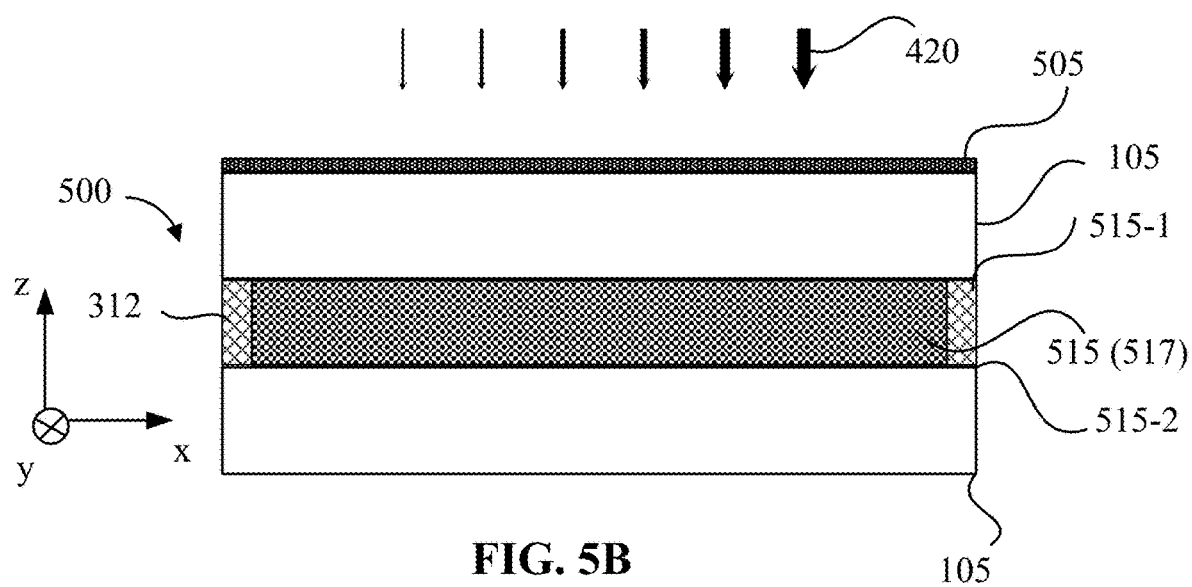
Figure 5C:
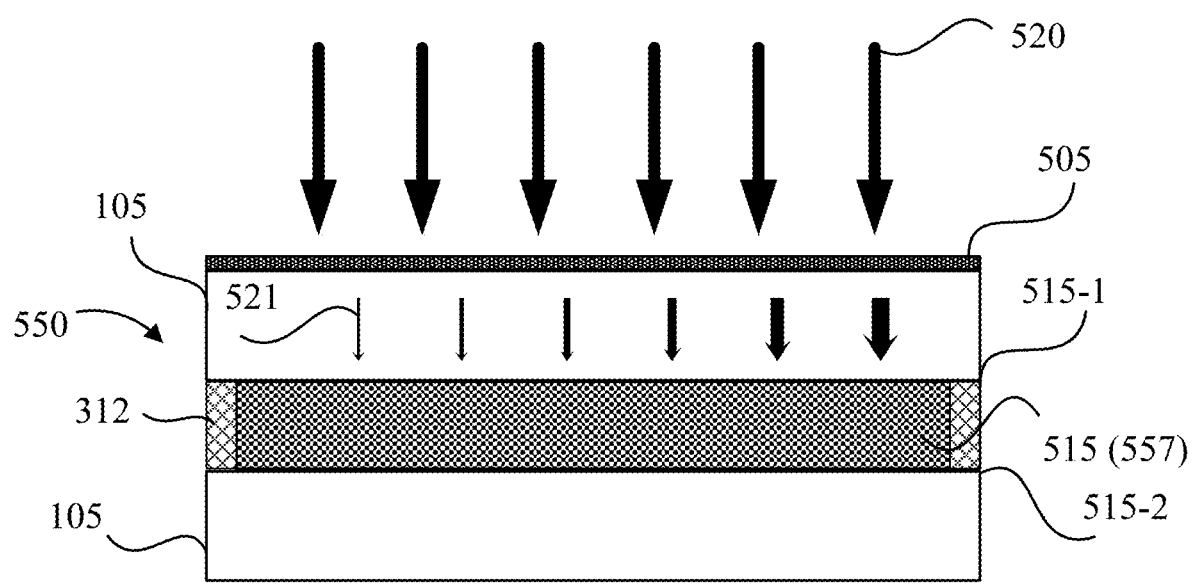
Figure 5C:
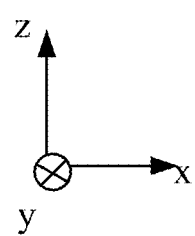

FIGS. 5A-5C schematically illustrate processes for birefringence patterning, according to various embodiments of the present disclosure. The processes shown in FIGS. 5A-5C may include steps similar to those shown in FIGS. 1A-1D, FIGS. 3A-3C, or FIGS. 4A-4C. An optical device 500 fabricated based on the processes shown in FIGS. 5A and 5B, and an optical device 550 fabricated based on the processes shown in FIGS. 5A and 5C may include elements similar to those included in the optical device 100 fabricated based on the processes shown in FIGS. 1A-1D, the optical device 300 fabricated based on the processes shown in FIGS. 3A and 3B, the optical device 350 fabricated based on the processes shown in FIGS. 3A and 3C, or the optical device 400 fabricated based on the processes shown in FIGS. 4A-4C. Descriptions of the similar steps and similar elements can refer to the descriptions rendered above in connection with FIGS. 1A-1D, FIGS. 3A-3C, or FIGS. 4A-4C. Although the substrate 105 and films or layers are shown as having flat surfaces, in some embodiments, the substrate and films or layers formed thereon may include curved surfaces.

As shown in FIG. 5A, two substrates 105 may be assembled to form a cell 510 with a predetermined cell gap. For example, the two substrates 105 may be bonded to each other via an adhesive 312 (e.g., optical adhesive 312) to form the cell 510. At least one of the two substrates 105 may be provided with an absorbing film 505 that includes an absorbing additive. The absorbing additive may be similar to the absorbing additive used in the processes shown in FIGS. 4A-4C.

In some embodiments, the absorbing film 505 may provide a uniform absorption of the polarized radiation within the film plane of the absorbing film 505. For example, the absorbing additive may be configured to be uniformly distributed within the absorbing film 505 at a predetermined concentration. In some embodiments, the absorbing film 505 may provide a non-uniform absorption (or an absorption variation) of the polarized radiation in the film plane of the absorbing film 505. For example, the absorbing additive may be non-uniformly distributed within the radiation absorbing film 505, e.g., having a predetermined concentration variation in one or more directions within a film plane (e.g., the x-y plane in FIG. 5A) of the absorbing film 505. The absorbing film 505 may be disposed at an outer surface or an inner surface of the substrate 105. For discussion purposes, FIG. 5A shows that the absorbing film 505 is disposed at the outer surface of the upper substrate 105.

After the cell 510 is assembled, as shown in FIG. 5B, a photo-sensitive material 515 may be filled into the space between the two substrates 105 to form a photo-sensitive material layer (also referred to as 515 for discussion purposes). The photo-sensitive material 515 may include a mixture of a photo-sensitive polymer and a photosensitizer. The photo-sensitive polymer and the photosensitizer may be similar to the photo-sensitive polymer 415 and the photosensitizer used in the processes shown in FIGS. 4A-4C, respectively. The cell 510 with the photo-sensitive material layer 515 may be exposed to the polarized radiation 420 for the recording process, and may be optically patterned as a patterned polymer layer 517 with at least one predetermined birefringence variation in at least one of a direction within the film plane or a thickness direction.

In the embodiment shown in FIG. 5B, the polarized radiation 420 may be generated via the projector 450 shown in FIG. 4B or the photomask 455 shown in FIG. 4C. The polarized radiation 420 may be configured with a predetermined 1D intensity variation or 2D intensity variations in one or two dimensions within the wavefront. The absorbing film 505 may include the absorbing additive uniformly distributed to provide a uniform absorption of the polarized radiation 420 within the film plane of the absorbing film 505. The absorbing film 505 may uniformly reduce the intensity of the polarized radiation 420 while transmitting the polarized radiation 420. Due to the 1D intensity variation or 2D intensity variations in the polarized radiation 420 exiting the absorbing film 505, the fabricated polymer layer 517 may also have a predetermined birefringence variation in one or two dimensions within the film plane.

In addition, as the absorbing film 505 uniformly attenuates the intensity of the radiation 420 by a predetermined attenuation percentage (e.g., 20%, 30%, 40%, or 50%, etc.) while transmitting the polarized radiation 420 toward the photo-sensitive material layer 515. Thus, the intensity of the polarized radiation 420 at a light incidence surface (or a first surface) 515-1 of the photo-sensitive material layer 515 may be configured by changing the configuration of the absorbing film 505 (e.g., changing the amount (or concentration) of the absorbing additive included therein). For example, when the predetermined attenuation percentage of the absorbing film 505 is 20%, the local intensities of the polarized radiation 420 at the light incidence surface 515-1 of the photo-sensitive material layer 515 may be about 80% of the local intensities of the polarized radiation 420 before incident onto the absorbing film 505.

In some embodiments, the photo-sensitive material layer 515 may be substantially thick. As the polarized radiation 420 propagates inside the photo-sensitive material layer 515 along the thickness direction, the intensity of the polarized radiation 420 may decrease mostly due to the beam attenuation, e.g., absorption, reflection, and/or scattering, etc., caused by the photo-sensitive material layer 515. Due to the configured local intensities of the polarized radiation 420 at the light incidence surface 515-1 of the photo-sensitive material layer 515, the polarized radiation 420 may be configured to have a controlled intensity variation in the thickness direction of the photo-sensitive material layer 515. Thus, the fabricated polymer layer 517 may also have a predetermined birefringence variation in the thickness direction. When the fabricated polymer layer 517 includes predetermined birefringence variations in two directions within the film plane and in the thickness direction, the fabricated polymer layer 517 has predetermined 3D birefringence variations.

In some embodiments, when the photo-sensitive material layer 515 is substantially thin, the attenuation of the polarized radiation 420 caused by the photo-sensitive material layer 515 may be negligible. In such an embodiment, the fabricated polymer layer 517 may have a uniform birefringence in the thickness direction.

In the embodiment shown in FIG. 5C, the cell 510 filled with the photo-sensitive material 515 may be exposed to a polarized radiation 520, and the photo-sensitive material layer 515 may be polymerized to form a polymer layer 557 with a predetermined birefringence variation. In the embodiment shown in FIG. 5C, the polarized radiation 520 may have a uniform intensity within the wavefront. The absorbing film 505 may provide a predetermined absorption variation of the polarized radiation 520 in the film plane of the absorbing film 505. For example, the absorbing additive may have a predetermined concentration variation in one or more directions within the film plane of the absorbing film 505. As a result, the absorbing film 505 may transmit the polarized radiation 520 with the uniform intensity to a polarized radiation 521 with an intensity variation within the wavefront of the polarized radiation 521. Thus, the fabricated polymer layer 557 may have one or more predetermined birefringence variations in one or more directions within the film plane of the polymer layer 557.

In addition, as the absorbing film 505 absorbs the polarized radiation 520 with the predetermined absorption variation and transmits the polarized radiation 520 with the uniform intensity as the polarized radiation 521 with the intensity variation, the local intensities of the polarized radiation 521 at a light incidence surface (or first surface) 515-1 of the photo-sensitive material layer 515 may be configured (i.e., reduced) to any desirable and suitable intensity. In some embodiments, the photo-sensitive material layer 515 may be substantially thick. As the polarized radiation 521 propagates inside the photo-sensitive material layer 515 along the thickness direction, the intensity of the polarized radiation 521 may be naturally decreased due to the beam attenuation caused by the absorption, reflection, and/or scattering, etc., by the photo-sensitive material layer 515. By configuring the absorbing film 505 to have different predetermined absorption variations, different local intensities of the polarized radiation 521 at the light incidence surface 515-1 of the photo-sensitive material layer 515 may be configured in a controlled manner in different applications. Thus, different attenuations may be caused by the photo-sensitive material layer 515 to the polarized radiation 521.

For example, when a given point at the absorbing film 505 has a first local concentration, the local intensity of the polarized radiation 521 at the light incidence surface (or first surface) 515-1 of the photo-sensitive material layer 515 may be 0.8. The polarized radiation 521 may be attenuated by the photo-sensitive material layer 515, such that the local intensity of the polarized radiation 521 at the second surface 515-2 of the photo-sensitive material layer 515 may be reduced to 0.4 (reduced to 50%). When the same point at the absorbing film 505 is changed to have a second, different local concentration, the local intensity of the polarized radiation 521 at the first surface 515-1 may be changed to 0.6. The polarized radiation 521 may be attenuated by the photo-sensitive material layer 515, such that the local intensity of the polarized radiation 521 at the second surface 515-2 may be reduced to 0.3 (reduced to 50%). Thus, in different applications, for the same given point at the absorbing film 505, different local concentrations of the absorbing additive may result in different local intensities for the polarized radiation 521 at the light incidence surface 515-1. Thus, the local intensity variations of the polarized radiation 521 in the thickness direction as the polarized radiation 521 propagates therein may be changed. Different intensity variations of the polarized radiation 521 in the thickness direction of the photo-sensitive material layer 515 may result in different birefringence variations in the thickness direction of the fabricated polymer layer 557.

When the fabricated polymer layer 517 includes two predetermined birefringence variations in two directions within the film plane, or in one direction within the film plane and in the thickness direction, the fabricated polymer layer 517 includes 2D birefringence variations. When the fabricated polymer layer 517 includes predetermined birefringence variations in two directions within the film plane and in the thickness direction, the fabricated polymer layer 517 includes 3D birefringence variations.

In some embodiments, when the photo-sensitive material layer 515 is substantially thin, the attenuation of the polarized radiation 521 caused by the photo-sensitive material layer 515 may be negligible. In such an embodiment, the fabricated polymer layer 517 may have a uniform birefringence in the thickness direction.

In some embodiments, referring to FIGS. 5B and 5C, the substrate 105 may be used to fabricate, store, or transport the fabricated optical device 500 or 550. In some embodiments, the substrate 105 may be removed from the optical device 500 or 550. In some embodiments, the absorbing film 505 may be removed from the optical device 500 or 550 after the optical device 500 or 550 is fabricated or transferred to another optical device.

FIGS. 6A-6D schematically illustrate various views of in-plane orientations of optically anisotropic molecules 612 in a polymer layer 600 with a predetermined 1D birefringence variation, 2D birefringence variations, or 3D birefringence variations, according to various embodiments of the present disclosure. The polymer layer 600 with 3D birefringence variations may be fabricated based on the processes for 1D, 2D, or 3D birefringence patterning disclosed herein, such as the processes shown in FIGS. 1A-1D, FIGS. 3A-3C, FIGS. 4A-4C, or FIGS. 5A-5C. The polymer layer 600 with a predetermined 1D birefringence variation, 2D birefringence variations, or 3D birefringence variations may be similar to the polymer layer 117, the polymer layer 317, the polymer layer 357, the polymer layer 417, the polymer layer 517, or the polymer layer 557. In some embodiments, the polymer layer 600 may include one or more materials with an intrinsic birefringence, such as polymerized (or crosslinked) LCs, polymer-stabilized LCs, photo-reactive LC polymers, or any combination thereof. The LCs may include nematic LCs, twist-bend LCs, chiral nematic LCs, smectic LCs, or any combination thereof. In some embodiments, the polymer layer 600 may include one or more materials with a photo-induced birefringence, such as an amorphous polymer, or an LC polymer, etc. In some embodiments, the polymer layer 600 may be a polarization hologram polymer layer, e.g., a liquid crystal polarization hologram polymer layer, an amorphous polymer polarization hologram layer, etc. The polymer layer 600 with a predetermined 1D birefringence variation, 2D birefringence variations, or 3D birefringence variations may function as an optical element, such as a waveplate, a lens or lens array, a grating, a prism or prism array, etc.

For discussion purposes, rod-like LC molecules 612 are used as examples of the optically anisotropic molecules 612 of the polymer layer 600. The rod-like LC molecule 612 may have a longitudinal axis (or an axis in the length direction) and a lateral axis (or an axis in the width direction). The longitudinal axis of the LC molecule 612 may be referred to as a director of the LC molecule 612 or an LC director. The LC molecule 612 may be configured with 3D orientation patterns. An orientation of the LC director may determine a local optic axis orientation or an orientation of the optic axis at a local point of the polymer layer 600. The term "optic axis" may refer to a direction in a crystal. A light propagating in the optic axis direction may not experience birefringence (or double refraction). An optic axis may be a direction rather than a single line: lights that are parallel to that direction may experience no birefringence. The local optic axis may refer to an optic axis within a predetermined region of a crystal.

For illustrative purposes, the LC molecules may be arranged with substantially small tilt angles with respect to a surface of the polymer layer 600, and the LC directors of the LC molecules 612 shown in FIGS. 6A-6D are presumed to be within a film plane of the polymer layer 600. The film plane may be parallel with at least one of a first surface or a second surface of the polymer layer 600. The film plane may be perpendicular to the thickness direction of the polymer layer 600. FIGS. 6A-6D schematically illustrate x-y sections of in-plane orientations of the LC molecules 612 within the film plane of the polymer layer 600 with 3D birefringence variations, according to various embodiments of the present disclosure.

Figure 6A:
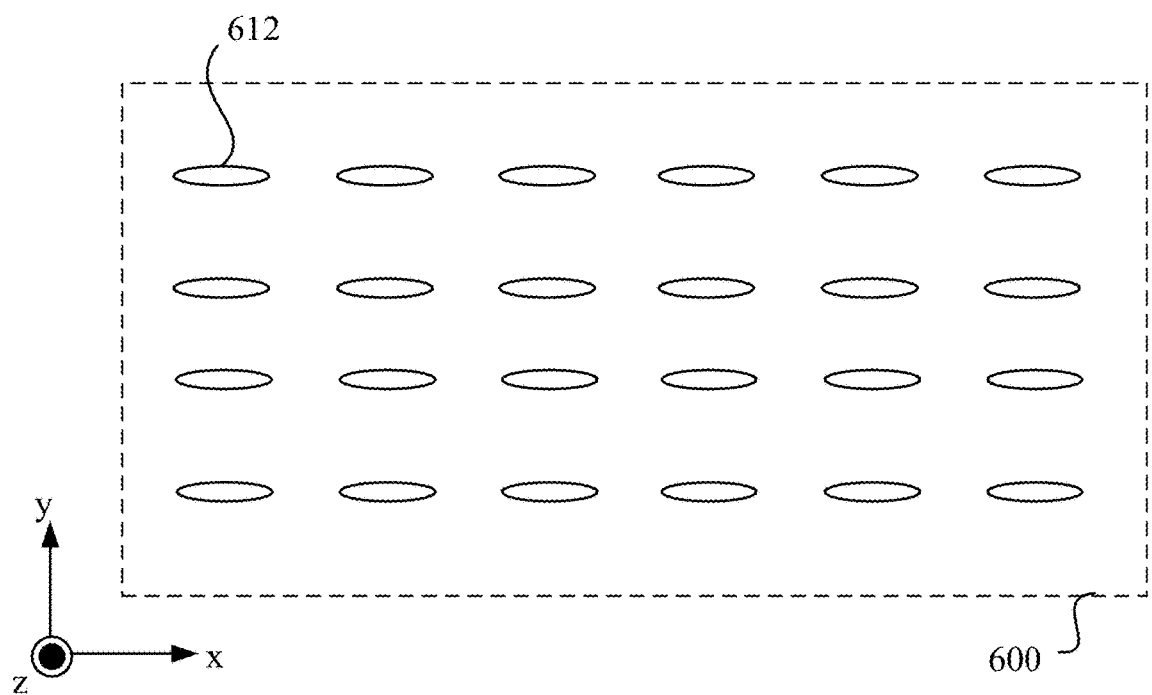
FIGS. 6A-6D schematically illustrate various views of in-plane orientations of optically anisotropic molecules in a polymer layer with a birefringence pattern, according to various embodiments of the present disclosure.

In the embodiment shown in FIG. 6A, the directors of the LC molecule 612 may have uniform orientations across the surface of the polymer layer 600, e.g., the LC molecule 612 may be aligned in the x-axis direction. In some embodiments, in a volume of the polymer layer 600, the directors of the LC molecules 612 may also have uniform orientations along the thickness direction (e.g., the z-axis direction) of the polymer layer 600. That is, the optic axis of the polymer layer 600 may have a spatially uniform orientation across the entire polymer layer 600. In some embodiments, the polymer layer 600 with the 3D birefringence variations may function as a waveplate. For a polarized light with a given wavelength, different portions of the waveplate may provide different phase retardances.

In some embodiments, the LC molecules 612 may be configured with an in-plane orientation pattern, in which the directors of the LC molecules may periodically or non-periodically vary in at least one in-plane direction. The in-plane direction may be an in-plane linear direction (e.g., an x-axis direction, a y-axis direction), an in-plane radial direction, an in-plane circumferential (e.g., azimuthal) direction, or a combination thereof. Accordingly, the optic axis of the polymer layer 600 may be configured with a spatially varying orientation in the at least one in-plane direction. In some embodiments, the directors of the LC molecules 612 may also be configured with spatially varying orientations in an out-of-plane direction, e.g., twist in a helical fashion in the out-of-plane direction. Accordingly, the optic axis of the polymer layer 600 may also be configured with a spatially varying orientation in the out-of-plane direction.

Figure 6B:
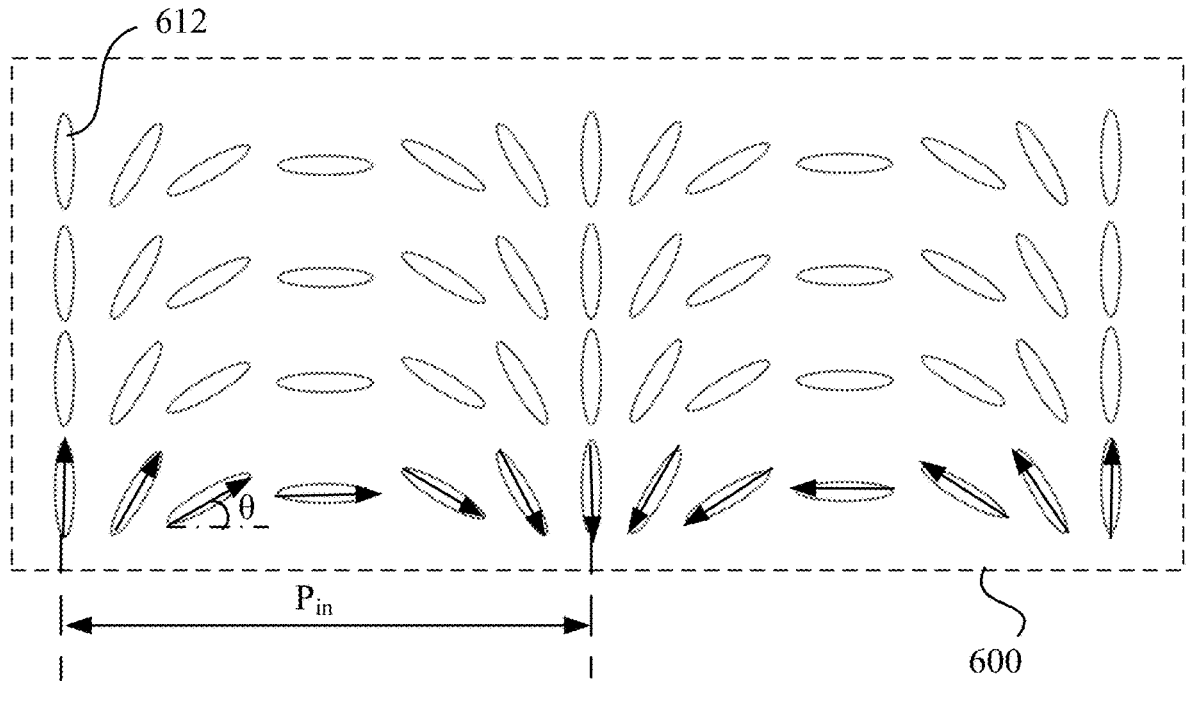

As shown in FIG. 6B, the LC molecules 612 with the film plane of the polymer layer 600 may be configured with orientations of LC directors continuously changing (e.g., rotating) in a first predetermined in-plane direction along the surface or in a film plane parallel with the surface. The first predetermined in-plane direction is the shown as the x-axis in-plane direction. The continuous rotation of orientations of the LC directors may form a periodic rotation pattern with a uniform (e.g., same) in-plane pitch $P_m$. It is noted that the first predetermined in-plane direction may be any other suitable direction along the surface (or in a film plane parallel with the surface) of the polymer layer 600, such as the y-axis direction, the radial direction, or the circumferential direction within the x-y plane. The pitch Pin along the first predetermined (or x-axis) in-plane direction may be referred to as an in-plane pitch or a horizontal pitch. The in-plane pitch may be defined as a distance along the first predetermined (or x-axis) in-plane direction over which the orientations of the LC directors exhibit a rotation by a predetermined value (e.g., 180°). The periodically varying in-plane orientations of the LC directors form a pattern, e.g., a grating pattern. Accordingly, the polymer layer 600 may function as a polarization selective grating, e.g., a Pancharatnam-Berry phase ("PBP") grating, or a polarization volume hologram ("PVH") grating, etc. For simplicity of illustration and discussion, the polymer layer 600 shown in FIG. 6B is presumed to be a 1D grating. Thus, the orientations in the y-axis direction are the same. In some embodiments, the polymer layer 600 may be a 2D grating, and the orientations in the y-axis direction may also vary.

In addition, within the film plane of the polymer layer 600, the orientations of the directors of the LC molecules 612 may exhibit a rotation in a predetermined rotation direction, e.g., a clockwise direction or a counter-clockwise direction. Accordingly, the rotation of the orientations of the directors of the LC molecules 612 within the film plane of the polymer layer 600 may exhibit a handedness, e.g., right handedness or left handedness. In the embodiment shown in FIG. 6B, within the film plane of the polymer layer 600, the orientations of the directors of the LC molecules 612 may exhibit a rotation in a clockwise direction. Accordingly, the rotation of the orientations of the directors of the LC molecules 612 within the film plane of the polymer layer 600 may exhibit a left handedness.

Although not shown, in some embodiments, within the film plane of the polymer layer 600, the orientations of the directors of the LC molecules 612 may exhibit a rotation in a counter-clockwise direction. Accordingly, the rotation of the orientations of the directors of the LC molecules 612 within the film plane of the polymer layer 600 may exhibit a right handedness. Although not shown, in some embodiments, within the film plane of the polymer layer 600, domains in which the orientations of the directors of the LC molecules 612 exhibit a rotation in a clockwise direction (referred to as domains DL), and domains in which the orientations of the directors of the LC molecules 612 exhibit a rotation in a counter-clockwise direction (referred to as domains DR) may be alternatingly arranged in at least one in-plane direction, e.g., a first (or x-axis) in-plane direction and/or a second (or y-axis) in-plane direction.

Figure 6C:
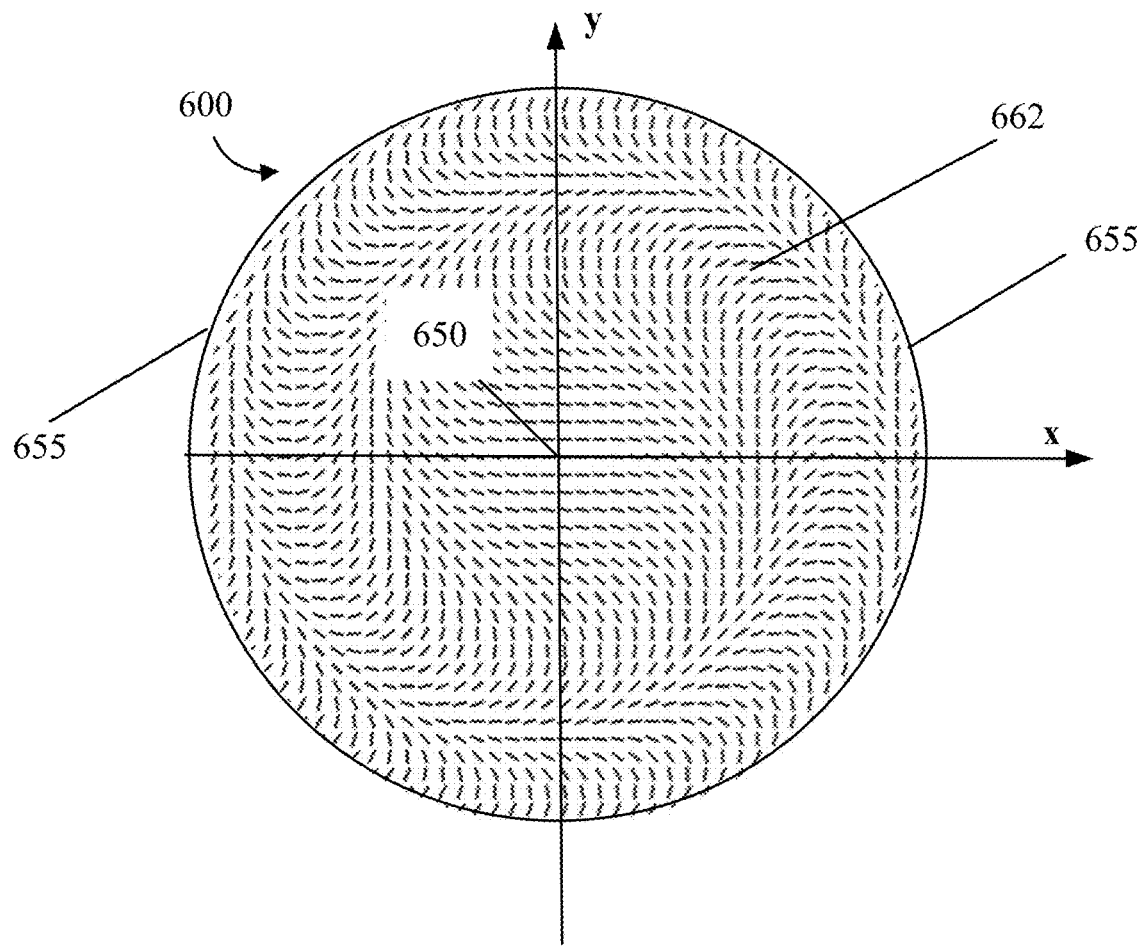
Figure 6D:
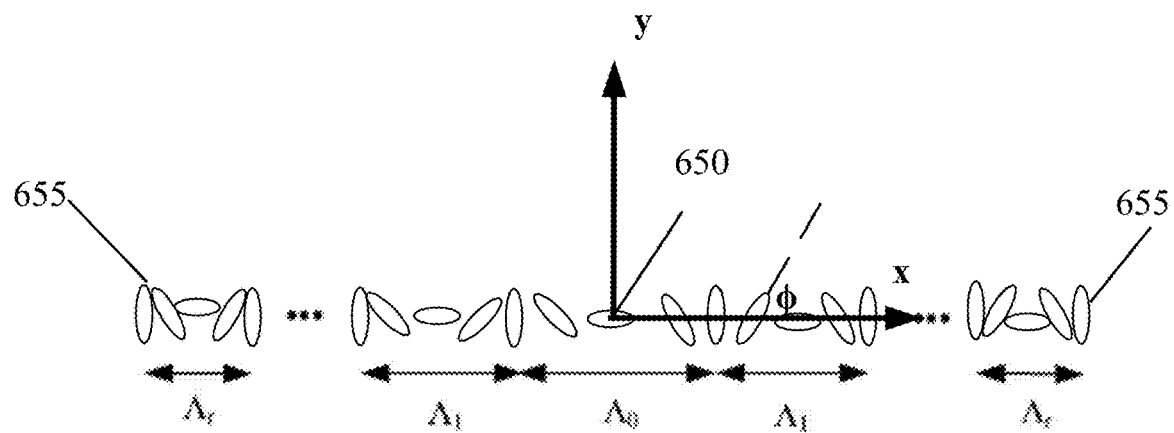

FIG. 6C schematically illustrates a radially varying in-plane orientation pattern of the LC directors of the LC molecules 612 within the film plane of the polymer layer 600. FIG. 6D illustrates a section of the in-plane orientation pattern taken along an x-axis in the polymer layer 600 shown in FIG. 6C, according to an embodiment of the present disclosure. In some embodiments, the in-plane orientation pattern of the LC directors shown in FIG. 6C may be referred to as a lens pattern. Accordingly, polymer layer 600 with the LC director orientations shown in FIG. 6C may function as a polarization selective lens, e.g., a PBP lens, or a PVH lens, etc.

As shown in FIG. 6C, the orientations of the LC molecules 612 within the film plane of the polymer layer 600 may be configured with an in-plane orientation pattern having a varying pitch in at least two opposite in-plane directions from a lens center 650 to opposite lens peripheries 655. For example, the orientations of the LC directors of LC molecules 612 within the film plane of the polymer layer 600 may exhibit a continuous rotation in at least two opposite in-plane directions (e.g., a plurality of opposite radial directions) from the lens center 650 to the opposite lens peripheries 655 with a varying pitch. The orientations of the LC directors from the lens center 650 to the opposite lens peripheries 655 may exhibit a rotation in a same rotation direction (e.g., clockwise, or counter-clockwise). A pitch A of the radial in-plane orientation pattern may be defined as a distance in the radial in-plane direction over which the orientations of the LC directors, or azimuthal angles φ of the LC molecules 612, change by a predetermined angle (e.g., 180°) from a predetermined initial state.

As shown in FIG. 6D, according to the LC director field along the x-axis direction, the pitch A may be a function of the distance from the lens center 650. The pitch Λ may monotonically decrease from the lens center 650 to the lens peripheries 655 in the at least two opposite in-plane directions (e.g., two opposite radial directions) in the x-y plane, e.g., $\Lambda_0 > \Lambda_1 > \ldots > \Lambda_r$. $\Lambda_0$ is the pitch at a central region of the lens pattern, which may be the largest. The pitch $\Lambda r$ is the pitch at a periphery region (e.g., periphery 655) of the lens pattern, which may be the smallest. In some embodiments, the azimuthal angle φ of the LC molecule 612 may change in proportional to the distance from the lens center 650 to a local point of the polymer layer 600 at which the LC molecule 612 is located.

The in-plane orientation patterns of the LC directors shown in FIGS. 6A-6D are for illustrative purposes. The polymer layer 600 may have any suitable in-plane orientation patterns of the LC directors, e.g., provided by an alignment structure (e.g., the alignment structure 110 shown in FIGS. 1A-1D and FIGS. 3A and 3B) on which the polymer layer 600 is disposed, or provided by a 3D polarization field of a polarized radiation (e.g., the polarized radiation 420 shown in FIGS. 4A-4C and FIGS. 5A and 5B).

Figure 6E:
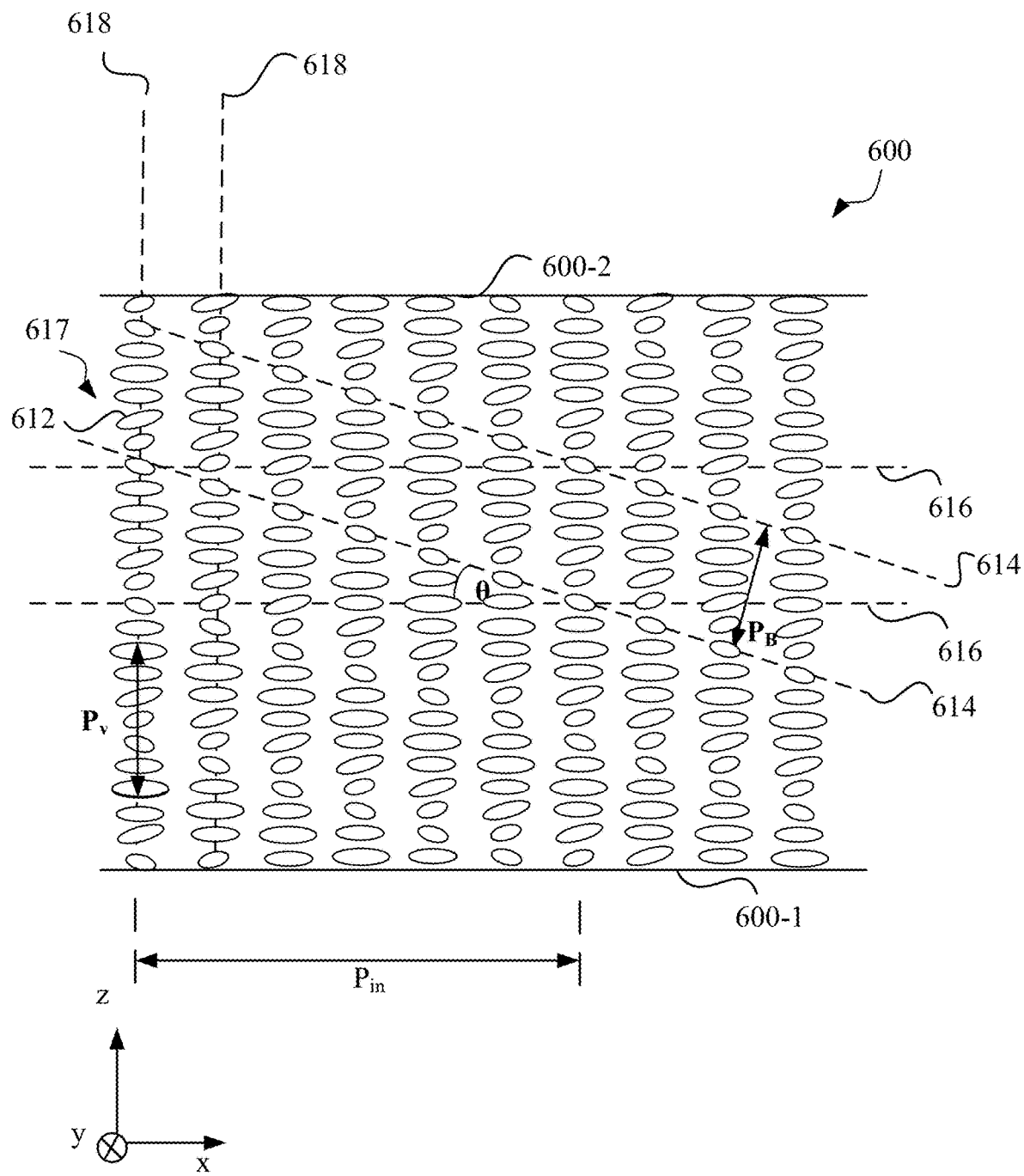
FIGS. 6E-6H schematically illustrate various views of out-of-plane orientations of optically anisotropic molecules in a polymer layer with a birefringence pattern, according to various embodiments of the present disclosure.

FIGS. 6E-6H schematically illustrate y-z sectional views of the polymer layer 600, showing out-of-plane orientations of the LC directors of the LC molecules 612 in the polymer layer 600, according to various embodiments of the present disclosure. For discussion purposes, FIGS. 6E-6H schematically illustrate out-of-plane (e.g., along z-axis direction) orientations of the LC directors of the LC molecules 612 when the in-plane (e.g., in a film plane parallel to the x-y plane) orientation pattern is a periodic in-plane orientation pattern shown in FIG. 6B. As shown in FIG. 6E, within a volume of the polymer layer 600, the LC molecules 612 may be arranged in a plurality of helical structures 617 with a plurality of helical axes 618 and a helical pitch $P_h$ along the helical axes. The azimuthal angles of the LC molecules 612 arranged along a single helical structure 617 may continuously vary around a helical axis 618 in a predetermined rotation direction, e.g., clockwise direction or counter-clockwise direction. Accordingly, the helical structure 617 may exhibit a handedness, e.g., right handedness or left handedness. The helical pitch $P_h$ may be defined as a distance along the helical axis 618 over which the orientations of the LC directors exhibit a rotation around the helical axis 618 by 360°, or the azimuthal angles of the LC molecules vary by 360°.

In the embodiment shown in FIG. 6E, the helical axes 618 may be substantially perpendicular to a first surface 600-1 and/or a second surface 600-2 of the polymer layer 600. In other words, the helical axes 618 of the helical structures 617 may be in a thickness direction (e.g., a z-axis direction) of the polymer layer 600. That is, the LC molecules 612 may have substantially small tilt angles (including zero degree tilt angles), and the LC directors of the LC molecules 612 may be substantially orthogonal to the helical axis 618. The polymer layer 600 may have a vertical pitch $P_v$, which may be defined as a distance along the thickness direction of the polymer layer 600 over which the orientations of the LC directors of the LC molecules 612 exhibit a rotation around the helical axis 618 by 180° (or the azimuthal angles of the LC directors vary by 180°). In the embodiment shown in FIG. 6E, the vertical pitch $P_v$ may be half of the helical pitch $P_h$.

Further, the LC molecules 612 from the plurality of helical structures 617 having a first same orientation (e.g., same tilt angle and azimuthal angle) may form a first series of parallel refractive index planes 614 periodically distributed within the volume of the polymer layer 600. Although not labeled, the LC molecules 612 with a second same orientation (e.g., same tilt angle and azimuthal angle) different from the first same orientation may form a second series of parallel refractive index planes periodically distributed within the volume of the polymer layer 600. Different series of parallel refractive index planes may be formed by the LC molecules 612 having different orientations. In the same series of parallel and periodically distributed refractive index planes 614, the LC molecules 612 may have the same orientation and the refractive index may be the same. Different series of refractive index planes 614 may correspond to different refractive indices. When the number of the refractive index planes 614 (or the thickness of the polymer layer 600) increases to a sufficient value, Bragg diffraction may be established according to the principles of volume gratings. Thus, the periodically distributed refractive index planes 614 may also be referred to as Bragg planes 614. In some embodiments, as shown in FIG. 6E, the refractive index planes 614 may be slanted with respect to the first surface 600-1 or the second surface 600-2. In some embodiments, the refractive index planes 614 may be perpendicular to or parallel with the first surface 600-1 or the second surface 600-2. Within the polymer layer 600, there may exist different series of Bragg planes. A distance (or a period) between adjacent Bragg planes 614 of the same series may be referred to as a Bragg period $P_B$. The different series of Bragg planes formed within the volume of the polymer layer 600 may produce a varying refractive index profile that is periodically distributed in the volume of the polymer layer 600. The polymer layer 600 may diffract an input light substantially satisfying a Bragg condition via Bragg diffraction.

As shown in FIG. 6E, the polymer layer 600 may also include a plurality of LC molecule director planes (or molecule director planes) 616 arranged in parallel with one another within the volume of the polymer layer 600. An LC molecule director plane (or an LC director plane) 616 may be a plane formed by or including the LC directors of the LC molecules 612. In the example shown in FIG. 6E, the LC directors in the LC director plane 616 have different orientations, i.e., the orientations of the LC directors vary in the x-axis direction. The Bragg plane 614 may form an angle θ with respect to the LC molecule director plane 616. In the embodiment shown in FIG. 6E, the angle θ may be an acute angle, e.g., 0°<θ<90°. The polymer layer 600 having the in-plane orientation pattern shown in FIG. 6B and the out-of-plane orientation pattern FIG. 6E may function as a transmissive PVH element, e.g., a transmissive PVH grating.

Figure 6F:
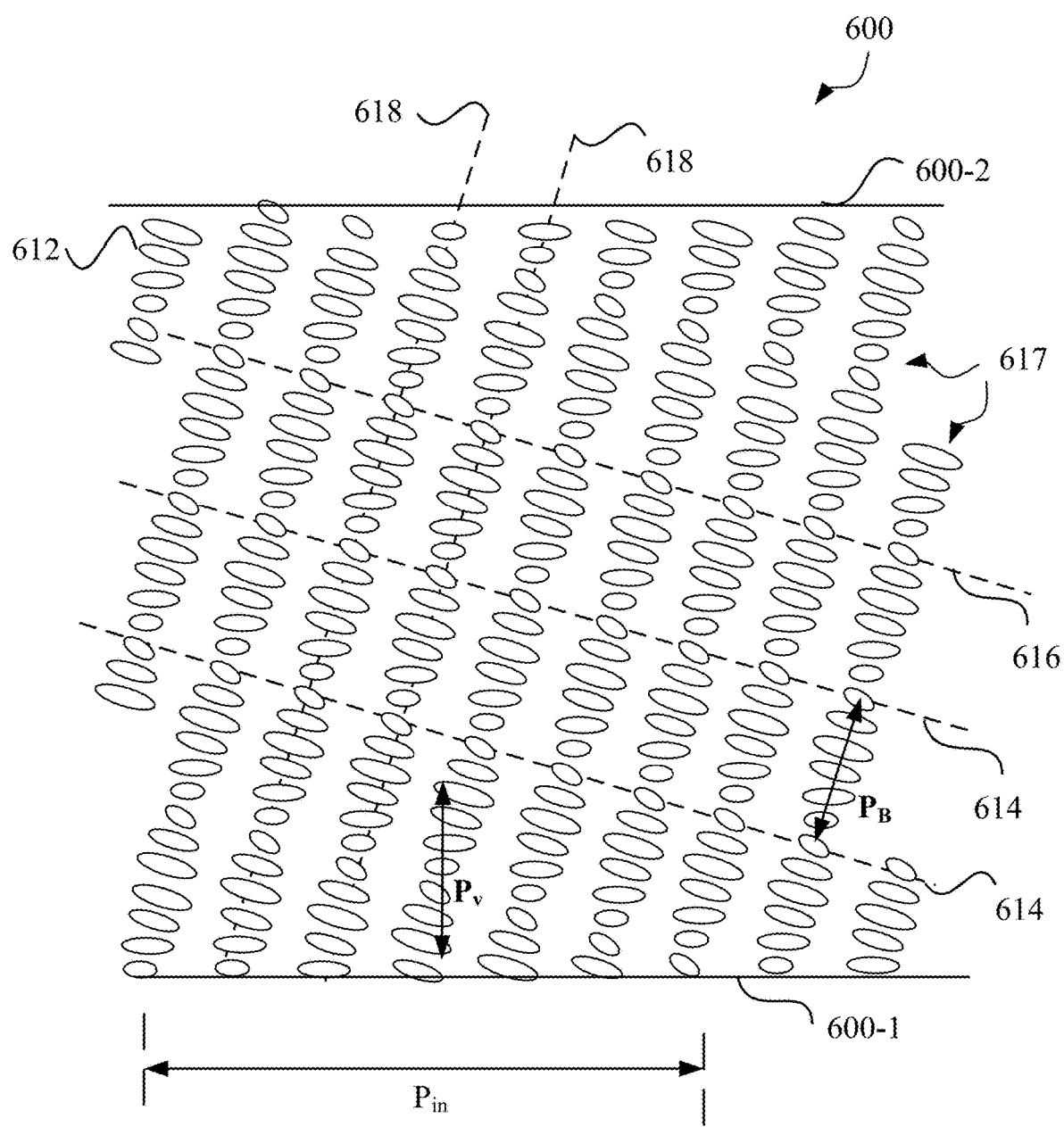
Figure 6F:
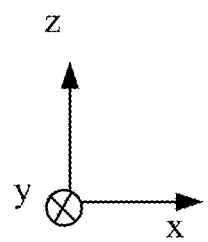

In the embodiment shown in FIG. 6F, the helical axes 618 of helical structures 617 may be tilted with respect to the first surface 600-1 and/or the second surface 600-2 of the polymer layer 600 (or with respect to the thickness direction of the polymer layer 600). For example, the helical axes 618 of the helical structures 617 may have an acute angle or obtuse angle with respect to the first surface 600-1 and/or the second surface 600-2 of the polymer layer 600. In some embodiments, the LC directors of the LC molecule 612 may be substantially orthogonal to the helical axes 618 (i.e., the tilt angle may be substantially zero degree). In some embodiments, the LC directors of the LC molecule 612 may be tilted with respect to the helical axes 618 at an acute angle. The polymer layer 600 may have a vertical periodicity (or pitch) $P_v$. In the embodiment shown in FIG. 6F, an angle θ (not shown) between the LC director plane 616 and the Bragg plane 614 may be substantially 0° or 180°. That is, the LC director plane 616 may be substantially parallel with the Bragg plane 614. In the example shown in FIG. 6F, the orientations of the directors in the molecule director plane 616 may be substantially the same. The polymer layer 600 having the in-plane orientation pattern shown in FIG. 6B and the out-of-plane orientation pattern FIG. 6F may function as a reflective PVH element, e.g., a reflective PVH grating.

Figure 6G:
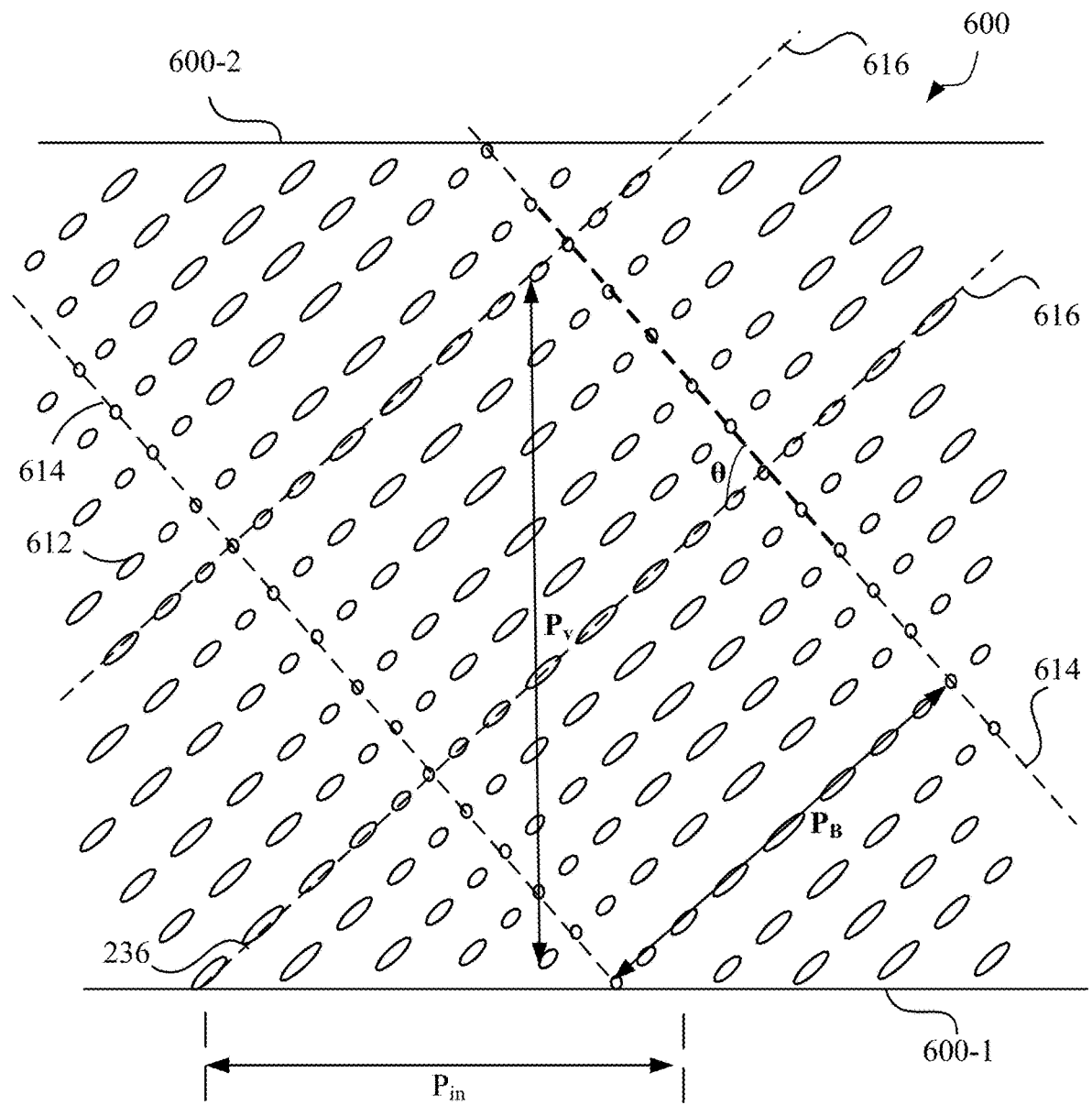
Figure 6G:
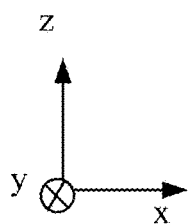

In the embodiment shown in FIG. 6G, the LC molecules 612 may not be arranged in the helical structures. An angle θ between the LC director plane 616 and the Bragg plane 614 may be a substantially right angle, e.g., θ=90°. That is, the LC director plane 616 may be substantially orthogonal to the Bragg plane 614. In the example shown in FIG. 6G, the LC directors in the LC director plane 616 may have different orientations. The polymer layer 600 having the in-plane orientation pattern shown in FIG. 6B and the out-of-plane orientation pattern FIG. 6G may function as a transmissive PVH element, e.g., a transmissive PVH grating.

Figure 6H:
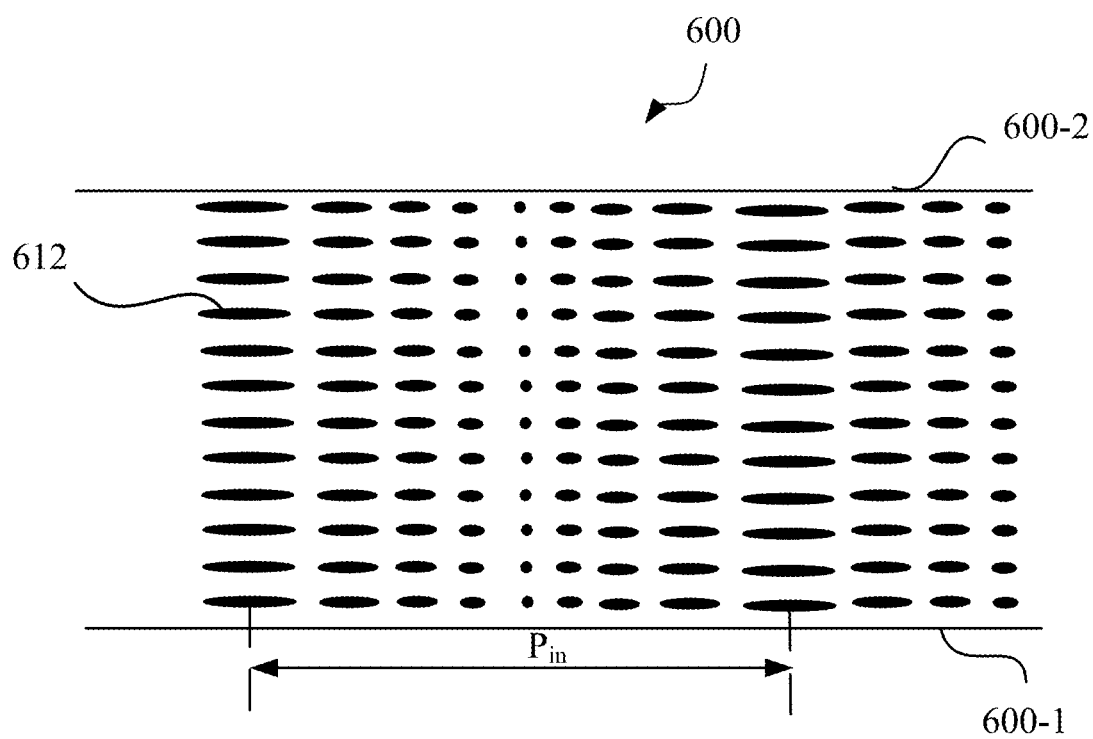
Figure 6H:
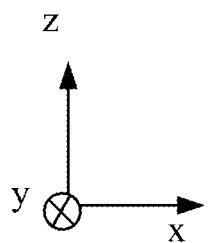

In the embodiment shown in FIG. 6H, in a volume of the polymer layer 600, along the thickness direction (e.g., the z-axis direction) of the polymer layer 600, i.e., from the first surface 600-1 to the second surface 600-2 of the polymer layer 600, the directors (or the azimuth angles) of the LC molecules 612 may have the same orientation (or same angle value). In some embodiments, the thickness of the polymer layer 600 may be configured as $d=\lambda/(2*\Delta n)$, where $\lambda$ is a design wavelength, $\Delta n$ is the in-plane birefringence of the polymer layer 600. The polymer layer 600 having the in-plane orientation pattern shown in FIG. 6B and the out-of-plane orientation pattern FIG. 6H may function as a PBP element, e.g., a PBP grating.

Figure 7A:
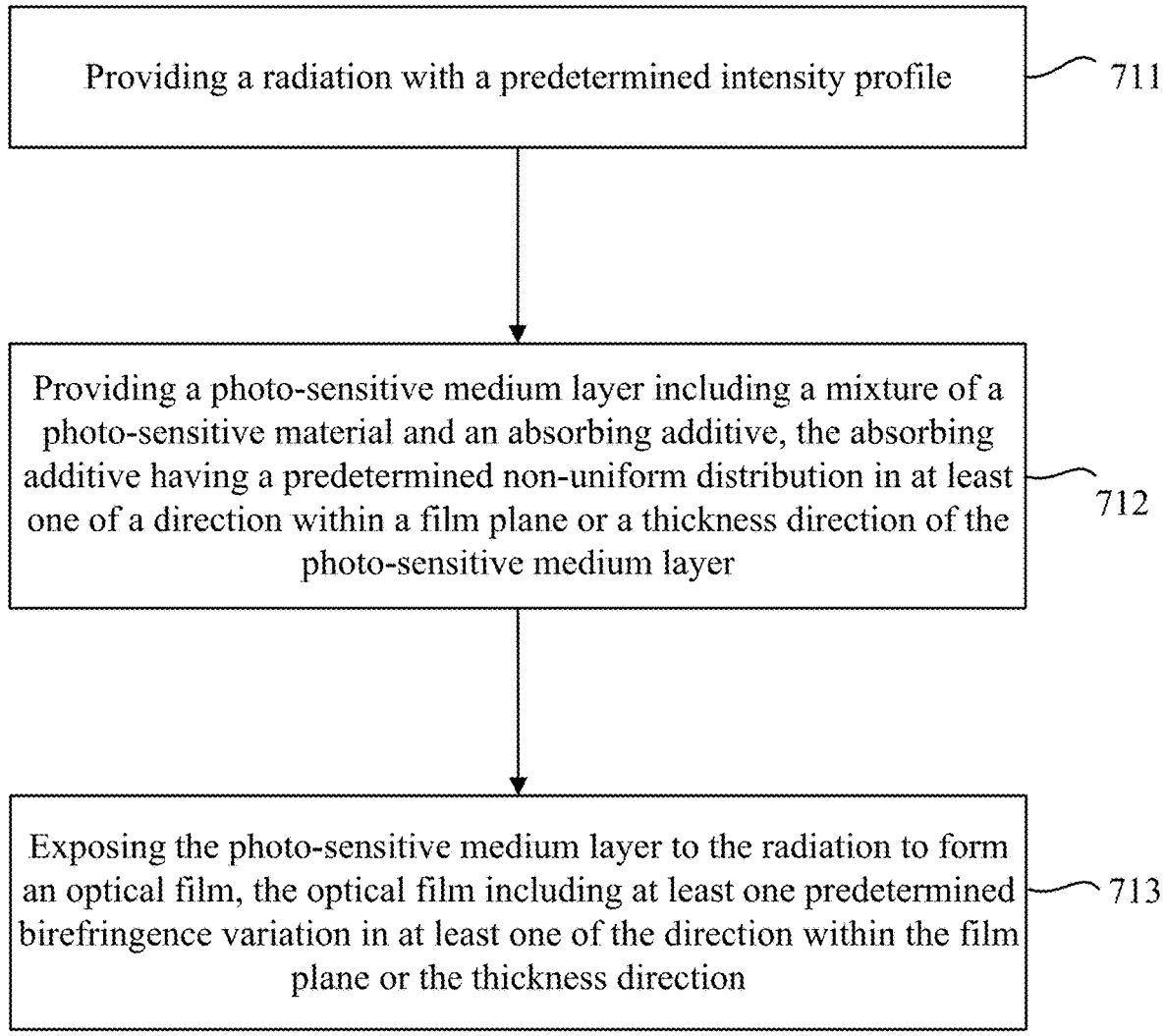
FIGS. 7A-7C are flowcharts illustrating methods for fabricating an optical film with a birefringence pattern, according to various embodiments of the present disclosure.

FIG. 7A is a flowchart illustrating a method 705 for fabricating an optical film with a predetermined birefringence variation, according to an embodiment of the present disclosure. As shown in FIG. 7A, the method 705 may include providing a radiation with a predetermined intensity profile (step 711). The method 705 may also include providing a photo-sensitive medium layer including a mixture of a photo-sensitive material and an absorbing additive, the absorbing additive having a predetermined non-uniform distribution in at least one of a direction within a film plane or a thickness direction of the photo-sensitive medium layer (step 712). The predetermined non-uniform distribution of the absorbing additive is configured to result in a predetermined non-uniform absorption of the radiation. The method 700 may also include exposing the photo-sensitive medium layer to the radiation to form an optical film, the optical film including at least one predetermined birefringence variation in at least one of the direction within the film plane or the thickness direction (step 713). The method 705 may include other steps not listed in the flowchart, including those processes described above in connection with other figures.

Figure 7B:
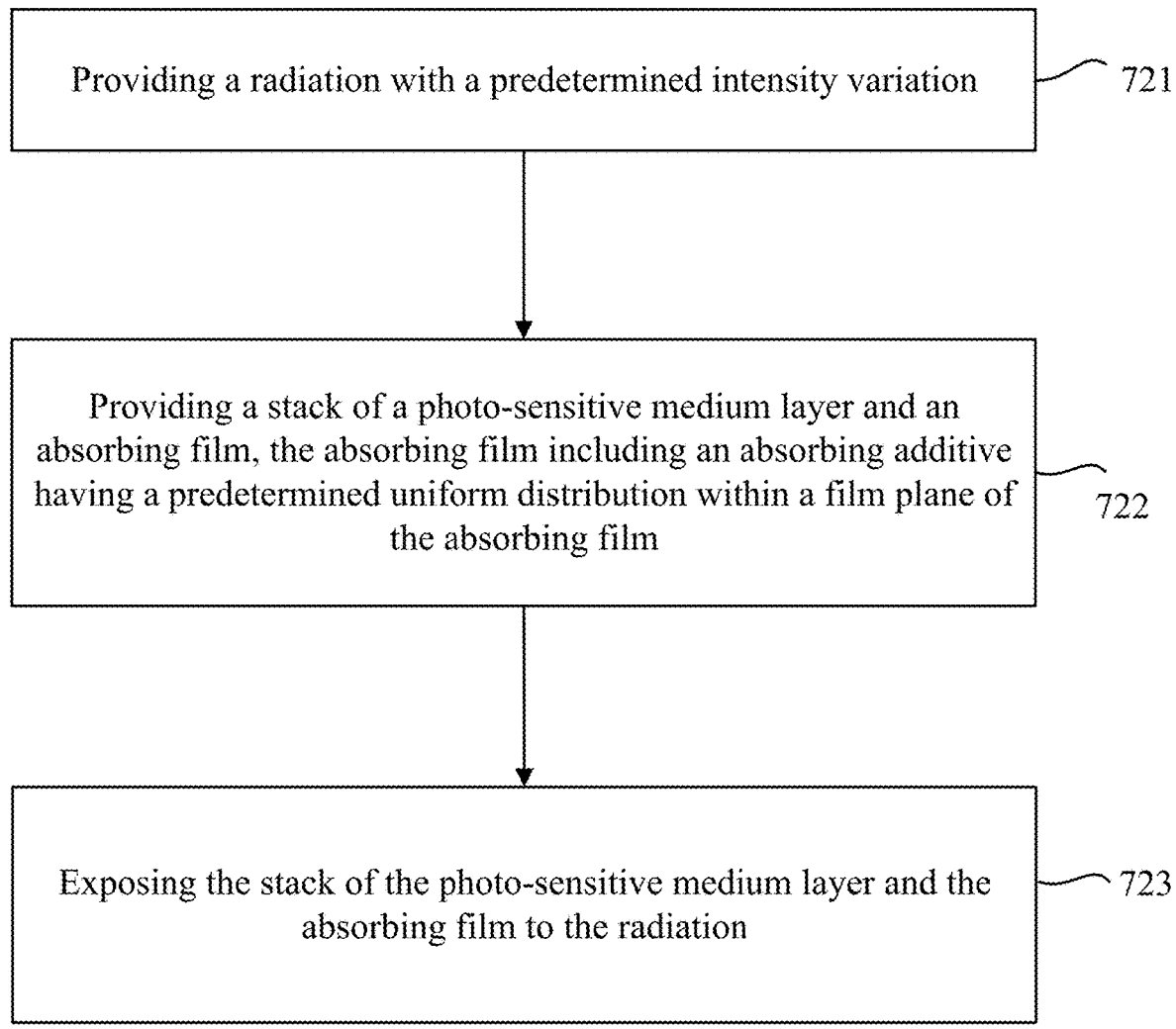

FIG. 7B is a flowchart illustrating a method 715 for fabricating an optical film with a predetermined birefringence variation, according to an embodiment of the present disclosure. As shown in FIG. 7B, the method 715 may include providing a radiation with a predetermined intensity variation (step 721). The method 715 may include providing a stack of a photo-sensitive medium layer and an absorbing film, the absorbing film including an absorbing additive having a predetermined uniform distribution within a film plane of the absorbing film (step 722). The predetermined uniform distribution of the absorbing additive is configured to result in a predetermined uniform absorption of the radiation. The method also includes exposing the stack of the photo-sensitive medium layer and the absorbing film to the radiation (step 723). After being exposed to the radiation propagating through the absorbing film, the photo-sensitive medium layer forms an optical film including at least one predetermined birefringence variation in at least one of a direction within the film plane or a thickness direction of the optical film. The method 715 may include other steps not listed in the flowchart, including those processes described above in connection with other figures.

Figure 7C:
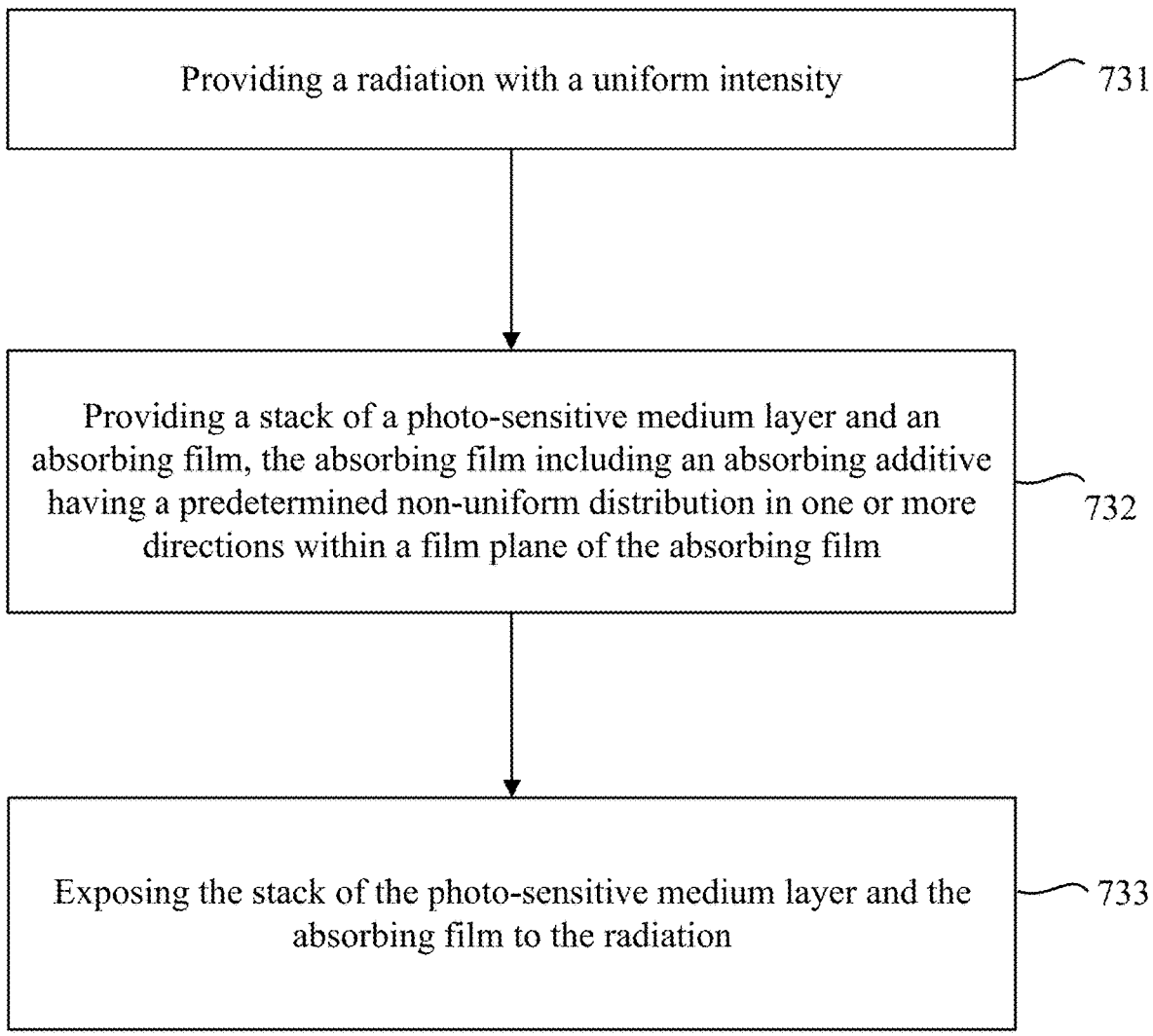

FIG. 7C is a flowchart illustrating a method 725 for fabricating an optical film with a predetermined birefringence variation, according to an embodiment of the present disclosure. As shown in FIG. 7C, the method 725 may include providing a radiation with a uniform intensity (step 731). The method 725 may also include providing a stack of a photo-sensitive medium layer and an absorbing film, the absorbing film including an absorbing additive having a predetermined non-uniform distribution in one or more directions within a film plane of the absorbing film (step 732). The predetermined non-uniform distribution of the absorbing additive is configured to result in a predetermined non-uniform absorption of the radiation. The method also includes exposing the stack of the photo-sensitive medium layer and the absorbing film to the radiation (step 733). After being exposed to the radiation propagating through the absorbing film, the photo-sensitive medium layer forms an optical film including at least one predetermined birefringence variation in at least one of a direction within the film plane or a thickness direction of the optical film. The method 725 may include other steps not listed in the flowchart, including those processes described above in connection with other figures.

In some embodiments, the radiation may have a wavelength spectrum of UV, violet, blue, or green. In some embodiments, the radiation may be unpolarized. In some embodiments, the radiation may be polarized with a spatially uniform polarization within a predetermined space in which the photo-sensitive medium layer is disposed. For example, the radiation may be linearly polarized with a fixed polarization direction within the predetermined space. In some embodiments, the radiation may be polarized with a spatially varying polarization within the predetermined space. For example, the radiation may be linearly polarized with a spatially varying polarization direction within the predetermined space.

In some embodiments, providing the radiation with the predetermined intensity variation within the wavefront may include projecting, via a projector, an image light with a predetermined intensity variation within the wavefront of the image light, onto the photo-sensitive medium layer. The image light with a predetermined intensity variation within the wavefront of the image light may form an image with a predetermined brightness variation within the image. In some embodiments, providing the radiation with the predetermined intensity variation within the wavefront may include providing, via a photomask, the radiation with the predetermined intensity variation within the wavefront. The photomask may be configured with a predetermined transmittance variation for the radiation, within a film plane of the photomask perpendicular to a thickness direction of the photomask. In some embodiments, the radiation with the predetermined intensity variation within the wavefront may be a first radiation. In some embodiments, providing, by the photomask, the radiation with the predetermined intensity variation within the wavefront may include transmitting, via the photomask, a second radiation with a spatially uniform intensity within a wavefront of the second radiation. The photomask outputs the second radiation as the first radiation with the predetermined intensity variation within the wavefront of the first radiation.

The absorbing additive may be configured to have an absorption band associated with the wavelength spectrum of the radiation. In some embodiments, the absorption additive may be mixed with the photo-sensitive material. In some embodiments, the absorption additive may be uniformly distributed within the photo-sensitive medium layer at a predetermined concentration. In some embodiments, the absorption additive may be distributed within the photo-sensitive medium layer at a predetermined concentration variation within a film plane of the photo-sensitive medium layer, and/or along a thickness direction of the photo-sensitive medium layer. In some embodiments, the absorption additive may not be mixed with the photo-sensitive material, and may be disposed at a side of the photo-sensitive material. For example, the photo-sensitive material may form a first sub-layer of the photo-sensitive medium layer, and the absorption additive may form a second sub-layer of the photo-sensitive medium layer. In some embodiments, the absorption additive may be uniformly distributed within the second sub-layer at a predetermined concentration. In some embodiments, the absorption additive may be distributed within the second sub-layer at a predetermined concentration variation within a film plane of the second sub-layer, and/or along a thickness direction of the second sub-layer.

In some embodiments, the photo-sensitive material may include a birefringent material with a mixture of an intrinsic birefringence and a photo-initiator for polymerization. The birefringent material may include nematic LCs, twist-bend LCs, cholesteric LCs, chiral nematic LCs, smectic LCs, or any combination thereof. In some embodiments, the birefringent material may be photo-polymerized when exposed to the radiation.

In some embodiments, providing the photo-sensitive medium layer including the photo-sensitive material and the absorbing additive may include: dissolving the photo-sensitive material and the absorbing additive in a solvent to form a solution, and dispensing a predetermined amount of the solution on an alignment structure to form the photo-sensitive medium layer.

In some embodiments, providing the photo-sensitive medium layer including the photo-sensitive material and the absorbing additive may include: filling the photo-sensitive material into a cell with a predetermined cell gap, and forming a film of the absorbing additive at a surface of the cell. The cell may include an alignment structure that is contact with the photo-sensitive material filled into the cell. In some embodiments, exposing the photo-sensitive medium layer to the radiation may result in polymerizing the photo-sensitive medium layer to form a polymer layer with predetermined 3D birefringence variations.

In some embodiments, the photo-sensitive material may include a photo-sensitive polymer and a photosensitizer mixed together. The radiation may be a polarized radiation. The photo-sensitive polymer may generate a photo-induced optical anisotropy and/or a photo-induced optic axis orientation when exposed to the radiation. In some embodiments, providing the photo-sensitive medium layer including the photo-sensitive material and the absorbing additive may include: dissolving the photo-sensitive material and the absorbing additive in a solvent to form a solution, and dispensing a predetermined amount of the solution on a substate to form the photo-sensitive medium layer.

In some embodiments, providing the photo-sensitive medium layer including the photo-sensitive material and the absorbing additive may include: filling the photo-sensitive material into a cell with a predetermined cell gap, and forming a film of the absorbing additive at a surface of the cell. In some embodiments, exposing the photo-sensitive medium layer to the radiation may include recording a 3D polarization field of the radiation to form a polymer layer with predetermined 3D photo-induced birefringence variations.

The optical device fabricated based on the disclosed processes and methods may be implemented in systems or devices for imaging, sensing, communication, biomedical applications, etc. For example, the optical device fabricated based on the disclosed processes and methods may be implemented in various systems for augmented reality ("AR"), virtual reality ("VR"), and/or mixed reality ("MR") applications. An artificial reality system, such as a head-mounted display ("HMD") or heads-up display ("HUD") system, generally includes a near-eye display ("NED") system in the form of a headset or a pair of glasses, and configured to present content to a user via an electronic or optic display within a short distance, for example, about 10-20 mm in front of the eyes of a user. The NED system may display virtual objects or combine images of real objects with virtual objects, as in VR, AR, or MR applications. For example, in an AR system, a user may view both images of virtual objects (e.g., computer-generated images ("CGIs")) and the surrounding environment by, for example, seeing through transparent display glasses or lenses (also referred to as an optical see-through AR system).

One example of an optical see-through AR system may include a pupil-expansion light guide display system, in which an image light representing a CGI may be coupled into a light guide (e.g., a transparent substrate), propagate within the light guide via total internal reflection ("TIR"), and be coupled out of the light guide at different locations to expand an effective pupil. Diffractive optical elements may be coupled with the light guide to couple the image light into or out of the light guide via diffraction. In a conventional pupil-expansion light guide display system, a diffractive optical element function as an out-coupling grating may provide a uniform or constant diffraction efficiency for the image light propagating within the light guide via TIR and incident onto different portions of the out-coupling grating. Thus, the intensities (or illuminances) of the lights coupled out of the light guide at different locations may gradually decrease. Therefore, the conventional light guide display system may provide a non-uniform illuminance at the output side of the light guide, and the images perceived by eyes of a user may have a low uniformity. The non-uniform illuminance provided by a conventional light guide display system is often uncontrolled. Such an uncontrolled non-uniform illuminance may provide a poor visual effect to the user.

Figure 8:
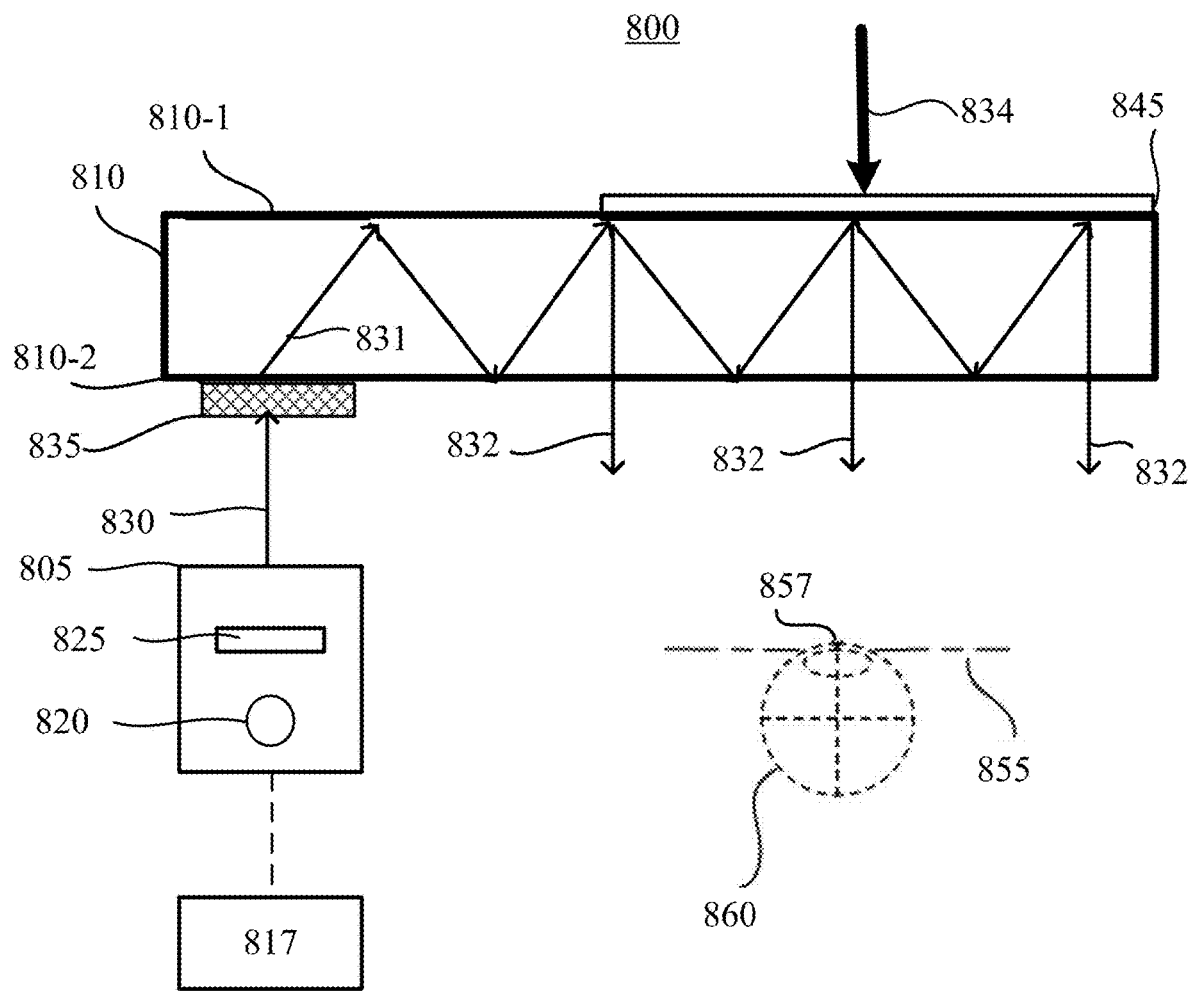
FIG. 8 illustrates a schematic diagram of a light guide display system, according to an embodiment of the present disclosure.

FIG. 8 illustrates an x-y sectional view of a light guide display system 800, according to an embodiment of the present disclosure. As shown in FIG. 8, a light source assembly 805 may generate an image light 830 representing a virtual image. An in-coupling grating 835 may couple the image light 830 into a light guide 810 as an in-coupled light 831. The in-coupled light 831 may propagate within the light guide 810 toward an out-coupling grating 845 through total internal reflection ("TIR"). Hence, the in-coupled light 831 is also referred to as a TIR propagating light. As propagating inside the light guide 810, the TIR propagating light 831 may be incident onto different portions of the out-coupling grating 845. The out-coupling grating 845 may couple the TIR propagating light 831 out of the light guide 810 at the different portions as a plurality of out-coupled (or output) lights 832. In this manner, the out-coupling grating 845 may replicate the image light 830 received from the light source assembly 805 to expand an effective pupil of the light guide display assembly 800. The out-coupled (or output) lights 832 may propagate toward a plurality of exit pupils 857 within an eye-box region 855 of the light guide display system 800. The exit pupil 857 may be a location where an eye 860 is positioned in the eye-box region 855. As the TIR propagating light 831 is gradually coupled, via diffraction, out of the light guide 810 at different portions of the out-coupling grating 845, the intensity of the TIR propagating light 831 propagating inside the light guide 810 may gradually decrease. To compensate for the decrease in the light intensity of the TIR propagating light 831 as being gradually coupled out of the light guide 810, the diffraction efficiency of the out-coupling grating 845 may be configured to gradually increase.

In the embodiment shown in FIG. 8, the out-coupling grating 845 may be a grating fabricated based on the disclosed methods and processes. For example, the out-coupling grating 845 may be a reflective PVH grating that is fabricated with a predetermined 1D birefringence variation or 2D birefringence variations within a film plane (e.g., the x-y plane) of the out-coupling grating 845. Thus, the out-coupling grating 845 may be configured to provide a predetermined (e.g., a non-uniform) diffraction efficiency profile, e.g., a predetermined 1D diffraction efficiency profile or 2D diffraction efficiency profiles, to image lights incident onto different portions of the out-coupling grating 845, when the Bragg condition is substantially satisfied. In some embodiments, the PVH grating may include 3D birefringence variations, with 2D birefringence variations in two directions (e.g., perpendicular directions) within the film plane and a 1D birefringence variation in the thickness direction of the PVH grating. In some embodiments, the PVH grating may include 2D birefringence variations, with a 1D birefringence variation in one direction within the film plane and a 1D birefringence variation in the thickness direction of the PVH grating. The predetermined non-uniform diffraction efficiency profile may allow the light guide display system 800 to have a predetermined illuminance distribution (or profile) along the one or more dimensions of the expanded exit pupil. The predetermined illuminance distribution may be any suitable illuminance distribution profile in the one or more dimensions, such as a Gaussian distribution or any other desirable distribution. In some embodiments, the predetermined illuminance distribution may be substantially uniform over an expanded exit pupil. In some embodiments, the predetermined illuminance distribution may be nonuniform depending on the application needs.

For discussion purposes, in the embodiment shown in FIG. 8, the birefringence variation within the film plane of the reflective PVH grating may be configured to gradually increase along the +x-axis direction. Thus, the diffraction efficiency of the reflective PVH grating may gradually increase along the +x-axis direction. The increase in the diffraction efficiency of the out-coupling grating 845 may compensate for the decrease in the light intensity of the TIR propagating light 831 as being gradually coupled out of the light guide 810. Accordingly, the difference between the light intensities of the output lights 831 out-coupled from different portions of the light guide 810 may be reduced, and the uniformity of the illuminance within the eye-box region 855 may be improved at least along the +x-axis direction. In some embodiments, when the PVH grating also includes a 1D birefringence variation in the thickness direction, undesirable sidebands (e.g., diffractions of infrared lights) may be reduced, and performance may be further improved.

Although not shown in FIG. 8, in some embodiments, the predetermined 1D birefringence variation or 2D birefringence variations within a film plane of the out-coupling grating 845 may be configured, such that the out-coupling grating 845 may be configured to diffract the TIR propagating light 831 toward regions outside of the eye-box region 855 with a relatively small (e.g., negligible) diffraction efficiency, and diffract the TIR propagating light 831 toward regions inside the eye-box region 855 with a relatively large diffraction efficiency. Thus, the loss of the image light directed to regions outside of the eye-box region 855 may be reduced. As a result, the power efficiency of the light guide display system 800 may be significantly improved. In some embodiments, the out-coupling grating 845 may also include a birefringence variation in the thickness direction of the out-coupling grating 845, which may further improve the optical response.

Figure 9A:
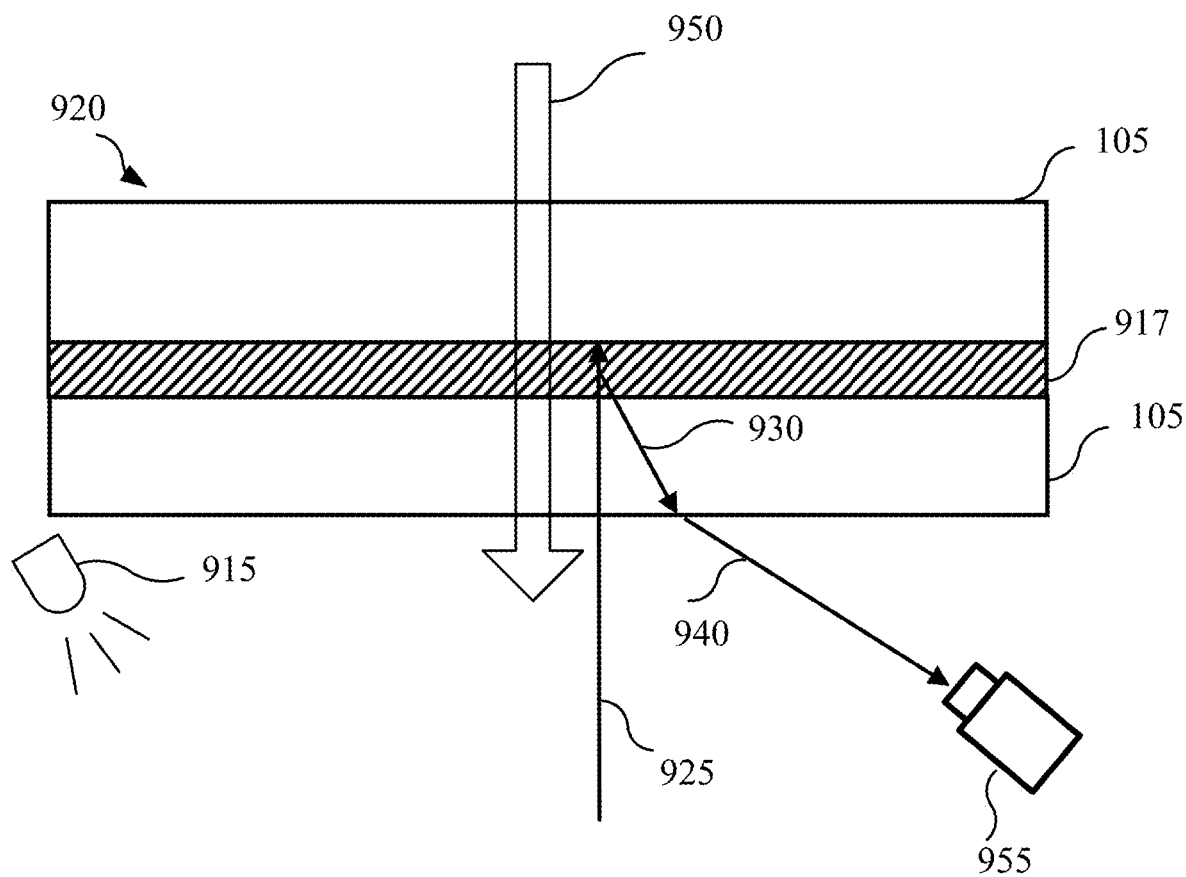
FIG. 9A illustrates a schematic diagram of an eye-tracking system, according to an embodiment of the present disclosure.
Figure 9A:
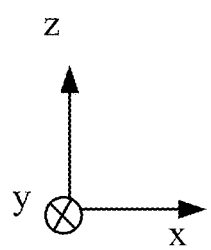

FIG. 9A illustrates an x-y sectional view of an eye-tracking system 900 according to an embodiment of the present disclosure. The eye-tracking system 900 may be implemented into an artificial reality system for eye-tracking and/or facing-tracking purposes. As shown in FIG. 9A, the eye-tracking system 900 may include an IR light source 915, an optical sensor 955 and a grating 920. The IR light source 915 may emit an IR light (not shown) to illuminate the eye 860. The grating 920 may be configured to diffract an IR light 925 reflected from the eye 860 as a diffracted light 930 propagating toward the optical sensor 955, when the Bragg condition is substantially satisfied. The grating 920 may also be configured to transmit a visible light 950 from a real-world environment toward the eye 860, with a diffraction efficiency lower than a predetermined threshold. In some embodiments, the predetermined threshold may be about 0.5%. In some embodiments, the predetermined threshold may be about 0.1%. In some embodiments, the predetermined threshold may be about 0.05%. In some embodiments, the predetermined threshold may be about 0.01%. Thus, a rainbow effect (e.g., a multicolored glare) caused by the diffraction of the visible light 950 via the grating 920 may be sufficiently reduced in a see-through view, when the artificial reality system is used for AR or MR applications.

In the embodiment shown in FIG. 9A, the grating 920 may be fabricated based on the disclosed methods and processes. In some embodiments, the grating 920 may be a reflective PVH grating. For example, as shown in FIG. 9A, the grating 920 may include two substrates 105, and a polymer layer 917 disposed between the two substrates 105. The polymer layer 917 may be configured with a predetermined birefringence variation along a thickness direction of the polymer layer 917. In some embodiments, at the same elevation in the thickness direction, the birefringence of the polymer layer 917 may be uniform across the polymer layer 917 in the x-y plane perpendicular to the thickness direction. The grating 920 may also include other elements, such as an alignment structure.

Figure 9B:
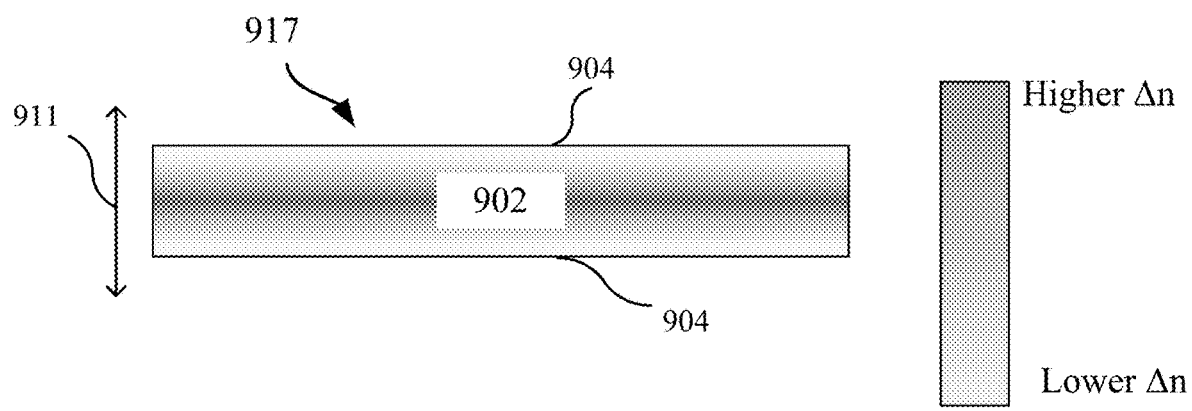
FIG. 9B illustrates a schematic diagram of an optical film included in the eye-tracking system shown in FIG. 9A, according to an embodiment of the present disclosure.
Figure 9B:
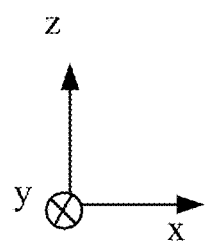

FIG. 9B illustrates an x-y sectional view of the polymer layer 917 shown in FIG. 9A, according to an embodiment of the present disclosure. As shown in FIG. 9B, the polymer layer 917 may be configured with a gradient birefringence along a thickness direction 911 of the polymer layer 917, e.g., the z-axis direction in FIG. 9B. The grey level bar indicates the birefringence (that is a local in-plane birefringence) of the polymer layer 917, where a darker color denotes a higher birefringence, and a lighter color denotes a lower birefringence. In the thickness direction of the polymer layer 917, the birefringence of the polymer layer 917 may gradually decrease from a center position 902 to both side portions 904 of the polymer layer 917.

For example, at each side portion 904 of the polymer layer 917, the local extraordinary refract index $n_{e-p}$ and the local ordinary refract index $n_{o-p}$ of the polymer layer 917 may be configured to be substantially the same, with a value of $(n_e+n_o)/2$, where $n_e$ and $n_o$ are the extraordinary refract index and the ordinary refract index of the photo-sensitive material that forms the polymer layer 917 after the sufficient radiation, as described above. Thus, at each side portion 904 of the polymer layer 917, the local birefringence (that is a local in-plane birefringence) of the polymer layer 917 may be $\Delta n = n_{e-p} - n_{o-p} = 0$. At the center position 902 of the polymer layer 917, the local extraordinary refract index $n_{e-p}$ and the local ordinary refract index $n_{o-p}$ of the polymer layer 917 may be configured to be $n_e$ and $n_o$, respectively. Thus, the local birefringence of the polymer layer 917 may be $\Delta n = n_{e-p} - n_{o-p} = n_e - n_o$. In the thickness direction of the polymer layer 917, the local birefringence $\Delta n$ of the polymer layer 917 may decrease from a value of $(n_e - n_o)$ at the center position 902 to a value of zero at both side portions 904 of the polymer layer 917, in a gradient manner. The gradient manner may be a linearly gradient manner, a non-linearly gradient manner, a stepped gradient manner, or a suitable combination thereof, etc.

Although not shown in FIG. 9B, in addition to the birefringence variation in the thickness direction 911, the polymer layer 917 may also include a 1D birefringence variation or 2D birefringence variations in one or more directions within a film plane perpendicular to the thickness direction 915. For example, the film plane may be the x-y plane, and the 1D birefringence variation or 2D birefringence variations may be in the x-axis direction and/or the y-axis direction.

Figure 10A:
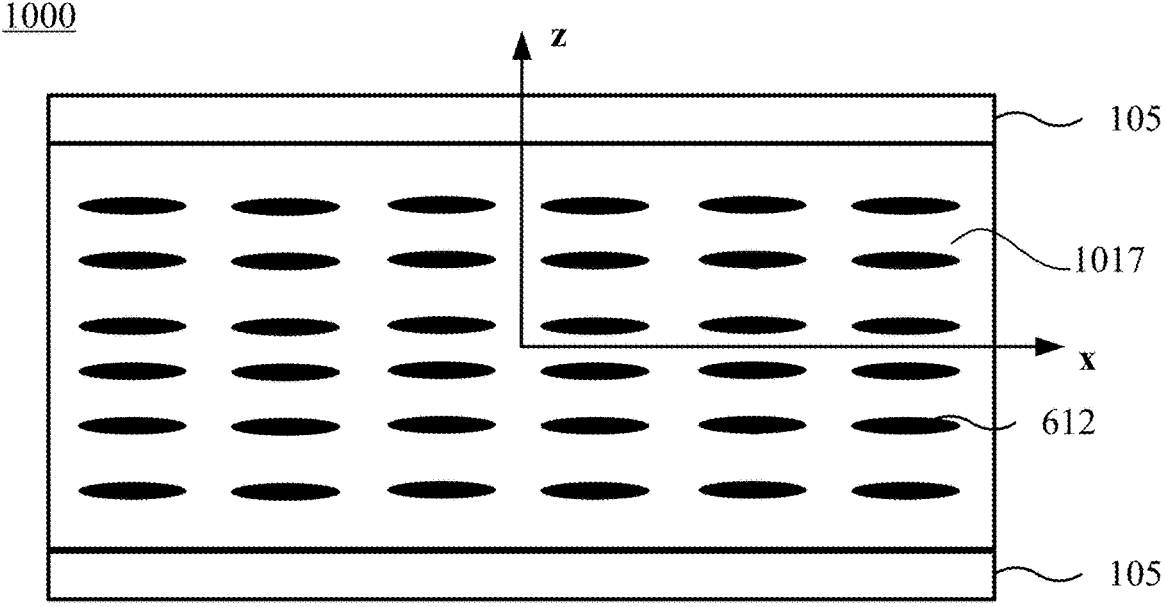
FIGS. 10A and 10B illustrate schematic diagrams of a waveplate, according to an embodiment of the present disclosure.

FIG. 10A illustrates an x-z sectional view of a waveplate 1000, according to an embodiment of the present disclosure. As shown in FIG. 10A, the waveplate 1000 may include two substrates 105 disposed in parallel with one another, and a polymer layer 1017 disposed between the two substrates 105. LC molecules 612 in the polymer layer 1017 may be homogeneously aligned in a predetermined direction, e.g., an x-axis direction shown in FIG. 10A. The polymer layer 1017 may be fabricated to have a predetermined birefringence variation within a film plane of the waveplate 1000 (e.g., an x-y plane in FIG. 10A). For example, the polymer layer 1017 may be fabricated to have sixteen portions arranged in a 4×4 array (not shown in FIG. 10A), and the birefringence (at the predetermined wavelength) provided by the respective portions may vary in both of the x-axis direction and the y-axis direction (i.e., 2D birefringence variations in a film plane). Thus, for a linearly polarized light with the predetermined wavelength and the predetermined polarization (e.g., in the x-axis direction shown in FIG. 10A), the waveplate 1000 may provide different phase retardances at different portions of the waveplate 1000, as shown in FIG. 10B.

Figure 10B:
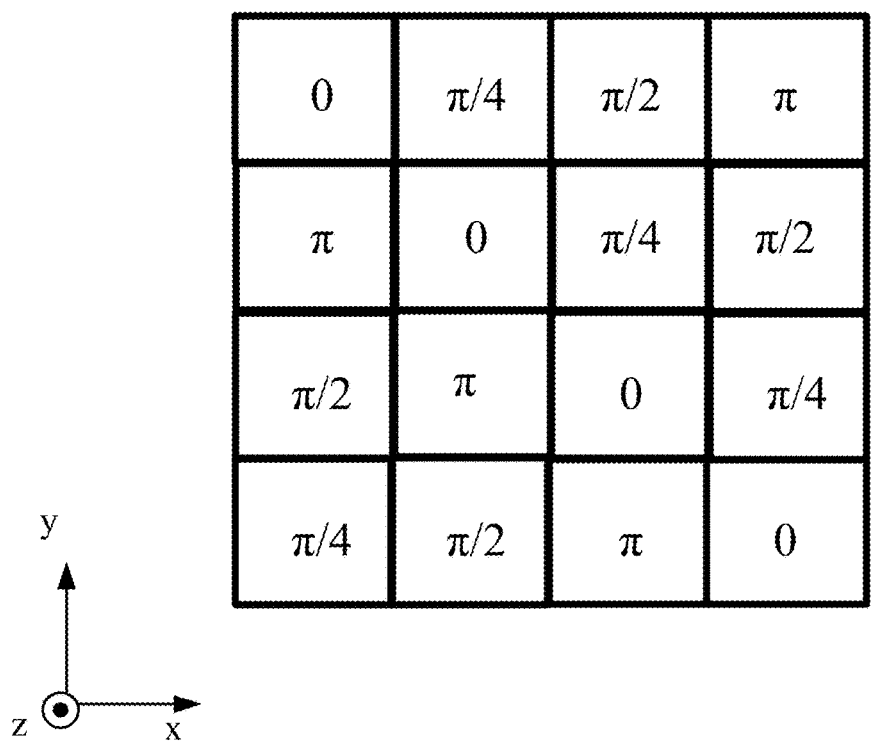

FIG. 10B illustrates the phase retardance provided at each portion of the array for the waveplate 1000 shown in FIG. 10A, according to an embodiment of the present disclosure. The phase retardance provided by the respective portions of the waveplate 1000 may vary in both of the x-axis direction and the y-axis direction. For example, for a linearly polarized light with the predetermined wavelength and the predetermined polarization (e.g., in the x-axis direction shown in FIG. 10A), the waveplate 1000 may provide a zero (0) phase retardance, a quarter-wave ($\pi/4$) phase retardance, a half-wave ($\pi/2$) phase retardance, and a one-wave ($\pi$) phase retardance at different portions of the waveplate 1000. Such a waveplate 1000 may be referred to as a free-from waveplate or a patterned waveplate, which may have a wide application in a variety of fields.

Figure 10C:
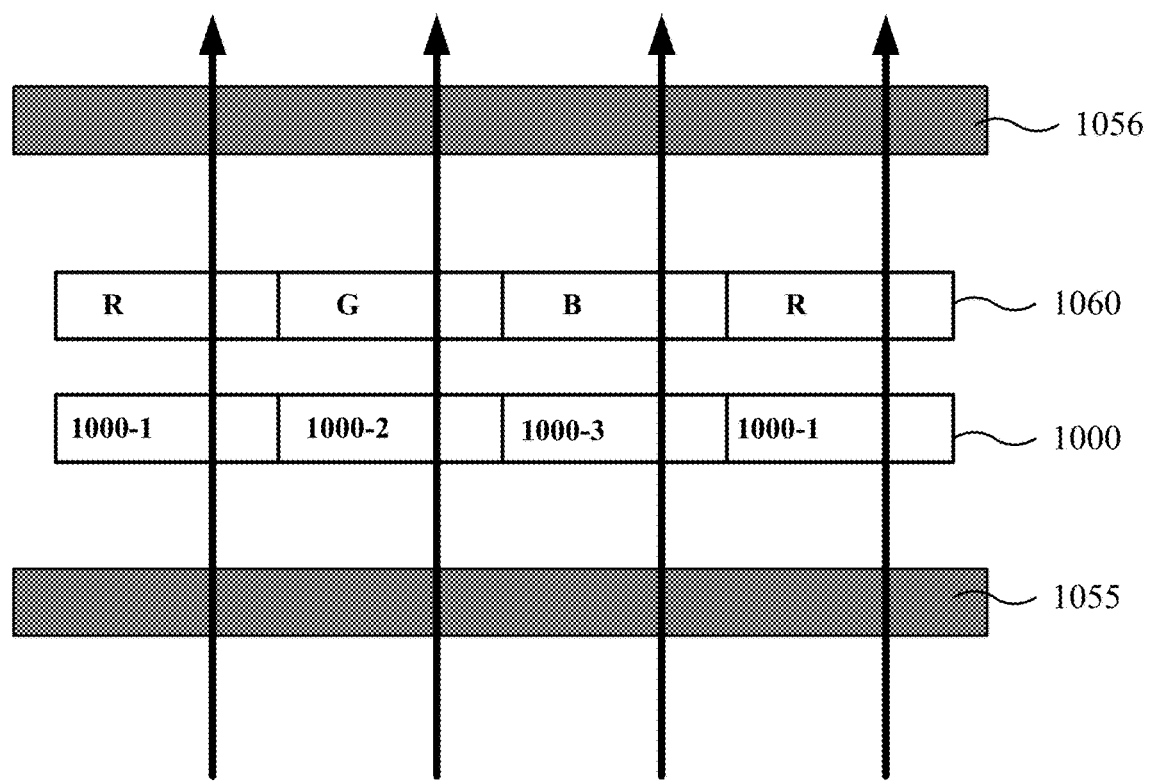
FIG. 10C illustrates a schematic diagram of an optical device including the waveplate shown in FIGS. 10A and 10B, according to an embodiment of the present disclosure.
Figure 10C:
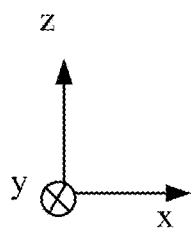

FIG. 10C illustrates a schematic diagram of an optical device 1050 including the waveplate shown in FIGS. 10A and 10B, according to an embodiment of the present disclosure. The optical device 1050 may be a display panel that includes a polarizer 1055 and an analyzer 1056 disposed opposing each other. The optical device 1050 may also include a pixel array 1060 and the waveplate 1000 disposed between the polarizer 1055 and the analyzer 1056. FIG. 10C shows that the waveplate 1000 is disposed between the pixel array 1060 and the polarizer 1055. In some embodiments, the waveplate 1000 may be disposed between the pixel array 1060 and the analyzer 1056. The pixel array 1060 may include pixels configured for different colors, e.g., red ("R"), green ("G"), and blue ("B"). The respective pixels in the pixel array 1060 may be aligned with the respective portions of the waveplate 1000. In some embodiments, the birefringence variation in the waveplate 1000 may be configured, such that the waveplate 1000 may provide a same birefringence modulation to a red light, a green light, and a blue light. For example, the waveplate 1000 with a birefringence variation within the film plane, as described above, may function as a compensation plate configured to provide a same predetermined phase retardance for the red light, the green light, and the blue light, thereby improving the performance of the optical device 1050. In contrast, a conventional compensation plate may have a uniform birefringence (e.g., for the red, blue, or green light) across the conventional compensation plate. The respective portions of the conventional compensation plate may provide different phase retardances to the red light, the green light, and the blue light due to the wavelength dependence of the birefringence, which may degrade the performance of an optical device including the conventional compensation plate. In some embodiments, in addition to having a 1D birefringence variation or 2D birefringence variations in one or more directions within the film plane, the waveplate 1000 may also have a birefringence variation in the thickness direction, which may further improve the optical response.

Figure 10D:
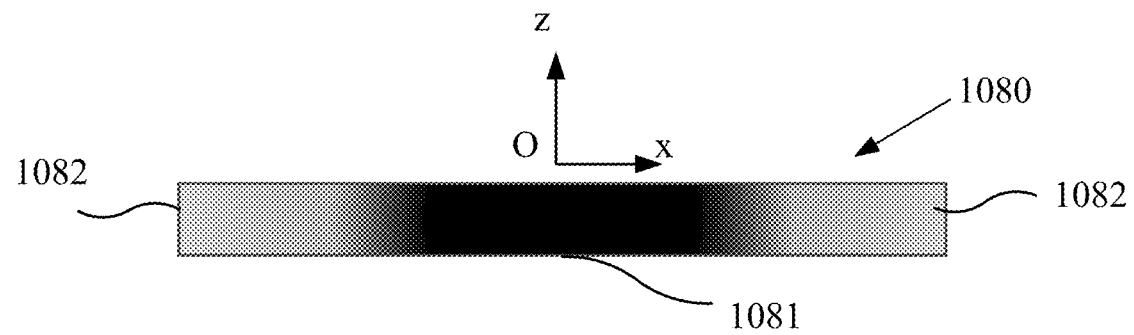
FIG. 10D illustrates a schematic cross-sectional view of a flat waveplate having a varying birefringence profile, according to an embodiment of the present disclosure.

FIG. 10D illustrates an x-z sectional view of a flat waveplate 1080, according to an embodiment of the present disclosure. The waveplate 1080 may include a liquid crystal polymer ("LCP") layer (also referred to as 1080 for discussion purposes) that is fabricated with a predetermined birefringence ($\Delta n$) variation within a film plane of the LCP layer 1080 (e.g., an x-y plane in FIG. 10D). The LCP layer 1080 may be a flat layer with a uniform thickness (d). Accordingly, the phase retardance (d*$\Delta n$) provided by the waveplate 1080 may have a predetermined variation profile. For discussion purposes, the LCP layer 1080 shown in FIG. 10D is fabricated to have a circular aperture with a radially varying birefringence profile. For example, the birefringence ($\Delta n$) may be higher at a center portion 1081 (for example, highest at or around a center point O) than at a periphery portion 1082 (e.g., at an edge), and decreases radially from the center portion 1081 toward the periphery portion 1082 across the film plane of the LCP layer 1080. For illustrative purposes, the center portion 1081 is shown as darker than the periphery portion 1082, to indicate that the birefringence is higher at the center portion 1081 than at the periphery portion 1082. Accordingly, the phase retardance (d*$\Delta n$) provided by the flat waveplate 1080 may gradually decrease from the center portion 1081 to the periphery portion 1082, in the radial directions of the aperture (in the x-y plane).

Figure 10E:
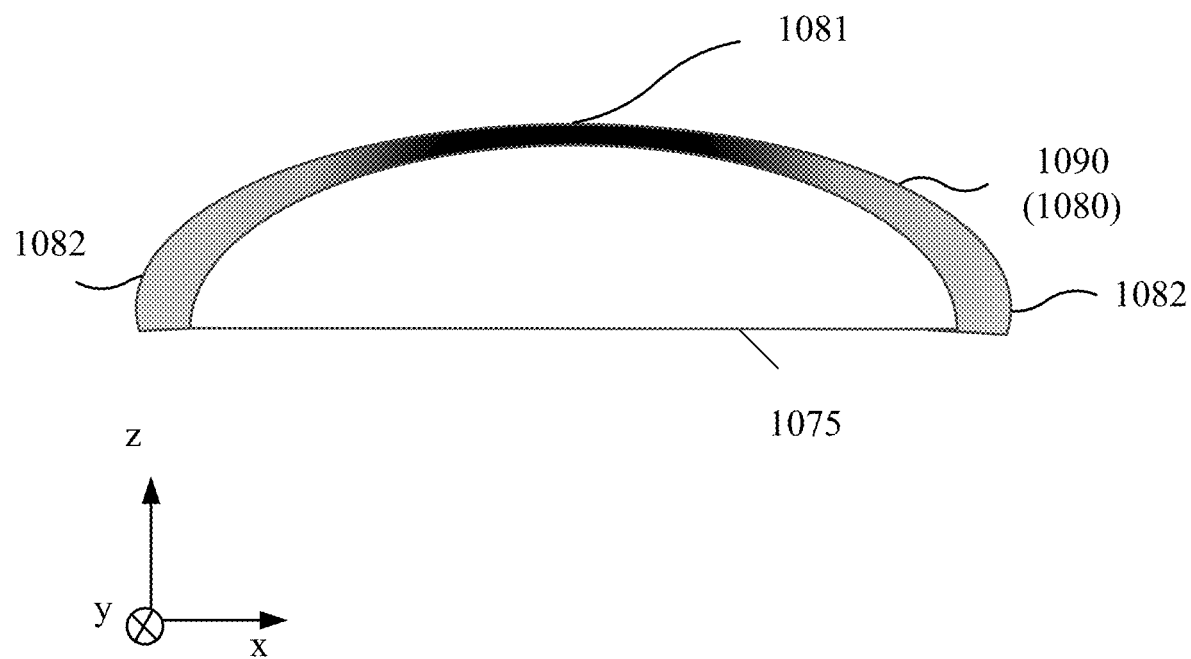
FIG. 10E schematically illustrates the flat waveplate shown in FIG. 10D being applied to a curved surface, according to an embodiment of the present disclosure.

FIG. 10E schematically illustrates the flat waveplate 1080 shown in FIG. 10D being applied to a curved surface of an optical element 1075, according to an embodiment of the present disclosure. The optical element 1075 may be a lens or any other suitable optical element. The flat waveplate 1080 may be applied to the curved surface (e.g., a convex surface) of the optical element 1075 through a suitable method, such as through thermos-forming, vacuum-forming, or hot-pressing. After the flat waveplate 1080 is applied to the curved surface (forming a curved waveplate 1080), the local thicknesses (d) of the curved waveplate 1080 at various portions of the curved surface may become non-uniform due to the stretch of the flat waveplate 1080. For example, the local thickness at the center portion 1081 may be smaller than the local thickness at the periphery portion 1082, and the thickness may gradually increase from the center portion 1081 to the periphery portion 1082, in the radial directions of the aperture (in the x-y plane).

The varying birefringence ($\Delta n$) of the flat waveplate 1080 may be configured to compensate for the varying thickness of the curved waveplate 1080, such that at each local point of the curved waveplate 1080, the phase retardance (d*$\Delta n$) is substantially constant or uniform. That is, the phase retardance (d*$\Delta n$) provided by the curved waveplate 1080 having a varying birefringence profile and a varying thickness may be uniform across the curved waveplate 1080. For example, the curved waveplate 1080 may provide a substantially constant quarter wave phase retardance or half-wave retardance across the curved waveplate 1080. In contrast, when a conventional flat waveplate having a uniform birefringence profile and a uniform thickness profile is applied to a curved surface, the waveplate is stretched over the curved surface and becomes a conventional curved waveplate. Due to the stretch, the local thicknesses of the waveplate may become non-uniform. Thus, at different local points, the phase retardance (d*$\Delta n$) may be different. That is, the phase retardance (d*$\Delta n$) may be non-uniform across the conventional curved waveplate, which may degrade the optical performance of the waveplate.

The varying birefringence ($\Delta n$) of the flat waveplate 1080 may be configured based on the surface profile of the optical element 1075. For example, in some embodiments, when the curved surface of the optical element 1075 is a concave surface, and when a flat waveplate is applied to the concave surface, the local thickness at the center portion of the waveplate may become larger than the local thickness at the periphery portion. To provide a uniform phase retardance when applied to the concave surface, the original flat waveplate may be configured to have a varying birefringence profile in which the birefringence radially increases from the center portion to the periphery portion.

Figure 11A:
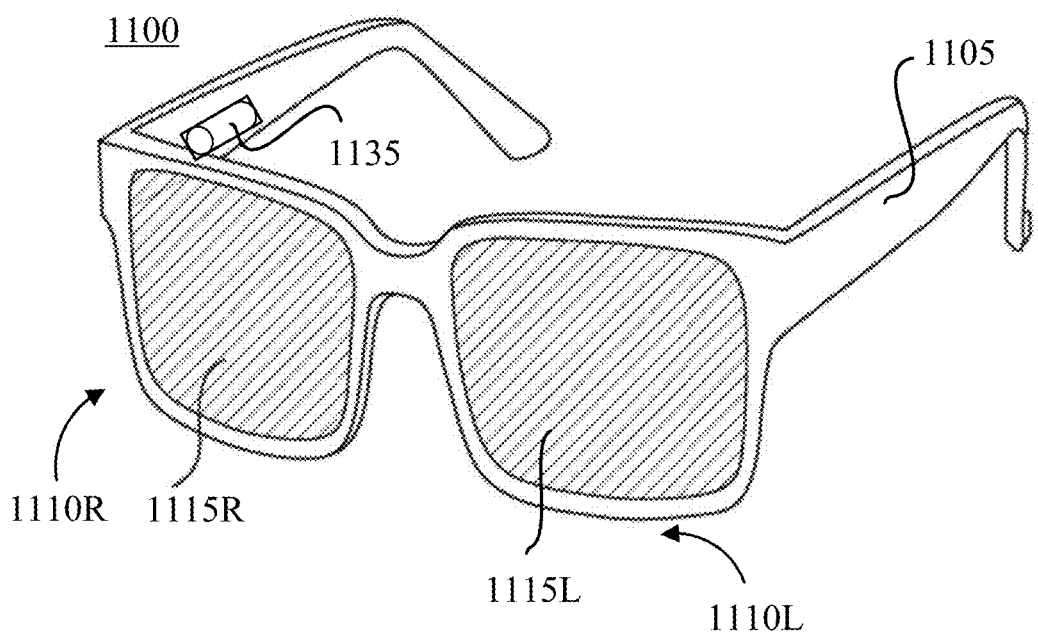
FIG. 11A illustrates a schematic diagram of a near-eye display ("NED"), according to an embodiment of the present disclosure.
Figure 11B:
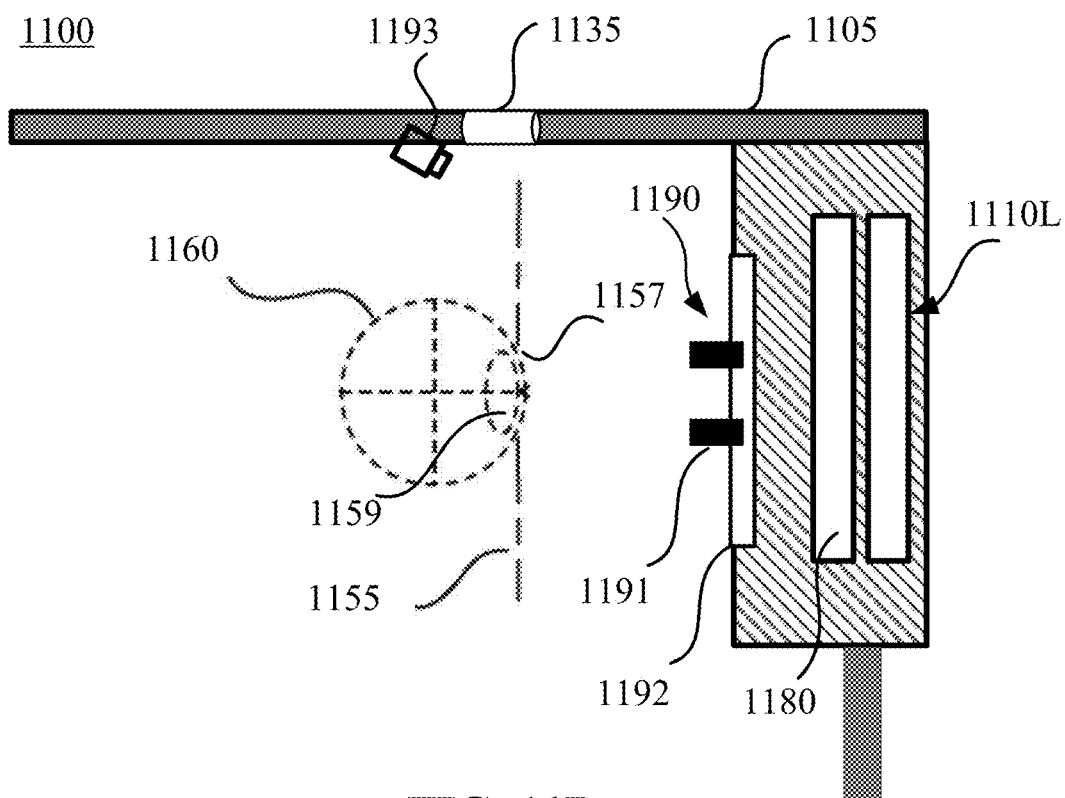
FIG. 11B illustrates a schematic cross sectional view of half of the NED shown in FIG. 11A, according to an embodiment of the present disclosure.

FIG. 11A illustrates a schematic diagram of a near-eye display ("NED") 1100 according to an embodiment of the present disclosure. FIG. 11B is a cross-sectional view of half of the NED 1100 shown in FIG. 11A according to an embodiment of the present disclosure. For purposes of illustration, FIG. 11B shows the cross-sectional view associated with a left-eye display system 1110L. The NED 1100 may include a controller (not shown). The NED 1100 may include a frame 1105 configured to mount to a user's head. The frame 1105 is merely an example structure to which various components of the NED 1100 may be mounted. Other suitable type of fixtures may be used in place of or in combination with the frame 1105. The NED 1100 may include right-eye and left-eye display systems 1110R and 1110L mounted to the frame 1105. The NED 1100 may function as a VR device, an AR device, an MR device, or any combination thereof. In some embodiments, when the NED 1100 functions as an AR or an MR device, the right-eye and left-eye display systems 1110R and 1110L may be entirely or partially transparent from the perspective of the user, which may provide the user with a view of a surrounding real-world environment. In some embodiments, when the NED 1100 functions as a VR device, the right-eye and left-eye display systems 1110R and 1110L may be opaque to block the light from the real-world environment, such that the user may be immersed in the VR imagery based on computer-generated images.

The left-eye and right-eye display systems 1110L and 1110R may include image display components configured to project computer-generated virtual images into left and right display windows 1115L and 1115R in a field of view ("FOV"). The left-eye and right-eye display systems 1110L and 1110R may be any suitable display systems. In some embodiments, the left-eye and right-eye display systems 1110L and 1110R may include one or more optical films or optical devices with a birefringence variation fabricated based on the disclosed methods and processes. In some embodiments, the optical films or optical devices may include a 1D birefringence variation or 2D birefringence variations in one or more directions within a film plane. In some embodiments, in addition to the 1D birefringence variation or 2D birefringence variations in one or more directions within the film plane, the optical films or optical devices may also include a 1D birefringence variation in a thickness direction. In some embodiments, the left-eye and right-eye display systems 1110L and 1110R may include one or more optical systems (e.g., display systems) disclosed herein, such as the light guide display system 800 shown in FIG. 8. Due to the limited space in FIG. 11A and FIG. 11B, the detailed structure of the light guide display system 800 is not shown. For illustrative purposes, FIG. 11A shows that the left-eye display systems 1110L may include a light source assembly (e.g., a projector) 1135 coupled to the frame 1105 and configured to generate an image light representing a virtual image.

As shown in FIG. 11B, the left-eye display systems 1110L may also include a viewing optical system 1180 and an object tracking system 1190 (e.g., eye tracking system and/or face tracking system). The viewing optical system 1180 may be configured to guide the image light output from the left-eye display system 1110L to the exit pupil 1157. The exit pupil 1157 may be a location where an eye pupil 1159 of the eye 1160 of the user is positioned in the eye-box region 1155 of the left-eye display system 1110L. For example, the viewing optical system 1180 may include one or more optical elements configured to, e.g., correct aberrations in an image light output from the left-eye display systems 1110L, magnify an image light output from the left-eye display systems 1110L, or perform another type of optical adjustment of an image light output from the left-eye display systems 1110L. Examples of the one or more optical elements may include an aperture, a Fresnel lens, a convex lens, a concave lens, a filter, any other suitable optical element that affects an image light, or a combination thereof. In some embodiments, the viewing optical system 1180 may include one or more optical films or optical devices fabricated based on the disclosed methods and processes. The one or more optical films or optical devices may include a 1D birefringence variation or 2D birefringence variations in one or more directions within a film plane and/or a 1D birefringence variation in a thickness direction, as described above in connection with other figures.

The object tracking system 1190 may include an IR light source 1191 configured to illuminate the eye 1160 and/or the face, a deflecting element 1192 (such as a grating), and an optical sensor 1193 (such as a camera). The deflecting element 1192 may deflect (e.g., diffract) the IR light reflected by the eye 1160 toward the optical sensor 1193. The optical sensor 1193 may generate a tracking signal relating to the eye 1160. The tracking signal may be an image of the eye 1160. A controller (not shown) may control various optical elements, such as an active out-coupling element, a dimming element, etc., based on eye-tracking information obtained from analysis of the image of the eye 1160. In some embodiments, the deflecting element 1192 may include one or more optical films or optical devices fabricated based on the disclosed methods and processes, such as the grating 920 shown in FIGS. 9A and 9B. The grating 920 may include a 1D birefringence variation or 2D birefringence variations in one or more directions within a film plane and/or a 1D birefringence variation in a thickness direction.

In some embodiments, the NED 1100 may include an adaptive dimming element which may dynamically adjust the transmittance of lights reflected by real-world objects, thereby switching the NED 1100 between a VR device and an AR device or between a VR device and an MR device. In some embodiments, along with switching between the AR/MR device and the VR device, the adaptive dimming element may be used in the AR and/MR device to mitigate differences in brightness of lights reflected by real-world objects and virtual image lights.

In some embodiments, the present disclosure provides a method that includes providing a radiation with a predetermined intensity profile. The method also includes providing a photo-sensitive medium layer including a mixture of a photo-sensitive material and an absorbing additive. The absorbing additive has a predetermined non-uniform distribution in at least one of a direction within a film plane or a thickness direction of the photo-sensitive medium layer. The predetermined non-uniform distribution of the absorbing additive is configured to result in a predetermined non-uniform absorption of the radiation. The method also includes exposing the photo-sensitive medium layer to the radiation to form an optical film. The optical film includes at least one predetermined birefringence variation in at least one of the direction within the film plane or the thickness direction.

In some embodiments, the predetermined intensity profile of the radiation is a uniform intensity profile. Providing the photo-sensitive medium layer including the mixture of the photo-sensitive material and the absorbing additive includes: configuring a predetermined concentration variation of the absorbing additive in at least one of the direction within the film plane or the thickness direction.

In some embodiments, the predetermined intensity profile of the radiation is a uniform intensity profile. Providing the photo-sensitive medium layer including the mixture of the photo-sensitive material and the absorbing additive includes: configuring a first predetermined concentration variation of the absorbing additive in the direction within the film plane; and configuring a second predetermined concentration variation of the absorbing additive in the thickness direction.

In some embodiments, the predetermined intensity profile of the radiation is a non-uniform intensity profile. Providing the photo-sensitive medium layer including the mixture of the photo-sensitive material and the absorbing additive includes: configuring a predetermined concentration variation of the absorbing additive in the thickness direction.

In some embodiments, providing the radiation with the non-uniform intensity profile includes: generating, via a projector, an image light representing an image with a predetermined brightness variation.

In some embodiments, providing the radiation with the predetermined intensity profile includes: transmitting a light with a spatially uniform intensity through a photomask configured with a predetermined transmittance variation. The light output from the photomask is the radiation with the predetermined intensity profile.

In some embodiments, the absorbing additive includes an absorption dye. In some embodiments, the photo-sensitive material includes a polymerizable liquid crystal material and a photo-initiator for polymerization. In some embodiments, the photo-sensitive material includes a photo-sensitive polymer and a photosensitizer.

In some embodiments, the present disclosure provides a method. The method includes providing a radiation with a predetermined intensity variation. The method also includes providing a stack of a photo-sensitive medium layer and an absorbing film, the absorbing film including an absorbing additive having a predetermined uniform distribution within a film plane of the absorbing film. The predetermined uniform distribution of the absorbing additive is configured to result in a predetermined uniform absorption of the radiation. The method also includes exposing the stack of the photo-sensitive medium layer and the absorbing film to the radiation. After being exposed to the radiation propagating through the absorbing film, the photo-sensitive medium layer forms an optical film including at least one predetermined birefringence variation in at least one of a direction within the film plane or a thickness direction of the optical film.

In some embodiments, the present disclosure provides a method. The method includes providing a radiation with a uniform intensity. The method also includes providing a stack of a photo-sensitive medium layer and an absorbing film, the absorbing film including an absorbing additive having a predetermined non-uniform distribution in one or more directions within a film plane of the absorbing film. The predetermined non-uniform distribution of the absorbing additive is configured to result in a predetermined non-uniform absorption of the radiation. The method also includes exposing the stack of the photo-sensitive medium layer and the absorbing film to the radiation. After being exposed to the radiation propagating through the absorbing film, the photo-sensitive medium layer forms an optical film including one or more predetermined birefringence variations in one or more directions within the film plane of the optical film.

In some embodiments, providing the stack of the photo-sensitive medium layer and the absorbing film includes configuring one or more predetermined concentration variations of the absorbing additive in the one or more directions within the film plane of the absorbing film.

In some embodiments, the optical film includes one or more first predetermined birefringence variations in the one or more directions within the film plane of the optical film, and a second predetermined birefringence variation in a thickness direction of the optical film.

The foregoing description of the embodiments of the present disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the present disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the present disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical film comprising:
   a first substrate;
   a second substrate;
   a stack of photo-sensitive medium layer, disposed between the first substrate and the second substrate; and
   an absorbing film disposed over the first substrate, the orbing film including an absorbing additive having a predetermined non-uniform distribution in one or more directions within a film plane of the absorbing film, wherein:
   the predetermined non-uniform distribution of the absorbing additive is configured to result in a predetermined non-uniform absorption of radiation; and
   the stack of the photo-sensitive medium layer is configured to form a polymer film upon exposure to a radiation, with a predetermined intensity profile, that is further configured to propagate through the absorbing film, the polymer film including at least one predetermined birefringence variation in one or more directions within a film plane of the polymer film.

2. The optical film of claim 1, wherein:
   the radiation is configured with the predetermined intensity profile comprising a uniform intensity profile, such that upon exposure of the predetermined intensity profile to the stack of the photo-sensitive medium layer and the absorbing film, the absorbing film is configured to have
   one or more predetermined concentration variations of the absorbing additive in the one or more directions within the film plane of the absorbing film.

3. The optical film of claim 1, wherein:
   the radiation is configured with the predetermined intensity profile comprising a non-uniform intensity profile; and
   the radiation for the non-uniform intensity profile is generated via a projector for an image light representing an image with a predetermined brightness variation.

4. The optical fil method of claim 1, wherein-providing the radiation is configured with the predetermined intensity profile, such that the radiation transmits a light with a spatially uniform intensity through a photomask that is further configured with a predetermined transmittance variation, wherein a light output from the photomask is the radiation with the predetermined intensity profile.

5. The optical film of claim 1, wherein the absorbing additive includes an absorption dye.

6. The optical film of claim 1, wherein the photo-sensitive medium layer includes a polymerizable liquid crystal material and a photo-initiator for polymerization, and the radiation is unpolarized or has a spatially uniform polarization direction.

7. The optical film of claim 1, wherein the photo-sensitive medium layer includes a photo-sensitive polymer and a photosensitizer, and the radiation has a three dimensional ("3D") spatially uniform polarization direction of linear polarizations or 3D spatially varying polarization directions of linear polarizations.

8. The optical film of claim 1, wherein the polymer film is polarization hologram polymer film.

9. The optical film of claim 1, wherein the stack of the photo-sensitive medium layer comprises a first sub-layer including a photo-sensitive material and a second sub-layer including the absorbing additive.

10. The optical film of claim 9, wherein the second sub-layer comprising an absorption additive is distributed at a predetermined concentration variation within a film plane of the second sub-layer or along a thickness direction of the second sub-layer.

11. A method, comprising:
    providing a radiation with a predetermined intensity variation;
    providing a stack of a photo-sensitive medium layer and an absorbing film, the absorbing film including an absorbing additive having a predetermined uniform distribution within a film plane of the absorbing film, wherein the predetermined uniform distribution of the absorbing additive is configured to result in a predetermined uniform absorption of the radiation; and
    exposing the stack of the photo-sensitive medium layer and the absorbing film to the radiation, wherein after being exposed to the radiation propagating through the absorbing film, the photo-sensitive medium layer forms a polymer film including at least one predetermined birefringence variation in at least one of a direction within a film plane or a thickness direction of the polymer film.

12. The method of claim 11, wherein providing the radiation with the predetermined intensity variation comprises:
    generating, via a projector, an image light representing an image with a predetermined brightness variation.

13. The method of claim 11, wherein providing the radiation with the predetermined intensity variation comprises:
    transmitting a light with a spatially uniform intensity through a photomask configured with a predetermined transmittance variation, wherein a light output from the photomask is the radiation with the predetermined intensity variation.

14. The method of claim 11, wherein the absorbing additive includes an absorption dye.

15. The method of claim 11, wherein the photo-sensitive medium layer includes a polymerizable liquid crystal material and a photo-initiator for polymerization, or a photo-sensitive polymer and a photosensitizer.

16. A method, comprising:
    providing a radiation with a uniform intensity;
    providing a stack of a photo-sensitive medium layer and an absorbing film, the absorbing film including an absorbing additive having a predetermined non-uniform distribution in one or more directions within a film plane of the absorbing film, wherein the predetermined non-uniform distribution of the absorbing additive is configured to result in a predetermined non-uniform absorption of the radiation; and
    exposing the stack of the photo-sensitive medium layer and the absorbing film to the radiation, wherein after being exposed to the radiation propagating through the absorbing film, the photo-sensitive medium layer forms a polymer film including one or more predetermined birefringence variations in one or more directions within a film plane of the polymer film.

17. The method of claim 16, wherein providing the stack of the photo-sensitive medium layer and the absorbing film comprises:
    configuring one or more predetermined concentration variations of the absorbing additive in the one or more directions within the film plane of the absorbing film.

18. The method of claim 16, wherein the absorbing additive includes an absorption dye.

19. The method of claim 16, wherein the photo-sensitive medium layer includes a polymerizable liquid crystal material and a photo-initiator for polymerization, or a photo-sensitive polymer and a photosensitizer.

20. The method of claim 16, wherein the polymer film includes one or more first predetermined birefringence variations in the one or more directions within the film plane of the polymer film, and a second predetermined birefringence variation in a thickness direction of the polymer film.

* * * * *